United States Patent
Yoshida

(10) Patent No.: US 12,504,823 B2
(45) Date of Patent: Dec. 23, 2025

(54) TACTILE PRESENTATION APPARATUS AND TACTILE PRESENTATION SYSTEM

(71) Applicant: SONY GROUP CORPORATION, Tokyo (JP)

(72) Inventor: Kentaro Yoshida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 175 days.

(21) Appl. No.: 18/260,823

(22) PCT Filed: Dec. 21, 2021

(86) PCT No.: PCT/JP2021/047295
§ 371 (c)(1),
(2) Date: Jul. 10, 2023

(87) PCT Pub. No.: WO2022/158224
PCT Pub. Date: Jul. 28, 2022

(65) Prior Publication Data
US 2024/0053828 A1 Feb. 15, 2024

(30) Foreign Application Priority Data

Jan. 19, 2021 (JP) .................... 2021-006347
Feb. 9, 2021 (JP) .................... 2021-019305

(51) Int. Cl.
*G06F 3/01* (2006.01)
*G06F 3/0354* (2013.01)
*G06F 3/041* (2006.01)

(52) U.S. Cl.
CPC .......... *G06F 3/016* (2013.01); *G06F 3/03547* (2013.01); *G06F 3/0414* (2013.01); *G06F 2203/04105* (2013.01)

(58) Field of Classification Search
CPC ................... G06F 3/016; G06F 3/0414; G06F 2203/04105; G06F 2203/04113
See application file for complete search history.

(56) References Cited

U.S. PATENT DOCUMENTS

| | | | |
|---|---|---|---|
| 7,215,321 B2* | 5/2007 | SanGiovanni | G06F 3/0233 |
| | | | 345/184 |
| 10,331,212 B2* | 6/2019 | Naboulsi | B60R 11/02 |

(Continued)

FOREIGN PATENT DOCUMENTS

| | | |
|---|---|---|
| EP | 2250544 B1 | 12/2016 |
| JP | 2011-508935 A | 3/2011 |

(Continued)

OTHER PUBLICATIONS

International Search Report and Written Opinion of PCT Application No. PCT/JP2021/047295, issued on Mar. 15, 2022, 10 pages of ISRWO.

*Primary Examiner* — John A Tweel, Jr.
(74) *Attorney, Agent, or Firm* — CHIP LAW GROUP

(57) ABSTRACT

There is provided a tactile presentation apparatus that includes a contact portion, a peripheral portion, a retaining portion, a first driving portion, and a second driving portion. The contact portion includes a central portion and a connection portion. The first driving portion changes a height of the central portion from the retaining portion in a first direction in which the central portion gets away from the retaining portion and a second direction and changes a press force to the central portion in the first direction in accordance with the height of the central portion from the retaining portion. The second driving portion changes a height of the peripheral portion from the retaining portion in the first direction and the second direction and changes a press force to the peripheral portion in the first direction in (Continued)

accordance with the height of the peripheral portion from the retaining portion.

20 Claims, 51 Drawing Sheets

(56) References Cited

U.S. PATENT DOCUMENTS

| | | | |
|---|---|---|---|
| 10,972,098 B2* | 4/2021 | Lai | H04R 19/02 |
| 11,078,071 B2* | 8/2021 | Marsh | H10N 30/308 |
| 11,561,111 B2* | 1/2023 | Roberts | G06F 3/0416 |
| 11,868,532 B2* | 1/2024 | Yoshida | G06F 3/0446 |
| 2017/0256144 A1* | 9/2017 | Khoshkava | G08B 6/00 |

FOREIGN PATENT DOCUMENTS

| | | |
|---|---|---|
| JP | 2017-162468 A | 9/2017 |
| JP | 2019-212169 A | 12/2019 |
| WO | 2016/075901 A1 | 5/2016 |

* cited by examiner

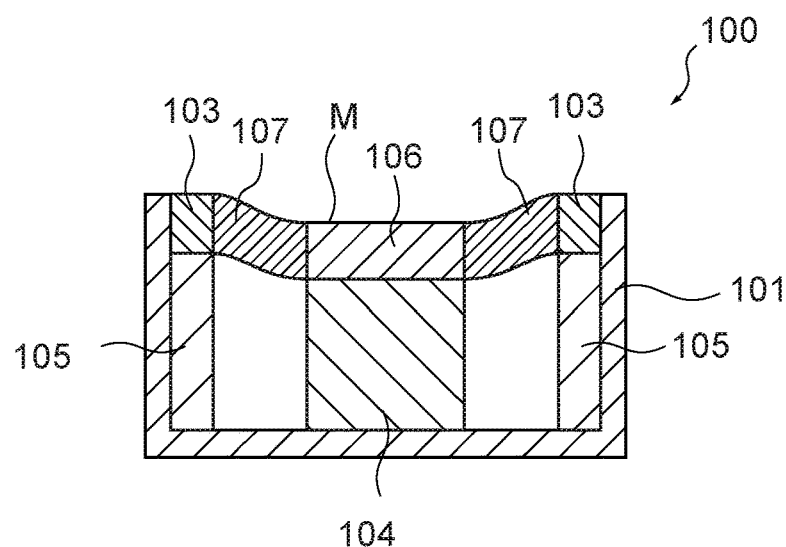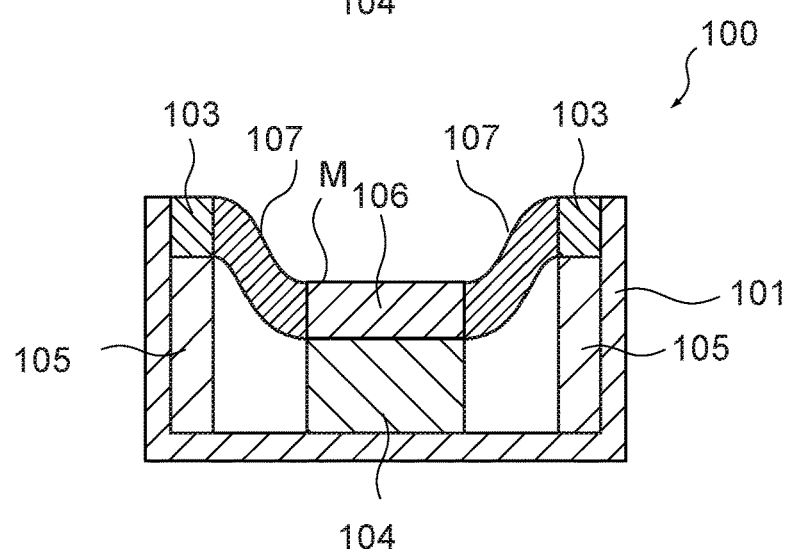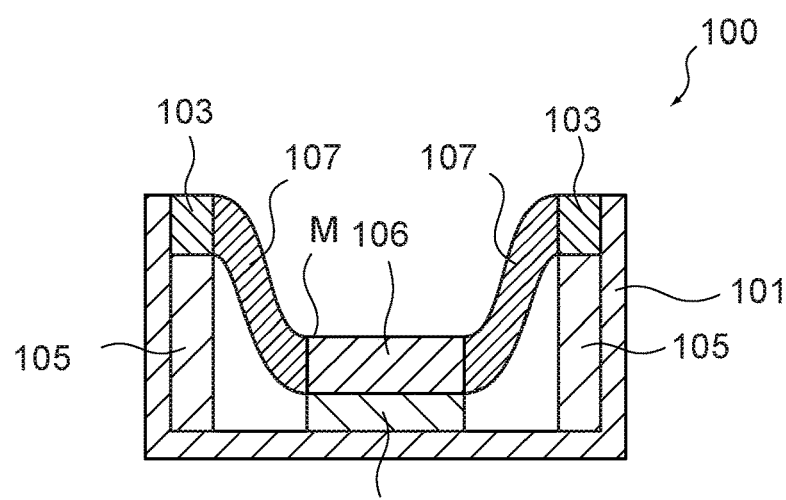

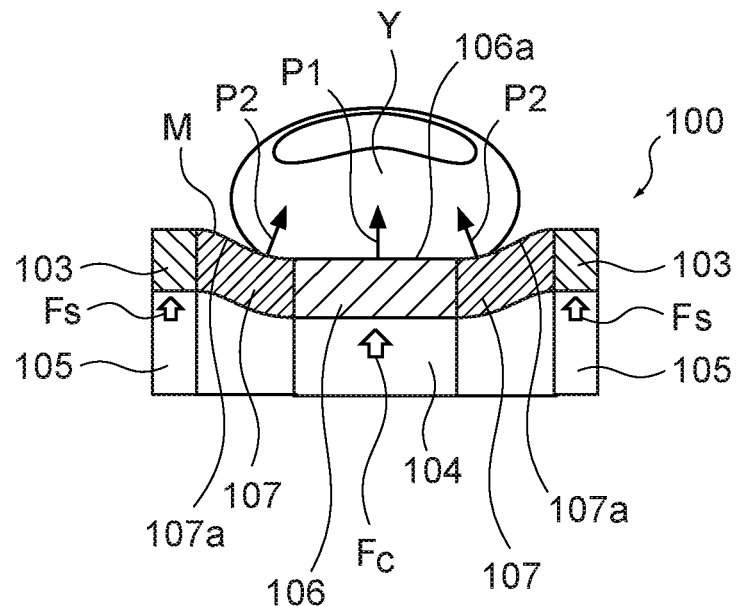
FIG. 16A
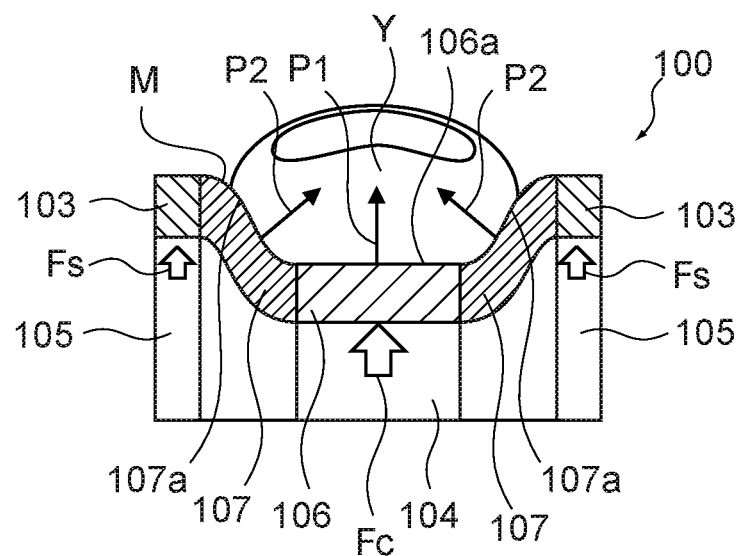
FIG. 16B
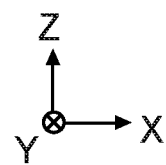

TACTILE PRESENTATION APPARATUS AND TACTILE PRESENTATION SYSTEM

CROSS REFERENCE TO RELATED APPLICATIONS

This application is a U.S. National Phase of International Patent Application No. PCT/JP2021/047295 filed on Dec. 21, 2021, which claims priority benefit of Japanese Patent Application No. JP 2021-006347 filed in the Japan Patent Office on Jan. 19, 2021, which claims priority benefit of Japanese Patent Application No. JP 2021-019305 filed in the Japan Patent Office on Feb. 9, 2021. Each of the above-referenced applications is hereby incorporated herein by reference in its entirety.

TECHNICAL FIELD

The present technology relates to a tactile presentation apparatus and a tactile presentation system for presenting a tactile sense to a user.

BACKGROUND ART

Various structures have been proposed for tactile presentation apparatuses for presenting a tactile sense to a user. For example, Patent Literature 1 has disclosed a shape presenting apparatus capable of presenting various shapes by changing viscosity of an electrorheological fluid through electrodes arranged in a matrix form and controlling inflow/outflow of the electrorheological fluid to/from a hole provided near each electrode.

CITATION LIST

Patent Literature

Patent Literature 1: Japanese Patent Application Laid-open No. 2019-212169

DISCLOSURE OF INVENTION

Technical Problem

However, the configuration according to Patent Literature 1 cannot achieve independent control on the shape of a shape presenting surface and a press force to a contact object (e.g., user's finger) from the shape presenting surface because a pressure applied on the electrorheological fluid determines an amount of deformation of the shape presenting surface. Therefore, a pressure distribution sensed by the contact object may cause discomfort.

In view of the above-mentioned circumstances, it is an objective of the present technology to provide a tactile presentation apparatus and a tactile presentation system that are capable of presenting a high-quality tactile sense with shape and pressure distribution controlled with respect to a contact object.

Solution to Problem

In order to accomplish the above-mentioned objective, a fluid control apparatus according to the present technology includes a contact portion, a peripheral portion, a retaining portion, a first driving portion, and a second driving portion. The contact portion includes a central portion having a first contact surface and a connection portion having a second contact surface, the second contact surface being flexible and continuous with the first contact surface. The peripheral portion is connected to the central portion through the connection portion. The retaining portion supports the contact portion and the peripheral portion. The first driving portion changes a height of the central portion from the retaining portion in a first direction in which the central portion gets away from the retaining portion and a second direction and changes a press force to the central portion in the first direction in accordance with the height of the central portion from the retaining portion, the second direction being a direction opposite to the first direction. The second driving portion changes a height of the peripheral portion from the retaining portion in the first direction and the second direction and changes a press force to the peripheral portion in the first direction in accordance with the height of the peripheral portion from the retaining portion.

At least one of the first driving portion or the second driving portion may drive the central portion or the peripheral portion by fluid control.

Both of the first driving portion and the second driving portion may drive the central portion and the peripheral portion by fluid control.

The first driving portion may drive the central portion to achieve a first correlation between the press force to the central portion and the height of the central portion from the retaining portion, and the second driving portion may drive the peripheral portion to achieve a second correlation between the press force to the peripheral portion and the height of the peripheral portion from the retaining portion, the second correlation being different from the first correlation.

The connection portion may have different hardness between vicinity of the central portion and vicinity of the peripheral portion.

The connection portion may have a higher hardness in the vicinity of the central portion than in the vicinity of the peripheral portion.

The connection portion may have different thickness between vicinity of the central portion and vicinity of the peripheral portion.

The connection portion may have larger thickness in the vicinity of the central portion than in the vicinity of the peripheral portion.

The retaining portion may include a side wall portion held in contact with the peripheral portion, and at least one of the peripheral portion or the side wall portion may be flexible toward the contact portion.

The tactile presentation apparatus may further include a separation portion where the peripheral portion is separated, the separation portion extending toward the central portion from an outer periphery of the peripheral portion.

The tactile presentation apparatus may further include a bent portion where the peripheral portion is bent, the bent portion extending toward the central portion from an outer periphery of the peripheral portion.

At least a partial region of the first contact surface and the second contact surface may have a friction coefficient of 0.3 or more.

An amount of allowable movement of the central portion in the first direction and the second direction may be smaller than an amount of allowable movement of the peripheral portion in the first direction and the second direction.

An amount of allowable movement of the central portion in the first direction and the second direction may be larger than an amount of allowable movement of the peripheral portion in the first direction and the second direction.

At least a part of the central portion and the peripheral portion may be deformable by folding and deployment.

The central portion may have peripheral edge without the connection portion and the peripheral portion on an outer peripheral side or a peripheral edge without the peripheral portion on an outer peripheral side.

A boundary line between the central portion and the connection portion may have no corner having a radius of curvature of less than 1 mm and a boundary line between the connection portion and the peripheral portion may have no corner having a radius of curvature of less than 1 mm.

In order to accomplish the above-mentioned objective, a fluid control system according to the present technology includes a contact portion, a peripheral portion, a retaining portion, a first driving portion, a second driving portion, and a control unit.

The contact portion includes a central portion having a first contact surface and a connection portion having a second contact surface, the second contact surface being flexible and continuous with the first contact surface.

The peripheral portion is connected to the central portion through the connection portion.

The retaining portion supports the contact portion and the peripheral portion.

The first driving portion changes a height of the central portion from the retaining portion in a first direction in which the central portion gets away from the retaining portion and a second direction and changes a press force to the central portion in the first direction in accordance with the height of the central portion from the retaining portion, the second direction being a direction opposite to the first direction.

The second driving portion changes a height of the peripheral portion from the retaining portion in the first direction and the second direction and changes a press force to the peripheral portion in the first direction in accordance with the height of the peripheral portion from the retaining portion.

The control unit independently controls the first driving portion and the second driving portion.

The tactile presentation system may further include a sensor for detecting at least any one of contact or non-contact, a contact area, a press force, or a pushing amount of a contact object with respect to the first contact surface and the second contact surface, in which
    the control unit may control the first driving portion and the second driving portion on the basis of an output of the sensor.

The tactile presentation system may further include a sensor for detecting shapes of the first contact surface and the second contact surface, in which
    the control unit may control the first driving portion and the second driving portion on the basis of an output of the sensor.

BRIEF DESCRIPTION OF DRAWINGS

FIGS. 12A, 12B, and 12C A schematic diagram showing an operation of the tactile presentation apparatus.

FIGS. 16A and 16B A schematic diagram showing a pressure from the contact surface to the finger that touches the contact surface of the tactile presentation apparatus.

MODE(S) FOR CARRYING OUT THE INVENTION

First Embodiment

A tactile presentation apparatus according to a first embodiment of the present technology will be described.
[Configuration of Tactile Presentation Apparatus]

The tactile presentation apparatus according to the present embodiment presents a tactile sense to a "contact object" that touches the tactile presentation apparatus. Although it is not particularly limited thereto, the contact object may be the user's finger, hand, or other body parts.

Figure 1:
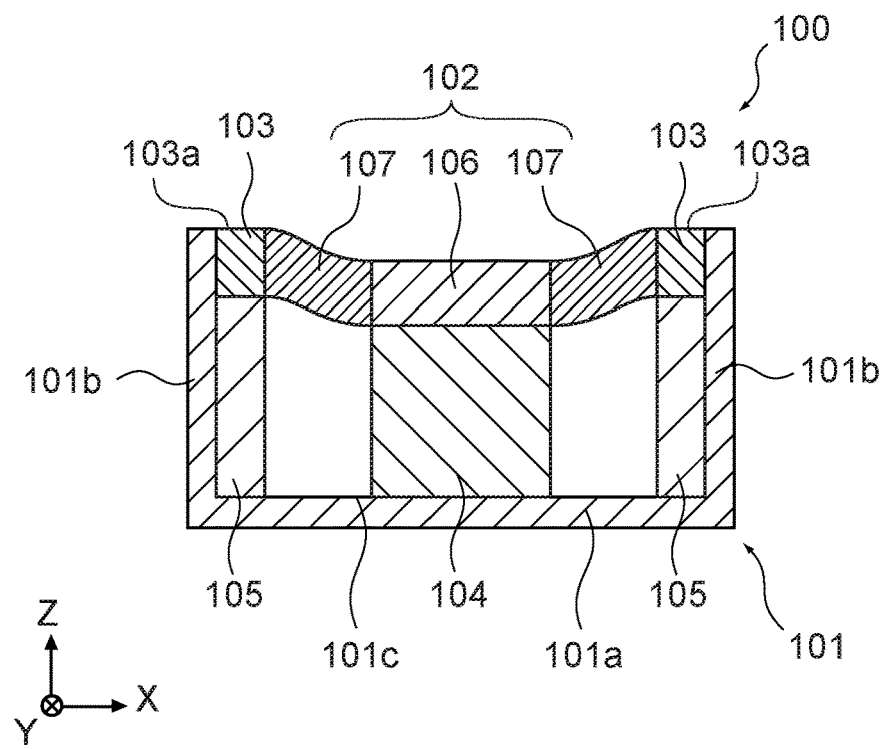
FIG. 1 A cross-sectional view of a tactile presentation apparatus according to a first embodiment of the present technology.
Figure 2:
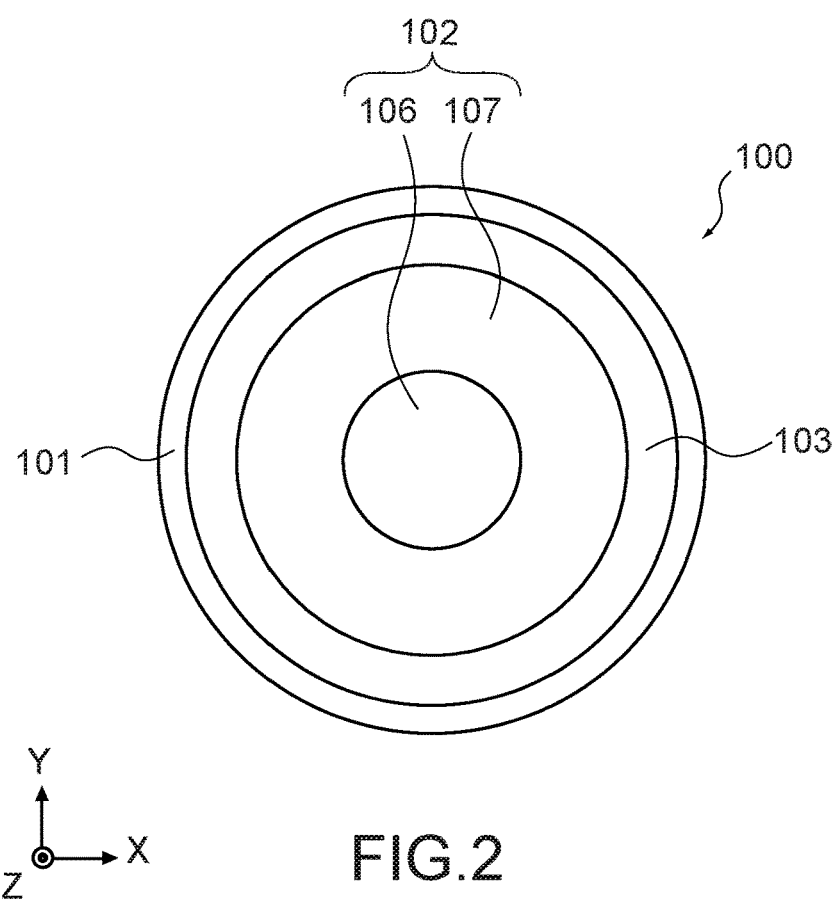
FIG. 2 A plan view of the tactile presentation apparatus.

FIG. 1 is a cross-sectional view of a tactile presentation apparatus 100 according to the present embodiment. FIG. 2 is a plan view of the tactile presentation apparatus 100. It should be noted that three directions are an X direction, a Y direction, and a Z direction orthogonal to one another in the present disclosure. As shown in FIGS. 1 and 2, the tactile presentation apparatus 100 includes a retaining portion 101, a contact portion 102, a peripheral portion 103, a first driving portion 104, and a second driving portion 105.

The retaining portion 101 supports the contact portion 102 and the peripheral portion 103. The retaining portion 101 has a bottom portion 101a and a side wall portion 101b as shown in FIG. 1. The bottom portion 101a has a bottom surface 101c in a flat plate shape parallel to an X-Y plane. The side wall portion 101b is provided in a direction perpendicular to the bottom surface 101c from a peripheral edge of the bottom surface 101c. The side wall portion 101b has a tubular shape surrounding the outer periphery of the peripheral portion 103 as shown in FIG. 2. The side wall portion 101b is held in contact with the peripheral portion 103. It should be noted that the side wall portion 101b is not essential. The material for the retaining portion 101 is not particularly limited, and the retaining portion 101 may be made of a synthetic resin or metal, for example.

Figure 3:
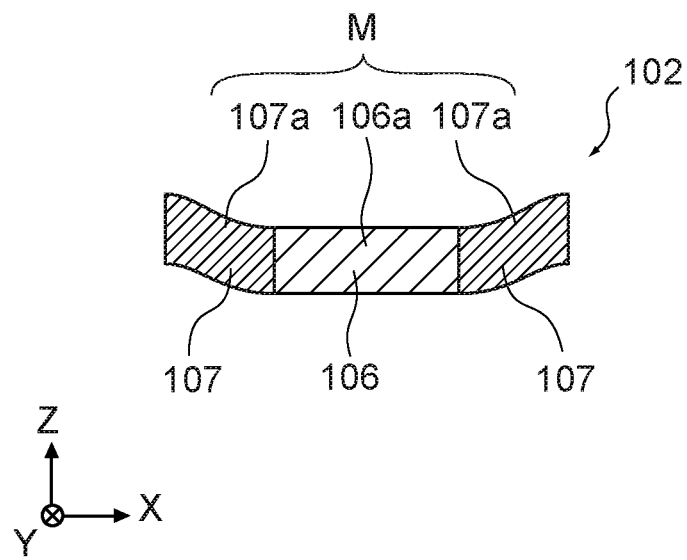
FIG. 3 A cross-sectional view of a contact portion provided in the tactile presentation apparatus.

The contact portion 102 is a portion touched by the contact object. FIG. 3 is a cross-sectional view showing the contact portion 102. The contact portion 102 as shown in the figure includes a central portion 106 and a connection portion 107.

The central portion 106 has a first contact surface 106a that is a surface opposite to the bottom surface 101c. The first contact surface 106a may be a flat surface parallel to the X-Y plane. However, the first contact surface 106a may be a curved surface. As shown in FIG. 2, the central portion 106 may have a circular shape as viewed in the Z direction. The first driving portion 104 drives the central portion 106 as will be described later. The material for the central portion 106 is not particularly limited, and may be a synthetic resin or metal, for example.

The connection portion 107 connects the central portion 106 and the peripheral portion 103. The connection portion 107 has a second contact surface 107a that is a surface opposite to the bottom surface 101c. The second contact surface 107a is a surface continuous with the first contact surface 106a. The boundary between the first contact surface 106a and the second contact surface 107a has no step, and the first contact surface 106a and the second contact surface 107a are smoothly connected. Hereinafter, the first contact surface 106a and the second contact surface 107a will be jointly referred to as a contact surface M. As shown in FIG. 2, the connection portion 107 may have an annular shape surrounding the outer periphery of the central portion 106 as viewed in the Z direction. The connection portion 107 may be flexible and made of, for example, a synthetic resin or cloth. In particular, the connection portion 107 is favorably made of an elastically deformable material such as elastomer.

It should be noted that in order to distinguish the first contact surface 106a from the second contact surface 107a, the central portion 106 may have properties different from those of the connection portion 107. Specifically, the first contact surface 106a and the second contact surface 107a may differ in appearance (e.g., color and reflection properties) or may differ in shape (e.g., as protruding and depressed shapes). Additionally, the first contact surface 106a and the second contact surface 107a may differ in surface properties (e.g., micro-shape and friction coefficient).

As shown in FIG. 1, the peripheral portion 103 sandwiches the contact portion 102 in a cross-portion parallel to the Z direction and connected to the central portion 106 through the connection portion 107. A surface of the peripheral portion 103, which is located opposite to the bottom surface 101c, will be referred to as a surface 103a. As shown in FIG. 2, the peripheral portion 103 may have an annular shape surrounding the connection portion 107 as viewed in the Z direction. The second driving portion 105 drives the peripheral portion 103 as will be described later.

Figure 4:
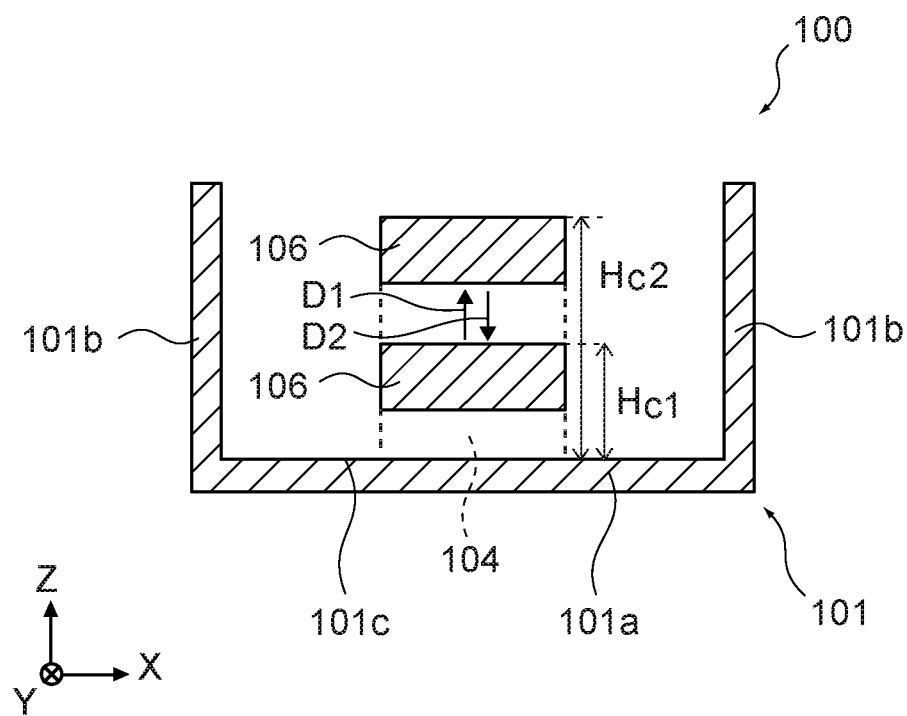
FIG. 4 A schematic diagram showing a change in height of a central portion by a first driving portion provided in the tactile presentation apparatus.

The first driving portion 104 drives the central portion 106 to change a height of the central portion 106 from the retaining portion 101 and a press force to the central portion 106. FIG. 4 is a schematic diagram showing a change in height of the central portion 106. As shown in the figure, the first driving portion 104 moves the central portion 106 in a direction in which the central portion 106 gets away from the retaining portion 101 and a direction in which the central portion 106 gets closer to the retaining portion 101. Hereinafter, the direction (positive Z direction) in which the central portion 106 gets away from the retaining portion 101 will be referred to as a first direction D1 and the direction (negative Z direction) in which the central portion 106 gets closer to the retaining portion 101 will be referred to as a second direction D2.

Moreover, the height of the central portion 106 from the retaining portion 101 is denoted by Hc. As shown in FIG. 4, the height of the central portion 106 located closer to the retaining portion 101 will be referred to as a height Hc1 and the height of the central portion 106 located away from the retaining portion 101 will be referred to as a height Hc2. The first driving portion 104 thus changes the height of the central portion 106 from the retaining portion 101 in the first direction D1 and the second direction D2.

Figure 5:
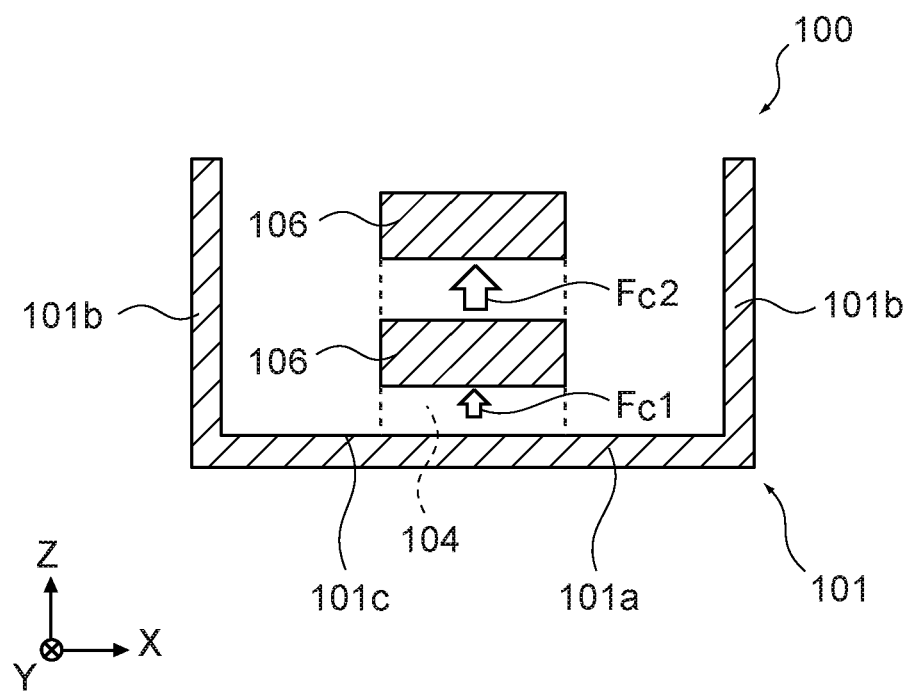
FIG. 5 A schematic diagram showing a change in a press force to the central portion by the first driving portion.

FIG. 5 is a schematic diagram showing a change in press force to the central portion 106. Hereinafter, the press force to the central portion 106 in the first direction D1 by the first driving portion 104 will be referred to as a press force Fc. As shown in FIG. 5, the press force to the central portion 106 in the first direction D1 when the height of the central portion 106 is lower will be referred to as a press force Fc1. Moreover, the press force to the central portion 106 in the first direction D1 when the height of the central portion 106 is higher will be referred to as a press force Fc2. It should be noted that the press force Fc when no object is in contact with the central portion 106 balances a resistive force from a sealing film or spring, for example, which will be described later, and the central portion 106 is still. Moreover, the press force Fc when a contact object (e.g., user's finger) presses the central portion 106 balances the resistive force and a press force from the contact object, and the central portion 106 is still.

Figure 6:
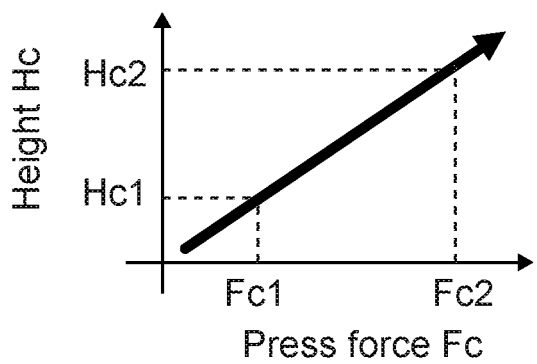
FIG. 6 A graph showing a correlation between the height of the central portion and the press force by the first driving portion.

FIG. 6 is a graph showing an example of a relationship between the height Hc of the central portion 106 from the retaining portion 101 and the press force Fc to the central portion 106. As shown in the figure, the press force Fc changes in accordance with the height Hc and the height Hc and the press force Fc have a constant correlation. It should be noted that although the correlation shown in FIG. 6 is a positive correlation in which the press force Fc increases as the height Hc increases, it may be a negative correlation in which the press force Fc decreases as the height Hc increases. In this way, the first driving portion 104 changes the press force Fc to the central portion 106 in accordance with the height Hc of the central portion 106.

Figure 7A:
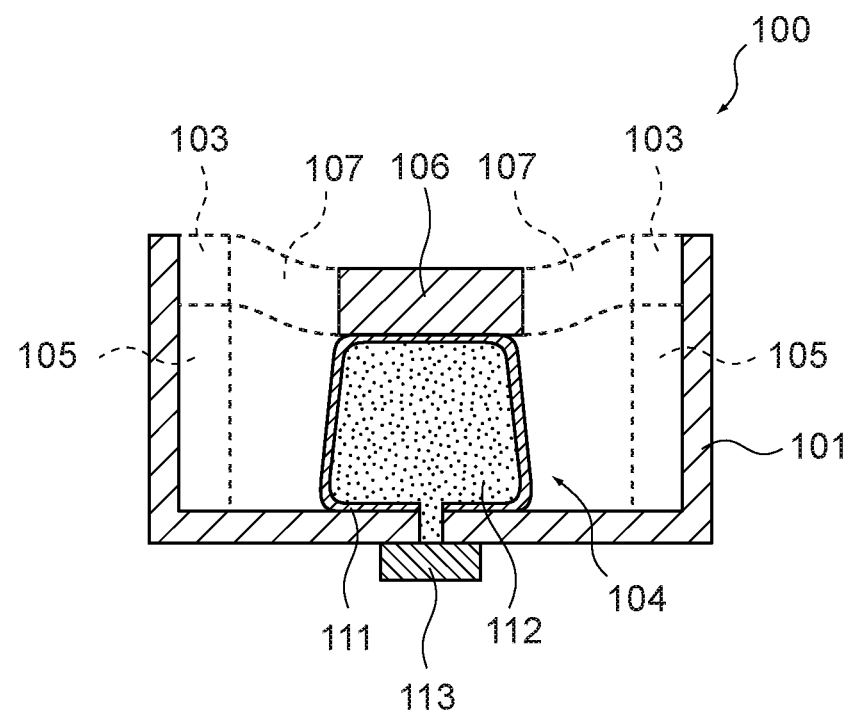
FIGS. 7A and 7B A schematic diagram showing a specific configuration of the first driving portion.
Figure 7B:
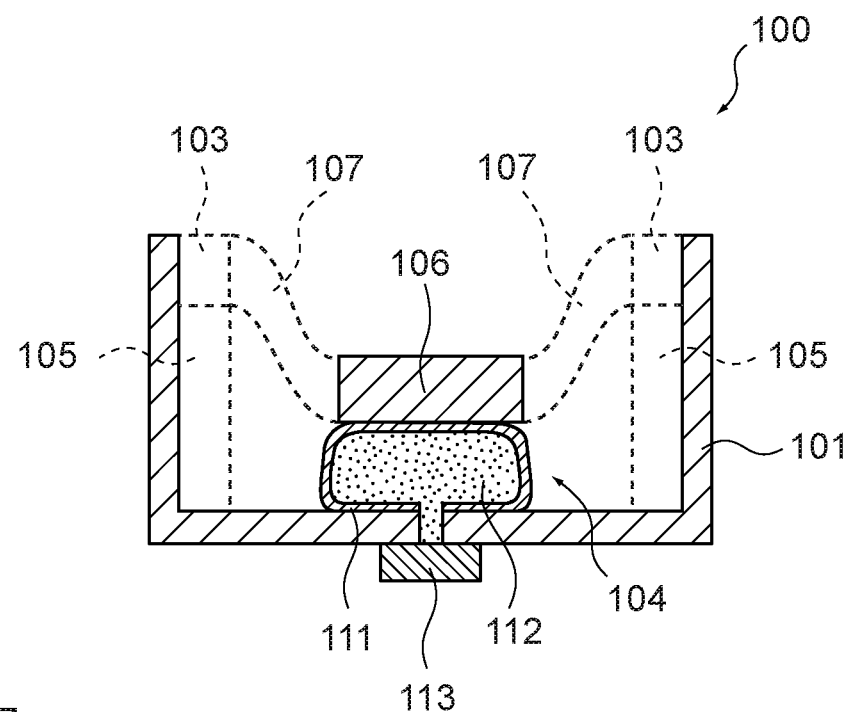

FIGS. 7A and 7B are schematic diagrams showing a specific configuration example of the first driving portion 104. As shown in the figure, the first driving portion 104 may be a fluid control mechanism including a sealing film 111, a fluid 112, and a first driving source 113. The first driving source 113 is a fluid control apparatus capable of fluid control, such as a pump. The first driving source 113 controls the amount and pressure of the fluid 112 in the sealing film 111. This causes the sealing film 111 to expand or contract to drive the central portion 106 as shown in FIGS. 7A and 7B. It should be noted that the fluid 112 may be the air, a nitrogen gas, water, a magnetorheological fluid, or an electrorheological (ER) fluid, for example.

Moreover, the first driving portion 104 is not limited to such a fluid control mechanism, and only needs to change the height of the central portion 106 and the press force to the central portion 106 while achieving the correlation between them. For example, the first driving portion 104 may be a drive mechanism using a dielectric elastomer, a drive mechanism combining a motor and a spring, or a drive mechanism combining a motor and an elastic body. For example, a drive mechanism using a fluid pressure or the like can achieve the positive correlation of the central portion 106 as shown in FIG. 6. For example, a drive mechanism using a spring or the like can achieve the negative correlation of the central portion 106 as shown in FIG. 6.

Figure 8:
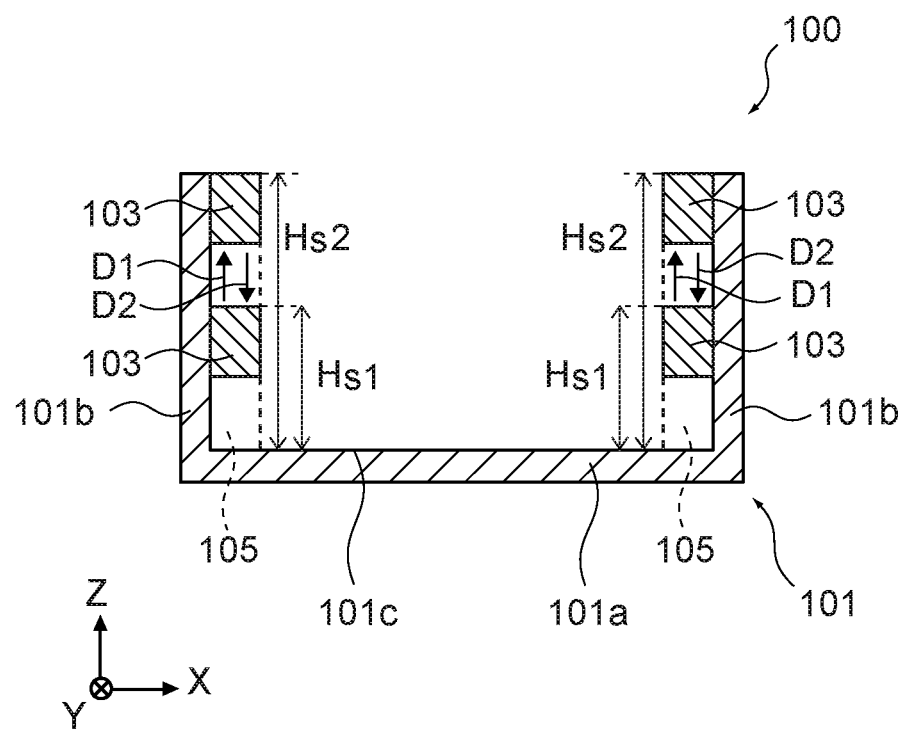
FIG. 8 A schematic diagram showing a change in a height of a peripheral portion by a second driving portion provided in the tactile presentation apparatus.

The second driving portion 105 drives the peripheral portion 103 to change a height of the peripheral portion 103 from the retaining portion 101 and a press force to the peripheral portion 103. FIG. 8 is a schematic diagram showing a change in height of the peripheral portion 103. As shown in the figure, the second driving portion 105 moves the peripheral portion 103 in a direction in which the peripheral portion 103 gets away from the retaining portion 101 and a direction in which the peripheral portion 103 gets closer to the retaining portion 101. Specifically, as shown in the figure, the second driving portion 105 moves the peripheral portion 103 in the first direction D1 (positive Z direction) and the second direction D2 (negative Z direction).

Hereinafter, the height of the peripheral portion 103 from the retaining portion 101 is denoted by Hs. As shown in FIG. 8, the height of the peripheral portion 103 located closer to the retaining portion 101 will be referred to as a height Hs' and the height of the peripheral portion 103 located away from the retaining portion 101 will be referred to as a height Hs2. The second driving portion 105 thus changes the height of the peripheral portion 103 from the retaining portion 101 in the first direction D1 and the second direction D2.

Figure 9:
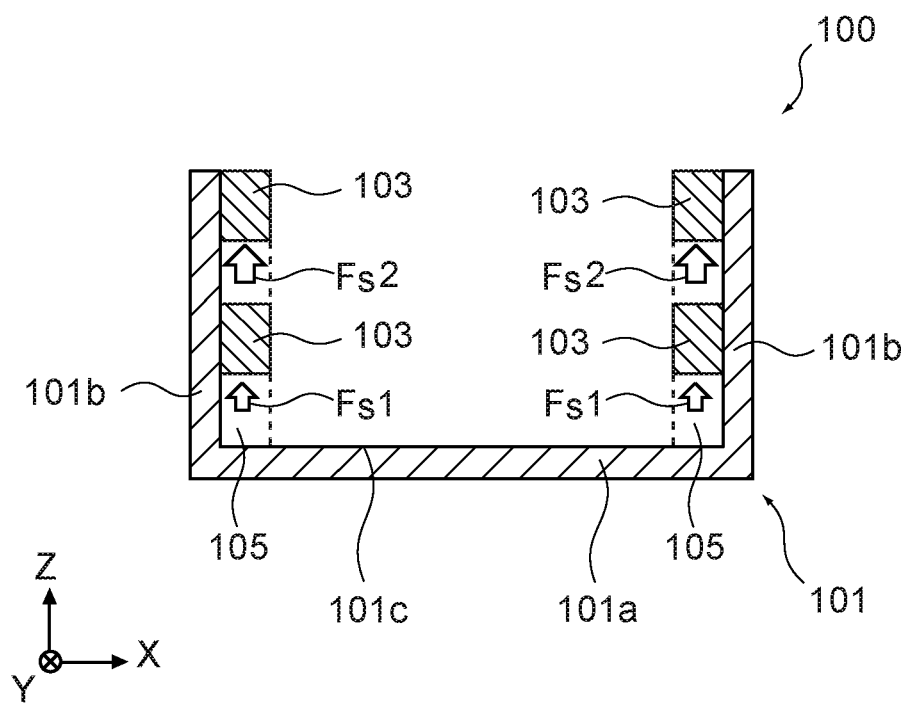
FIG. 9 A schematic diagram showing a change in a press force to the peripheral portion by the second driving portion.

FIG. 9 is a schematic diagram showing a change in press force to the peripheral portion 103. Hereinafter, the press force to the peripheral portion 103 in the first direction D1 by the second driving portion 105 will be referred to as a press force Fs. As shown in FIG. 9, the press force to the peripheral portion 103 in the first direction D1 when the height of the peripheral portion 103 is lower will be referred to as a press force Fs1. Moreover, the press force to the peripheral portion 103 in the first direction D1 when the height of the peripheral portion 103 is higher will be referred to as a press force Fs2. It should be noted that the press force Fs balances a resistive force from the sealing film or spring, which will be described later, and the peripheral portion 103 is still.

Figure 10:
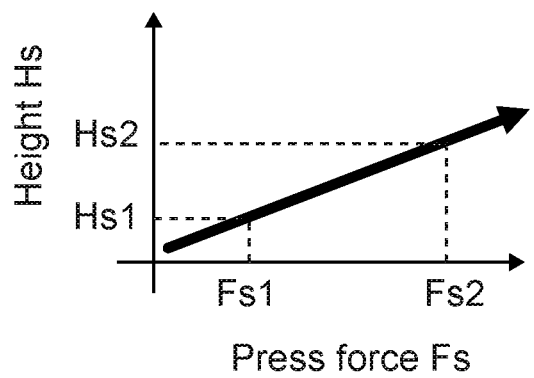
FIG. 10 A graph showing a correlation between the height of the peripheral portion and the press force by the second driving portion.

FIG. 10 is a graph showing an example of a relationship between the height Hs of the peripheral portion 103 from the retaining portion 101 and the press force Fs to the peripheral portion 103. As shown in the figure, the press force Fs changes in accordance with the height Hs and the height Hs and the press force Fs have a constant correlation. It should be noted that although the correlation shown in FIG. 10 is a positive correlation in which the press force Fs increases as the height Hs increases, it may be a negative correlation in which the press force Fs decreases as the height Hs increases. In this way, the second driving portion 105 changes the press force Fs to the peripheral portion 103 in accordance with the height Hs of the peripheral portion 103.

Figure 11A:
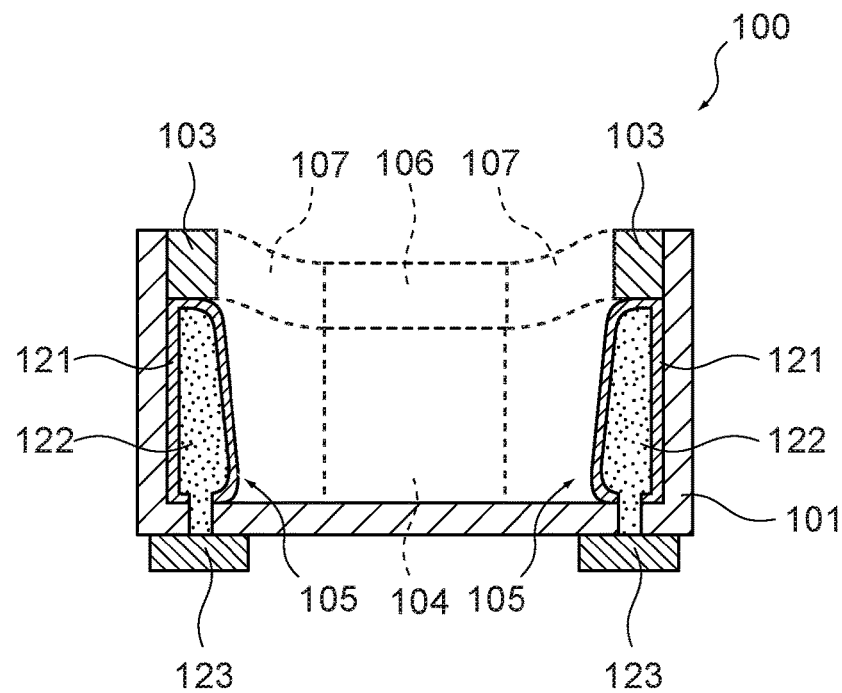
FIGS. 11A and 11B A schematic diagram showing a specific configuration of the second driving portion.
Figure 11B:
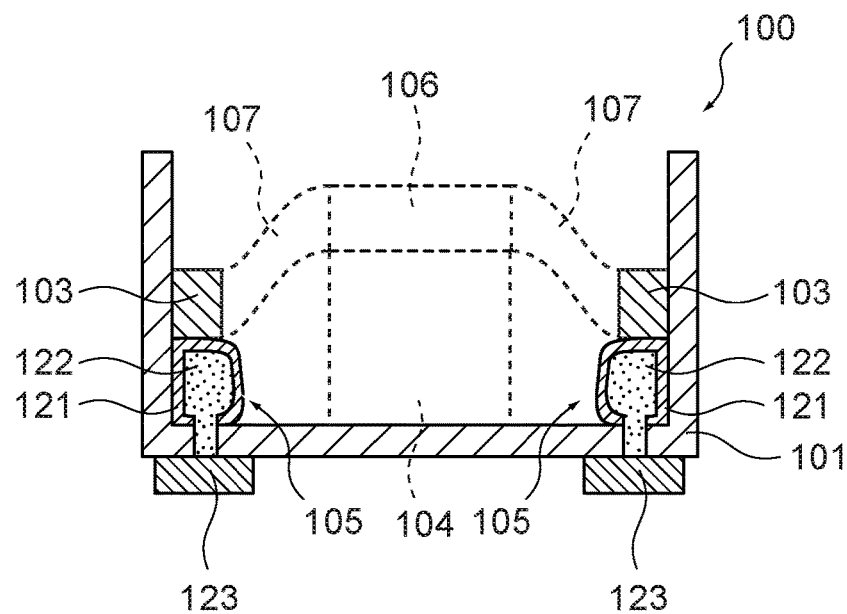

FIGS. 11A and 11B are schematic diagrams showing a specific configuration example of the second driving portion

105. As shown in the figure, the second driving portion 105 may be a fluid control mechanism including a sealing film 121, a fluid 122, and a second driving source 123. The second driving portion 105 is a fluid control apparatus capable of fluid control, such as a pump. The second driving portion 105 controls the amount and pressure of the fluid 122 in the sealing film 121. This causes the sealing film 121 to expand or contract to drive the peripheral portion 103 as shown in FIGS. 11A and 11B. It should be noted that the fluid 122 may be the air, a nitrogen gas, water, a magnetorheological fluid, or an electrorheological (ER) fluid, for example.

Moreover, the second driving portion 105 is not limited to such a fluid control apparatus, and only needs to change the height of the peripheral portion 103 and the press force to the peripheral portion 103 while achieving the correlation between them. For example, the second driving portion 105 may be a drive mechanism using a dielectric elastomer, a drive mechanism combining a motor and a spring, or a drive mechanism combining a motor and an elastic body. For example, a drive mechanism using a fluid pressure or the like can achieve the positive correlation of the peripheral portion 103 as shown in FIG. 10. For example, a drive mechanism using a spring or the like can achieve the negative correlation of the peripheral portion 103 as shown in FIG. 10.

It should be noted that the first driving portion 104 and the second driving portion 105 may be the same kind of drive mechanisms or may be different kinds of drive mechanisms. For example, either one of the first driving portion 104 and the second driving portion 105 may be a fluid control mechanism and the other may be another drive mechanism or both may be fluid control mechanisms. Moreover, although the correlation relationship between the height Hc of the central portion 106 and the press force Fc (FIG. 6) and the correlation relationship between the height Hs of the peripheral portion 103 and the press force Fs (FIG. 10) may be the same or may be different, they are favorably different as will be described later.

Operation of Tactile Presentation Apparatus

An operation of the tactile presentation apparatus 100 will be described. FIGS. 12A, 12B. 12C, 13A, 13B. 13C, 14A. 14B, and 14C are schematic diagrams showing the operation of the tactile presentation apparatus 100. The tactile presentation apparatus 100 is capable of changing each of the height Hc of the central portion 106 and the height Hs of the peripheral portion 103 as described above.

FIGS. 12A, 12B, and 12C are schematic diagrams showing changes in height of the central portion 106. FIG. 12A shows a state in which the central portion 106 and the peripheral portion 103 are both higher. Lowering the height of the central portion 106 from this state as shown in FIGS. 12B and 12C cause the connection portion 107 to deform following the central portion 106. Accordingly, the contact surface M forms a concave shape. Moreover, increasing the height of the central portion 106 from the state in FIG. 12C can provide a state in FIGS. 12B and 12A.

Figure 13A:
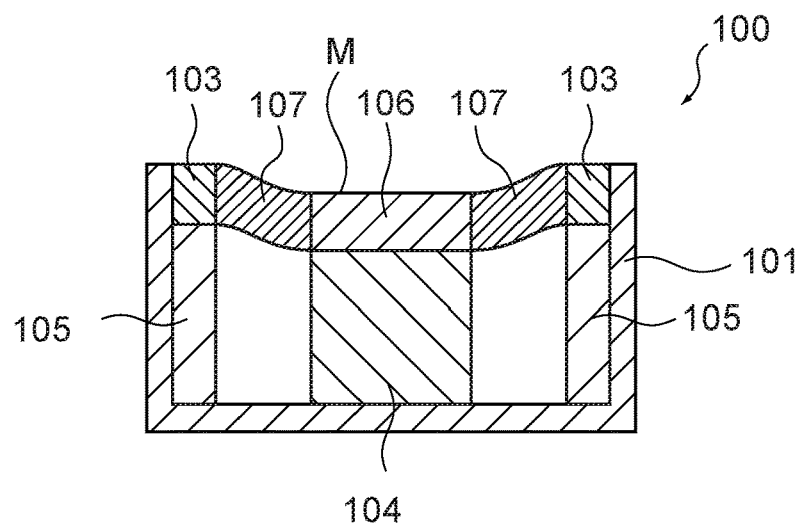
FIGS. 13A, 13B, and 13C A schematic diagram showing an operation of the tactile presentation apparatus.
Figure 13B:
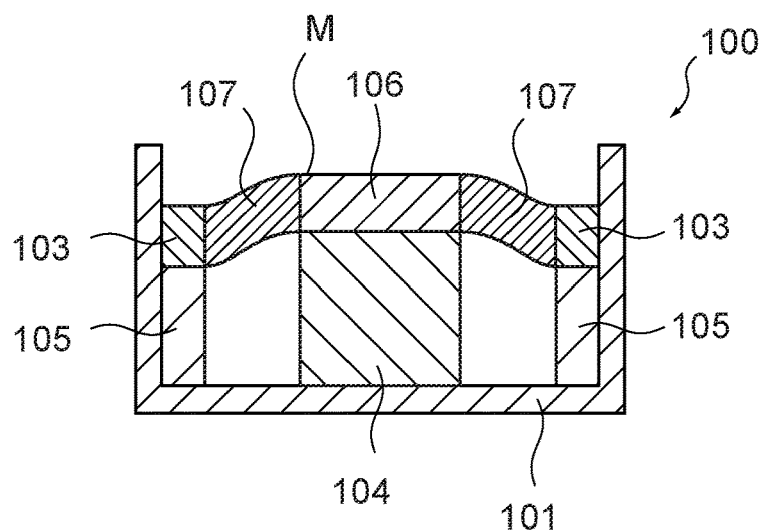
Figure 13C:
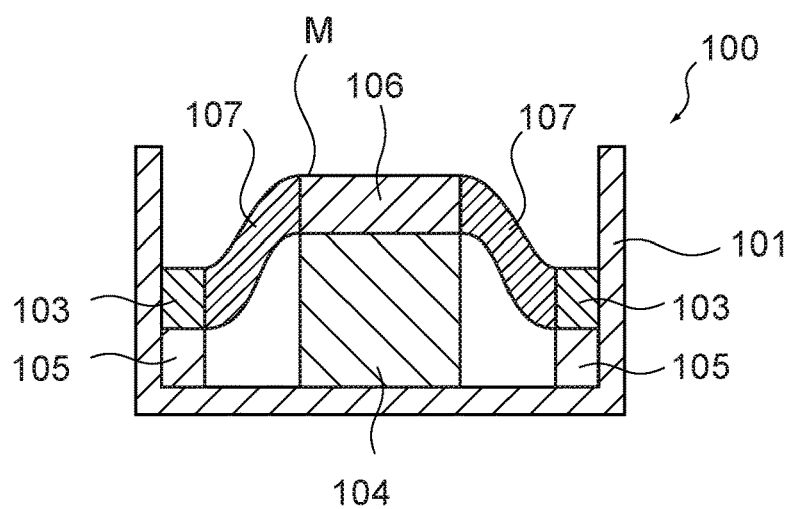

FIGS. 13A, 13B, and 13C are schematic diagrams showing changes in height of the peripheral portion 103. FIG. 13A shows a state in which the central portion 106 and the peripheral portion 103 are both higher. Lowering the height of the peripheral portion 103 as shown in FIGS. 13B and 13C from this state causes the connection portion 107 to deform following the central portion 106. Accordingly, the contact surface M forms a convex shape. Moreover, increasing the height of the peripheral portion 103 from the state in FIG. 13C can provide a state in FIGS. 13B and 13A.

Figure 14A:
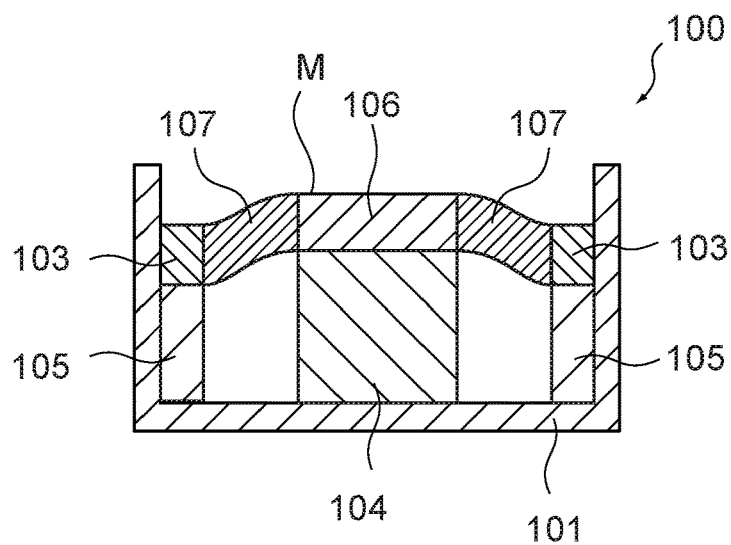
FIGS. 14A, 14B, and 14C A schematic diagram showing an operation of the tactile presentation apparatus.
Figure 14B:
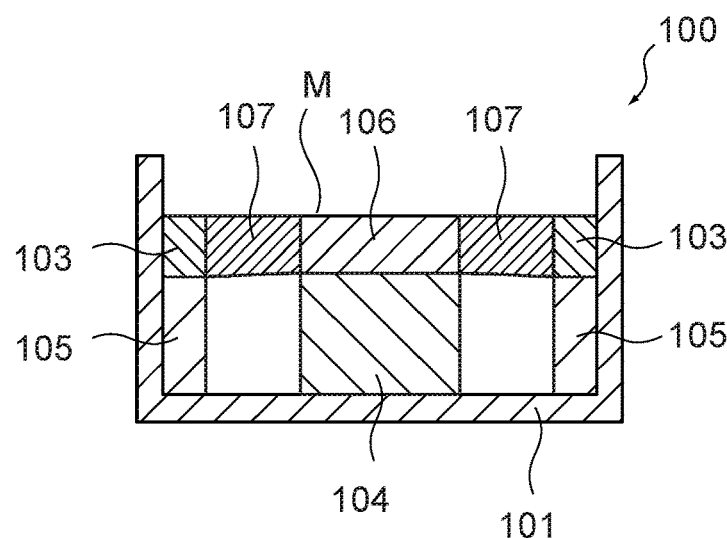
Figure 14C:
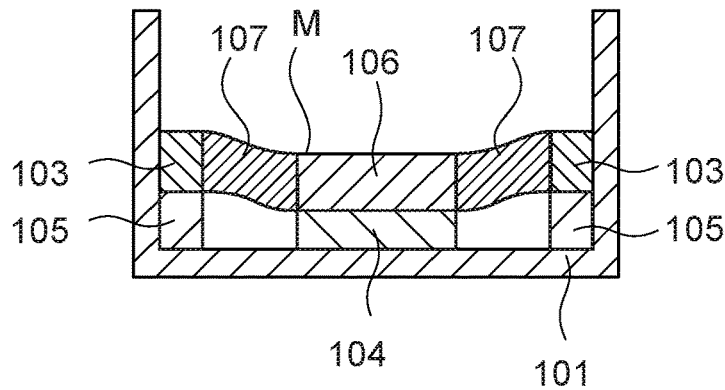

FIGS. 14A, 14B, and 14C are schematic diagrams showing changes in height of the peripheral portion 103 and the central portion 106. As shown in FIGS. 14A, 14B, and 14C, the tactile presentation apparatus 100 is also capable of changing both the heights of the peripheral portion 103 and the central portion 106. For example, as shown in FIG. 14B, the tactile presentation apparatus 100 may make the contact surface M flat. Moreover, the tactile presentation apparatus 100 may make the contact surface M in various shapes other than various states shown in FIGS. 12A. 12B, 12C, 13A, 13B, 13C, 14A, 14B, and 14C by independently changing each of the heights of the peripheral portion 103 and the central portion 106.

In addition, the tactile presentation apparatus 100 is capable of changing each of the press force Fc to the central portion 106 and the press force Fs to the peripheral portion 103 as described above. The press force Fc has the correlation (FIG. 6) with the height Hc of the central portion 106 and the press force Fs has the correlation (FIG. 10) with the height Hs of the peripheral portion 103. Therefore, the heights of the central portion 106 and the peripheral portion 103 can determine the press force Fc and the press force Fs, respectively.

Figure 15A:
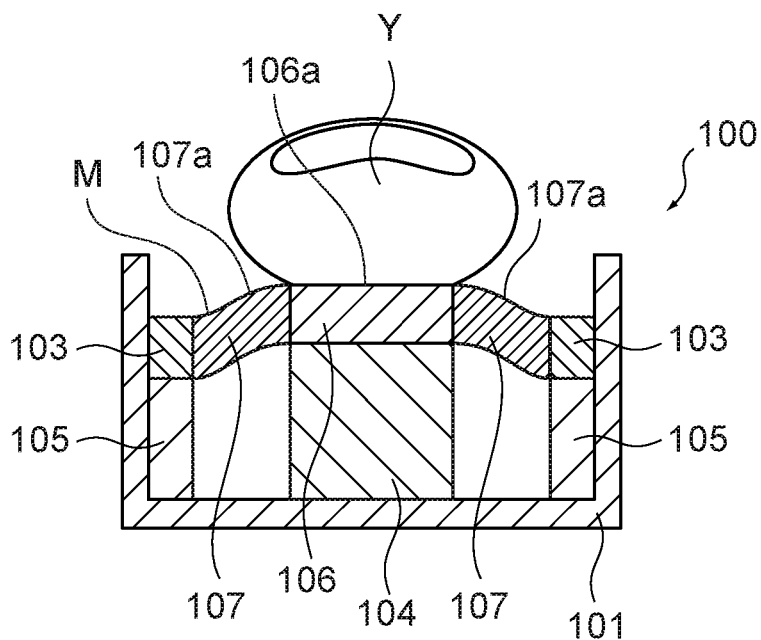
FIGS. 15A and 15B A schematic diagram showing a finger that touches a contact surface of the tactile presentation apparatus.
Figure 15B:
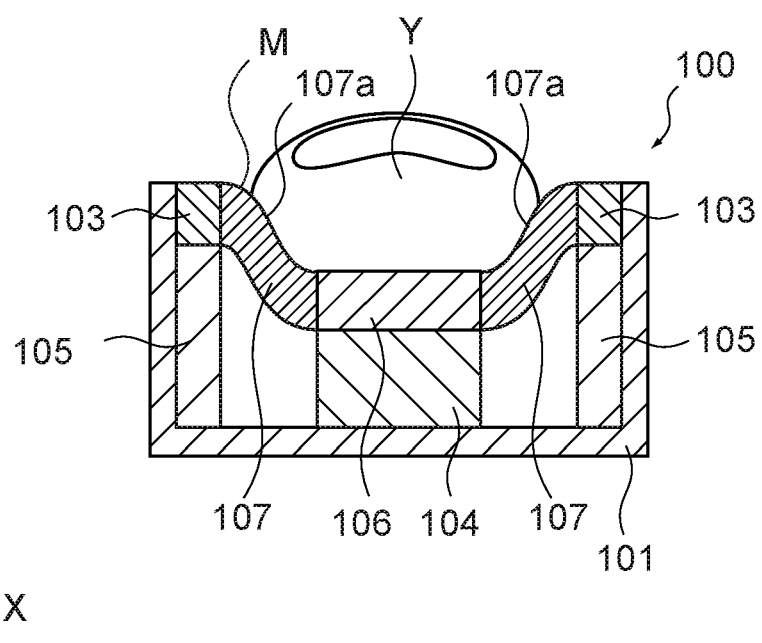

[Effects Given by Tactile Presentation Apparatus] Effects given By the tactile presentation apparatus 100 will be described. As described above, the tactile presentation apparatus 100 is capable of controlling the shape of the contact surface M by changing the heights of the peripheral portion 103 and the central portion 106. FIGS. 15A and 15B are schematic diagrams showing a user finger Y touching the contact surface M. As shown in FIGS. 15A and 15B, the tactile presentation apparatus 100 is capable of presenting the shape of the contact surface M and its change to the user touching the contact surface M and also capable of controlling a contact area of the contact surface M with the finger Y.

In addition, the tactile presentation apparatus 100 is capable of changing each of the press forces of the central portion 106 and the peripheral portion 103. FIGS. 16A and 16B are schematic diagrams showing the press force Fc to the central portion 106 and the press force Fs to the peripheral portion 103 and a pressure applied to the finger Y from the contact surface M. In FIGS. 16A and 16B, a pressure applied to the finger Y from the first contact surface 106*a* will be referred to as a pressure P1 and a pressure applied to the finger Y from the second contact surface 107*a* will be referred to as a pressure P2. As described above, the height Hc of the central portion 106 determines the press force Fc and the height Hs of the peripheral portion 103 determines the press force Fs. Therefore, the pressure P1 and the pressure P2 change in accordance with the shape of the contact surface M.

Accordingly, the sum of the heights of the central portion 106 and the peripheral portion 103 has a correlation with a reaction force from the contact portion 102 (the sum of the pressure P1 and the pressure P2) and a difference between the heights of the central portion 106 and the peripheral portion 103 has a correlation with the contact area. Therefore, the reaction force of the contact portion 102 (the sum of the pressure P1 and the pressure P2) can be changed while controlling the contact area of the contact surface M with the finger Y. Moreover, the height of the contact surface M from the retaining portion 101 can be changed while controlling the contact area of the contact surface M with the finger Y.

[Regarding Difference Between Correlations of Central Portion and Peripheral Portion]

As described above, in the tactile presentation apparatus 100, the first driving portion 104 achieves the constant correlation (see FIG. 6) between the height Hc of the central portion 106 and the press force Fc and the second driving portion 105 achieves the constant correlation (see FIG. 10) between the height Hs of the peripheral portion 103 and the press force Fs. Setting the correlation of the central portion 106 to be different from the correlation of the peripheral portion 103 can provide a uniform pressure distribution of the contact surface M.

Figure 17:
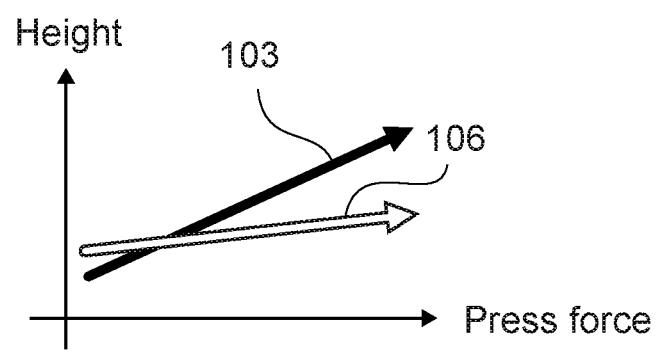
FIG. 17 A graph showing a correlation between the height from a retaining portion and the press force in each of the central portion and the peripheral portion provided in the tactile presentation apparatus.

FIG. 17 is a graph showing the correlation between the height Hc of the central portion 106 and the press force Fc and the correlation between the height Hc of the peripheral portion 103 and the press force Fc. As shown in the figure, the correlation of the central portion 106 and the correlation of the peripheral portion 103 have a difference in amount of change in height with respect to an amount of change in press force. Thus, the correlation of the central portion 106 differs from the correlation of the peripheral portion 103.

Figure 18:
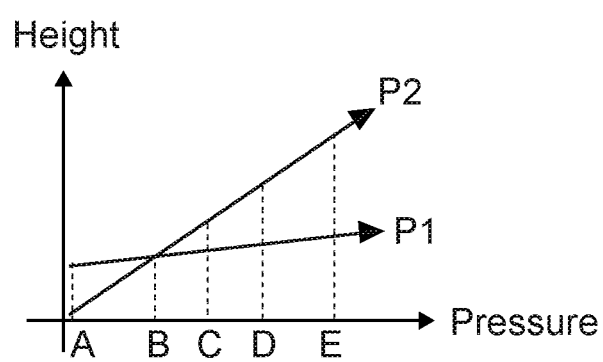
FIG. 18 A graph showing correlations of pressures from the first contact surface and the second contact surface with respect to the finger that touches the contact surface of the tactile presentation apparatus.

FIG. 18 is a graph showing changes of the pressure P1 and the pressure P2 in a case where the correlation of the central portion 106 differs from the correlation of the peripheral portion 103 as shown in FIG. 17. As shown in FIG. 18, the correlation of the pressure P1 also differs from the correlation of the pressure P2 in a case where the correlation of the central portion 106 differs from the correlation of the peripheral portion 103. FIGS. 19 to 23 are schematic diagrams showing changes of the pressure P1 and the pressure P2 on the finger Y.

Figure 19:
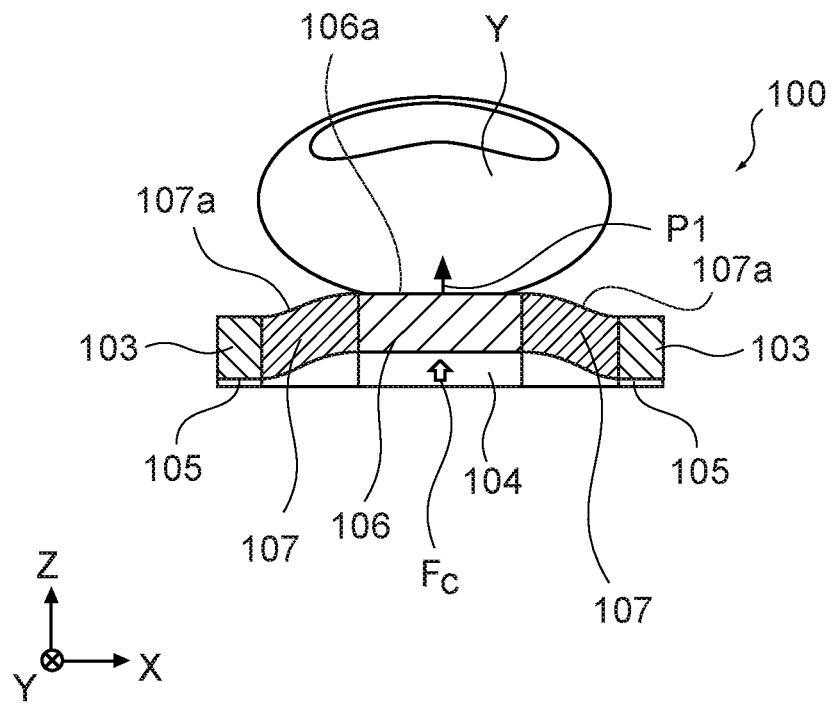
FIG. 19 A schematic diagram showing an operation of the tactile presentation apparatus in a state A in FIG. 18.
Figure 20:
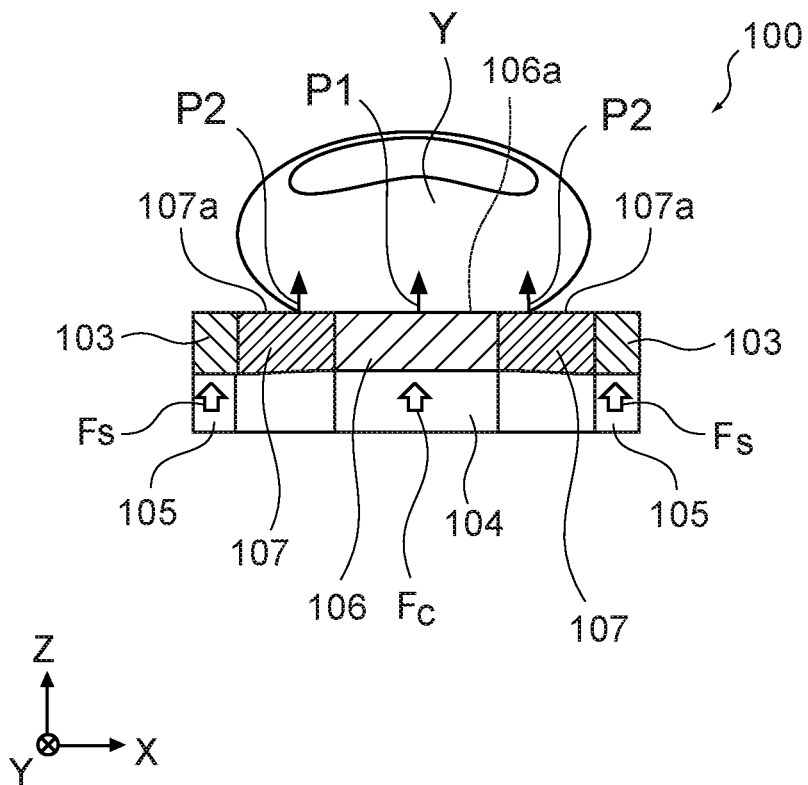
FIG. 20 A schematic diagram showing an operation of the tactile presentation apparatus in a state B in FIG. 18.
Figure 21:
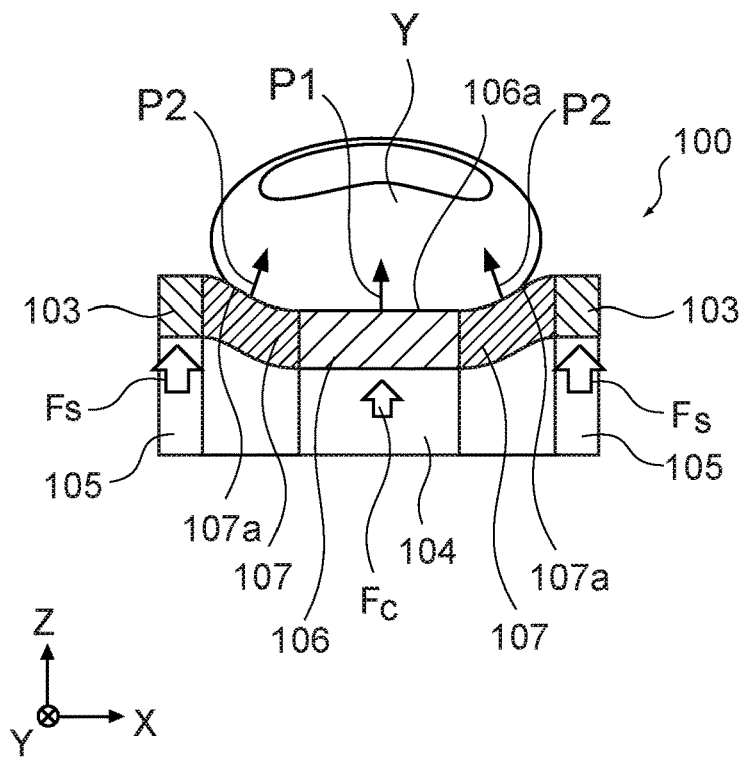
FIG. 21 A schematic diagram showing an operation of the tactile presentation apparatus in a state C in FIG. 18.
Figure 22:
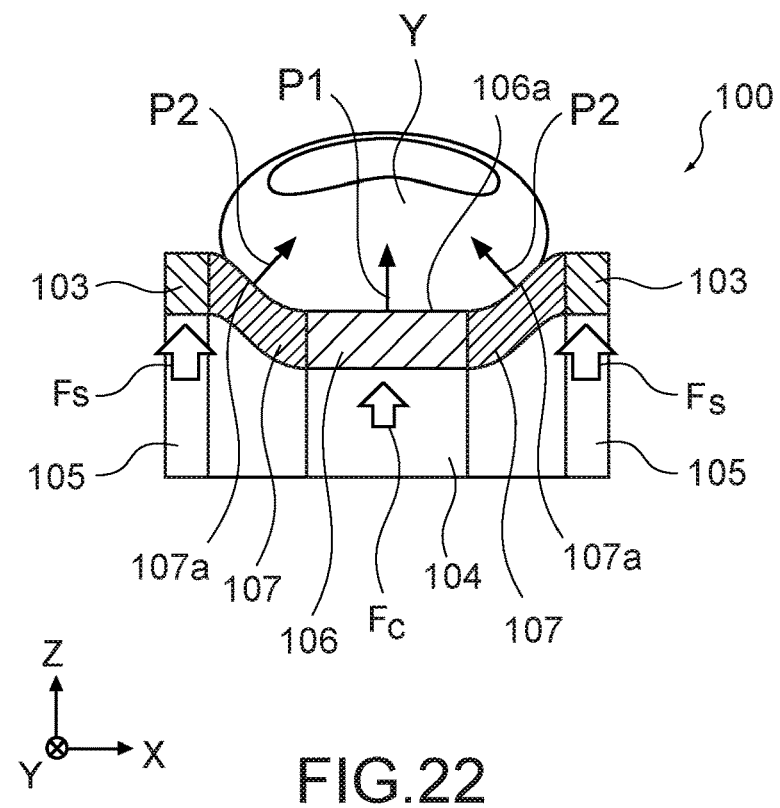
FIG. 22 A schematic diagram showing an operation of the tactile presentation apparatus in a state D in FIG. 18.
Figure 23:
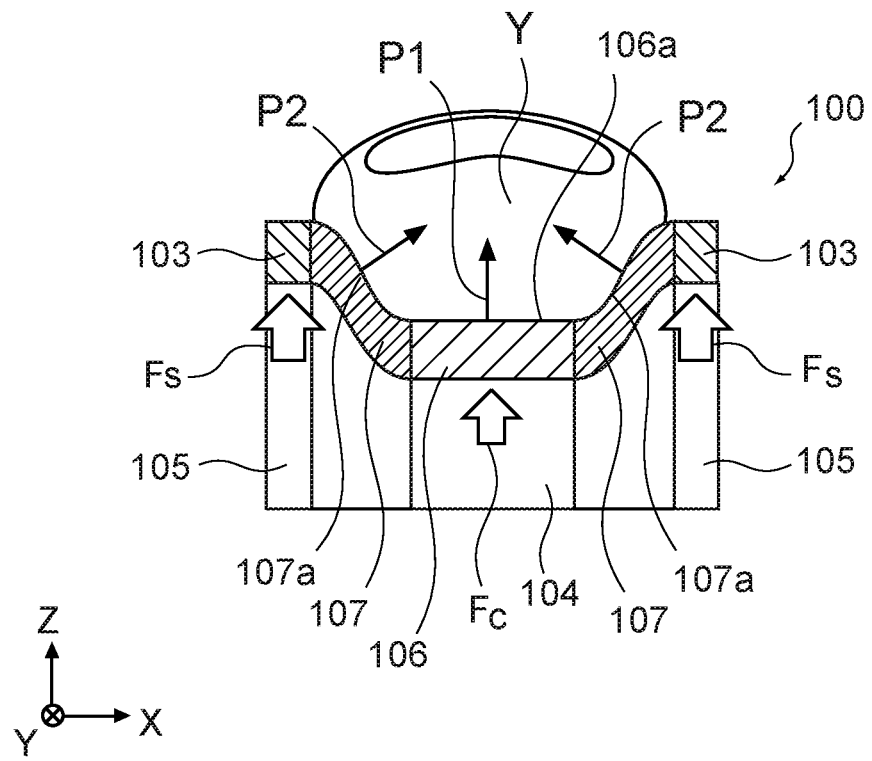
FIG. 23 A schematic diagram showing an operation of the tactile presentation apparatus in a state E in FIG. 18.

FIG. 19 shows the pressure P1 in a state A in FIG. 18 and FIG. 20 shows the pressure P1 and the pressure P2 in a state B in FIG. 19. Similarly, FIG. 21 shows the pressure P1 and the pressure P2 in a state C, FIG. 22 shows the pressure P1 and the pressure P2 in a state D, and FIG. 23 shows the pressure P1 and the pressure P2 in a state E. As shown in FIGS. 19 to 23, the pressure P1 and the pressure P2 change along with changes in heights of the central portion 106 and the peripheral portion 103 and the press forces (press force Fc and press force Fs), and the correlation of the pressure P1 differs from the correlation of the pressure P2.

Figure 24:
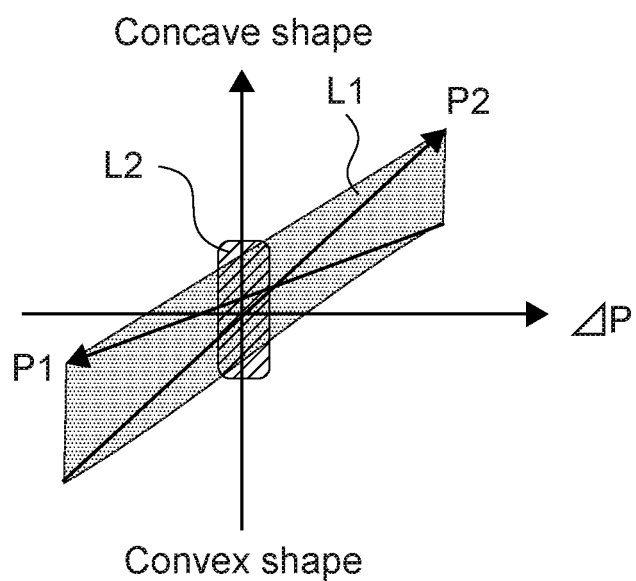
FIG. 24 A graph showing a relationship between a pressure difference and the shape of the contact surface in a case where the pressures from the first contact surface and the second contact surface have the correlations shown in FIG. 18 in the tactile presentation apparatus.

FIG. 24 is a graph showing a relationship between a pressure difference $\Delta P$ and the shape of the contact surface M in a case where the pressure P1 and the pressure P2 have the correlations shown in FIG. 18. The pressure difference $\Delta P$ is a difference between the pressure P2 and the pressure P1 (the pressure P2−the pressure P1). In the figure, a range L1 is a range of the shape of the contact surface M and the pressure difference $\Delta P$ that the tactile presentation apparatus 100 can present. Moreover, a range L2 is a range of the range L1 in which the pressure difference $\Delta P$ is smaller. Within the range L2, the shape of the contact surface M can be changed while making the pressure P1 and the pressure P2 equal.

Figure 25:
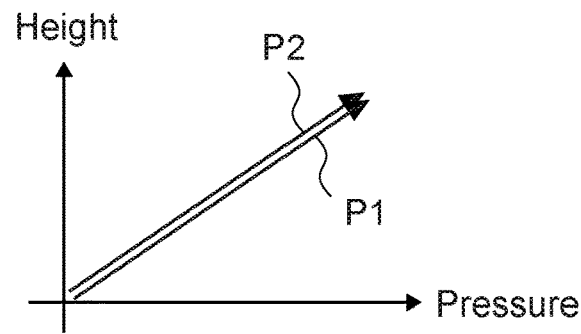
FIG. 25 A graph showing correlations of pressures from the first contact surface and the second contact surface with respect to the finger that touches the contact surface of the tactile presentation apparatus.
Figure 26:
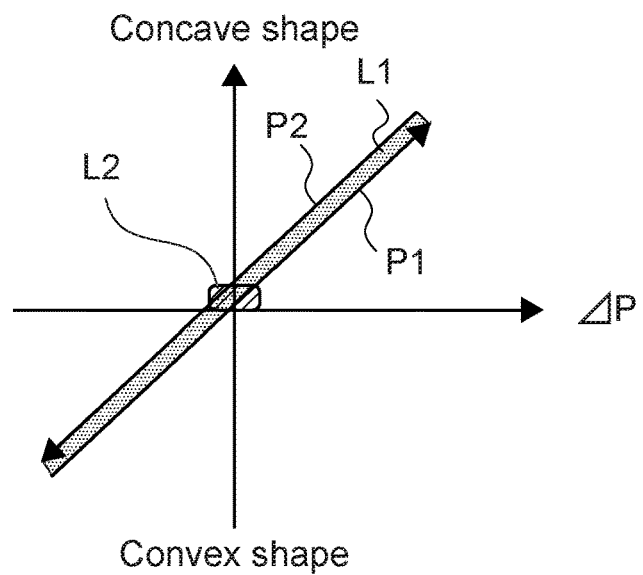
FIG. 26 A graph showing a relationship between a pressure difference and the shape of the contact surface in a case where the pressures from the first contact surface and the second contact surface have the correlations shown in FIG. 25 in the tactile presentation apparatus.

FIG. 25 is a graph showing changes of the pressure P1 and the pressure P2 in a case where the correlation of the pressure P1 is identical to the correlation of the pressure P2. FIG. 26 is a graph showing a relationship between the pressure difference $\Delta P$ (the pressure P2−the pressure P1) and the shape of the contact surface M in a case where the pressure P1 and the pressure P2 have the correlations shown in FIG. 25. Also in the figure, a range L1 is the range of the contact surface M and the pressure difference $\Delta P$ that the tactile presentation apparatus 100 can present. A range L2 is a range of the range L1 in which the pressure difference $\Delta P$ is smaller. In this case, the shape of the contact surface M can be hardly changed when attempting to make the pressure P1 and the pressure P2 equal. In this regards, the shape of the contact surface M can be changed in a constant range while making the pressure P1 and the pressure P2 equal as shown in FIG. 24 by setting the correlation of the central portion 106 to be different from the correlation of the peripheral portion 103 as shown in FIG. 17.

Figure 27:
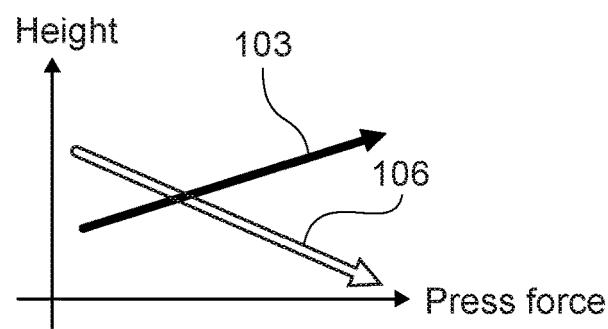
FIG. 27 A graph showing a correlation between the height from the retaining portion and the press force in each of the central portion and the peripheral portion provided in the tactile presentation apparatus.

It should be noted that FIG. 17 shows a case where the correlation between the height Hc of the central portion 106 and the press force Fc and the correlation between the height Hc of the peripheral portion 103 and the press force Fc are both positive correlations. However, at least any one of the correlation of the central portion 106 or the correlation of the peripheral portion 103 may be a negative correlation. FIG. 27 is a graph showing a relationship between the height and the press force in a case where the height Hc of the central portion 106 and the press force Fc have a negative correlation and the height Hs of the peripheral portion 103 and the press force Fs have a positive correlation.

Figure 28:
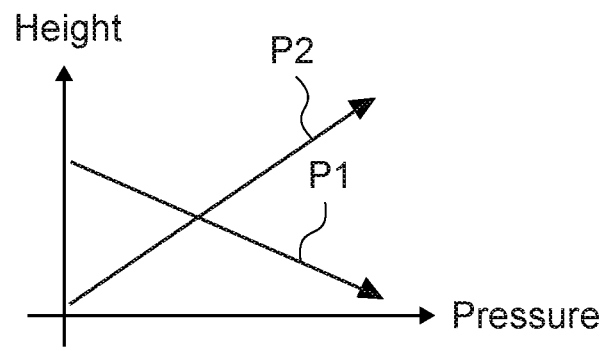
FIG. 28 A graph showing correlations of pressures from the first contact surface and the second contact surface with respect to the finger that touches the contact surface of the tactile presentation apparatus.
Figure 29:
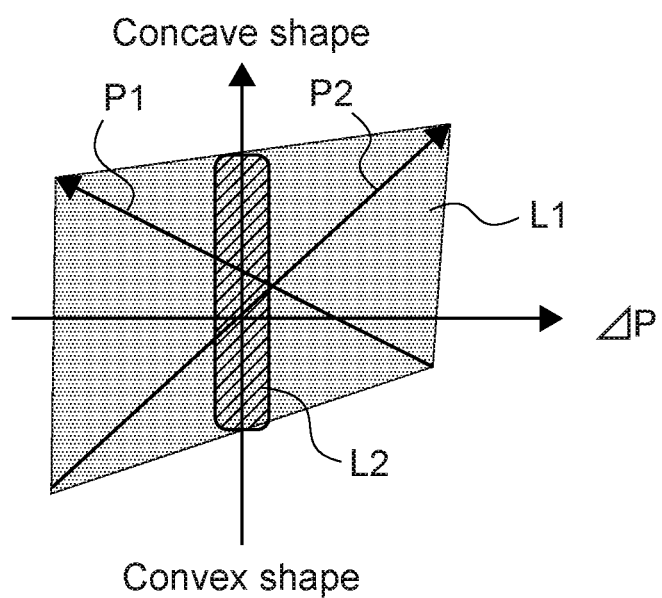
FIG. 29 A graph showing a relationship between a pressure difference and the shape of the contact surface in a case where the pressures from the first contact surface and the second contact surface have the correlations shown in FIG. 27 in the tactile presentation apparatus.

FIG. 28 is a graph showing changes of the pressure P1 and the pressure P2 in a case where the correlations of the central portion 106 and the peripheral portion 103 are the correlations shown in FIG. 27. Moreover, FIG. 29 is a graph showing a relationship between the pressure difference $\Delta P$ (the pressure P2−the pressure P1) and the shape of the contact surface M in a case where the pressure P1 and the pressure P2 have the correlations shown in FIG. 28. Also in the figure, a range L1 is a range of the contact surface M and the pressure difference $\Delta P$ that the tactile presentation apparatus 100 can present. A range L2 is a range of the range L1 in which the pressure difference $\Delta P$ is smaller. In this manner, the shape of the contact surface M can be changed in a constant range while making the pressure P1 and the pressure P2 equal also in a case where the central portion 106 has the negative correlation and the peripheral portion 103 has the positive correlation. The shape of the contact surface M can also be changed in a constant range while making the pressure P1 and the pressure P2 equal in a case where the central portion 106 has the positive correlation and the peripheral portion 103 has the negative correlation on the contrary.

Figure 30:
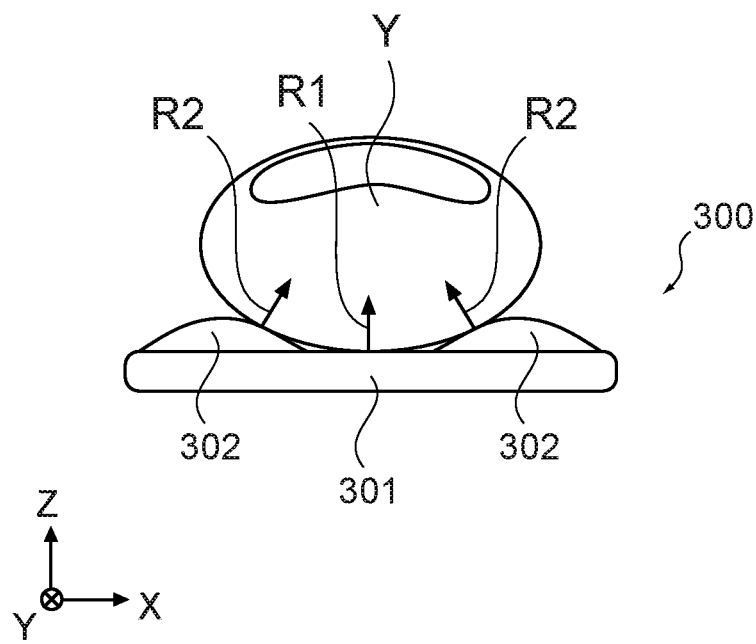
FIG. 30 A schematic diagram of a tactile presentation apparatus according to a comparative example.

FIG. 30 is a schematic diagram showing a tactile presentation apparatus 300 with a bulging portion 302 provided on a supporting portion 301 as a comparison. The bulging portion 302 is provided in a region that the periphery of the finger Y touches. The bulging portion 302 is configured to be capable of expanding and contracting due to an air pressure or the like. The bulging portion 302 is not provided in a region that the center of the finger Y touches and the central portion of the finger Y touches the supporting portion 301.

Figure 31:
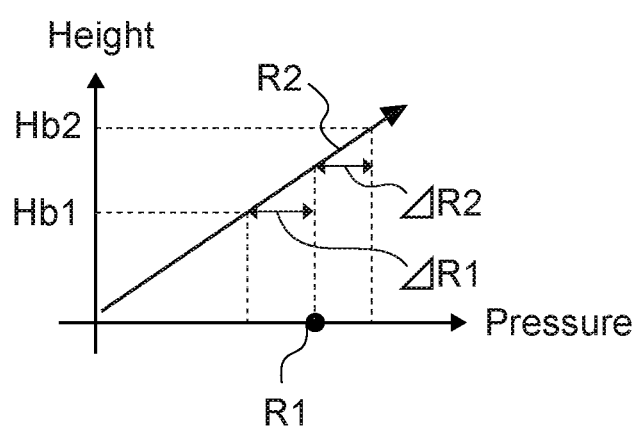
FIG. 31 A graph showing a correlation between a height of a contact surface and a pressure from the contact surface with respect to the finger that touches the contact surface of the tactile presentation apparatus according to the comparative example.

FIG. 31 is a schematic diagram showing changes of a pressure R1 applied to the finger Y from the supporting portion 301 and a pressure R2 applied to the finger Y from the bulging portion 302. The center of the finger Y receives a constant pressure R1 from the supporting portion 301 in accordance with a press force of the finger Y when the finger Y press the supporting portion 301 and the bulging portion 302. The internal pressure of the bulging portion 302 increases along with an increase in height of the bulging portion 302 when the bulging portion 302 expands. Therefore, the pressure R2 applied from the bulging portion 302 gradually increases.

Therefore, in FIG. 31, when the height of the bulging portion 302 is a height Hb1, the pressure R2 has a pressure difference $\Delta R1$ from the pressure R1. Moreover, when the height of the bulging portion 302 is a height Hb2, the pressure R2 has a pressure difference $\Delta R2$ from the pressure R1. Accordingly, the pressure applied from the supporting portion 301 is higher when the height (height Hb1) of the bulging portion 302 is lower, and the pressure applied from the bulging portion 302 is higher when the height (height Hb2) of the bulging portion 302 is higher. Therefore, the pressure applied to the finger Y is different between the center and the periphery in accordance with the shape of the bulging portion 302, and the pressure distribution is non-uniform. In this regards, in the tactile presentation apparatus 100 according to the present technology, the shape of the contact surface M can be changed while keeping the pressure distribution uniform as shown in FIGS. 24 and 29. A natural pressure distribution depending on the shape of the contact surface M can be presented to the user.

[Regarding Various Configurations of Tactile Presentation Apparatus]

The configuration of the tactile presentation apparatus 100 is not limited to the above configuration, and the following configuration may be employed.

(Regarding Connection portion)

Figure 32:
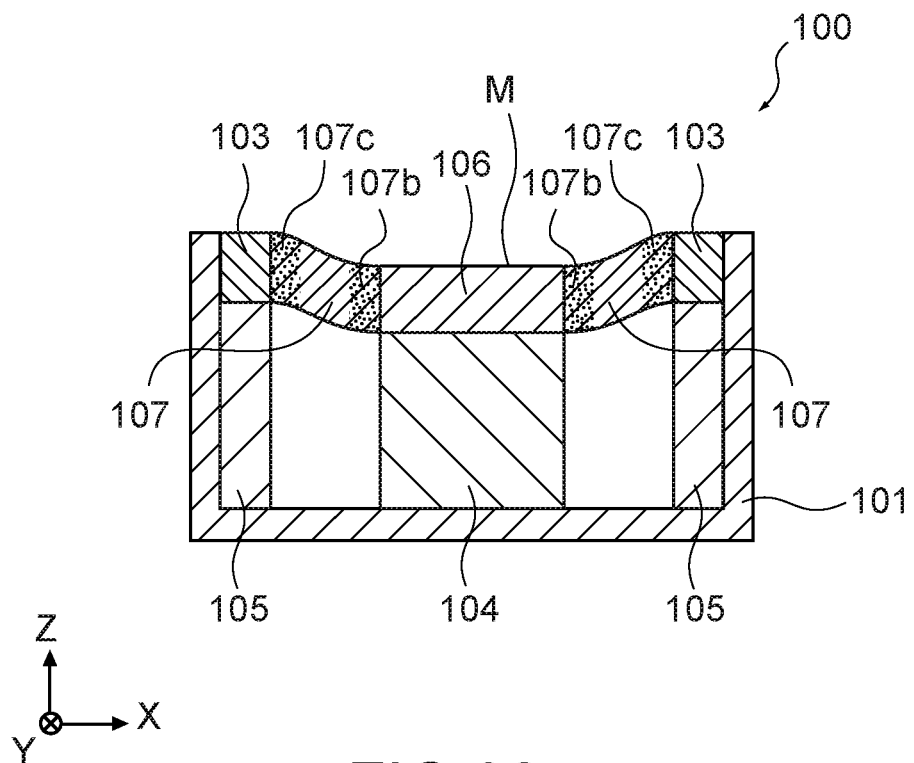
FIG. 32 A schematic diagram showing a portion where a connection portion has different hardness in the tactile presentation apparatus according to the first embodiment of the present technology.

FIG. 32 is a schematic diagram showing another configuration of the tactile presentation apparatus 100. As shown in FIG. 32, the connection portion 107 has a first portion 107b in the vicinity of the central portion 106 and a second portion 107c in the vicinity of the peripheral portion 103. Here, the first portion 107b and the second portion 107c can be different in hardness. It should be noted that the hardness of the connection portion 107 may be one defined as any physical value representing the hardness, such as shore hardness, Asker C, Young's modulus, and durometer.

Setting the first portion 107b and the second portion [107b] 107c to be different in hardness allows shape adjustment of the contact surface M. In particular, in a case where the first portion 107b has a higher hardness than the second portion 107c, the curvature of the contact surface M is smooth (without inflection point), and a natural contact sense can be achieved. Therefore, it is favorable. It should be noted that a portion of the connection portion 107 between the first portion 107b and the second portion 107c may have a middle hardness between the hardness of the first portion 107b and the hardness of the second portion 107c, and the hardness may change gradually or stepwisely between the first portion 107b and the second portion 107c.

Figure 33:
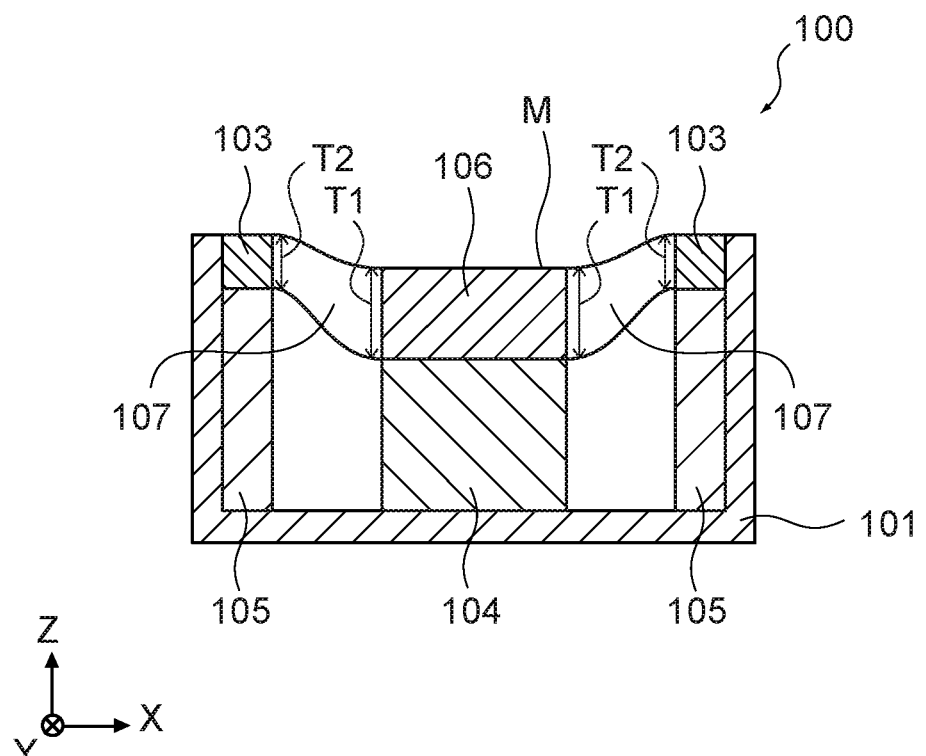
FIG. 33 A schematic diagram showing a thickness of the connection portion of the tactile presentation apparatus.
Figure 34:
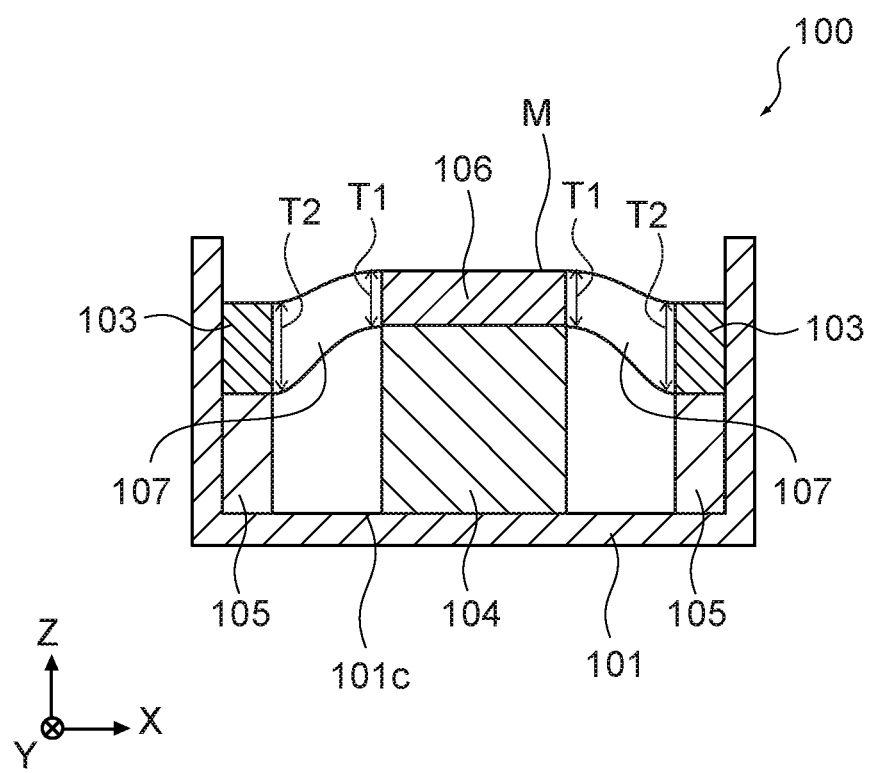
FIG. 34 A schematic diagram showing a thickness of the connection portion of the tactile presentation apparatus.

Moreover, as shown in FIGS. 33 and 34, the connection portion 107 may be different in thickness. Assuming that the thickness of the connection portion 107 in the vicinity of the central portion 106 is a thickness T1 and the thickness of the connection portion 107 in the vicinity of the peripheral portion 103 is a thickness T2 as shown in those figures, the thickness T1 and the thickness T2 can be set to be different. Accordingly, the shape of the contact surface M can be adjusted. In particular, in a case where the thickness T1 is larger than the thickness T2 as shown in FIG. 33, the curvature of the contact surface M is smooth (without inflection point), and a natural contact sense can be achieved. Therefore, it is favorable. Moreover, as shown in FIG. 34, the thickness T2 may be set to be larger than the thickness T1.

(Regarding Amount of Possible Movement of Peripheral Portion and Central Portion)

Figure 35:
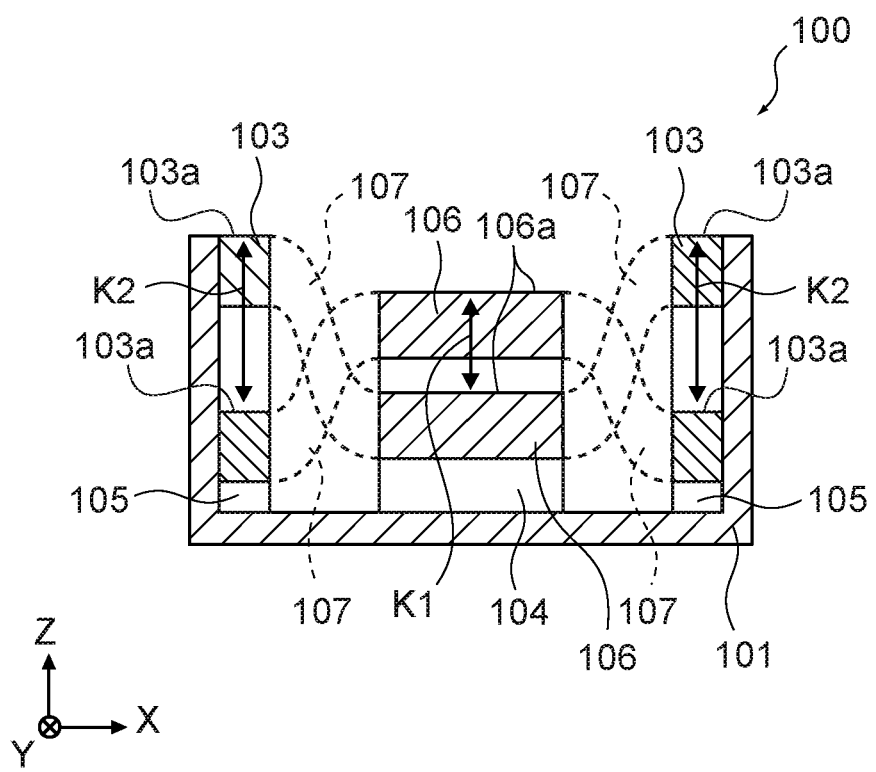
FIG. 35 A schematic diagram showing amounts of allowable movement of the central portion and the peripheral portion in the tactile presentation apparatus.
Figure 36:
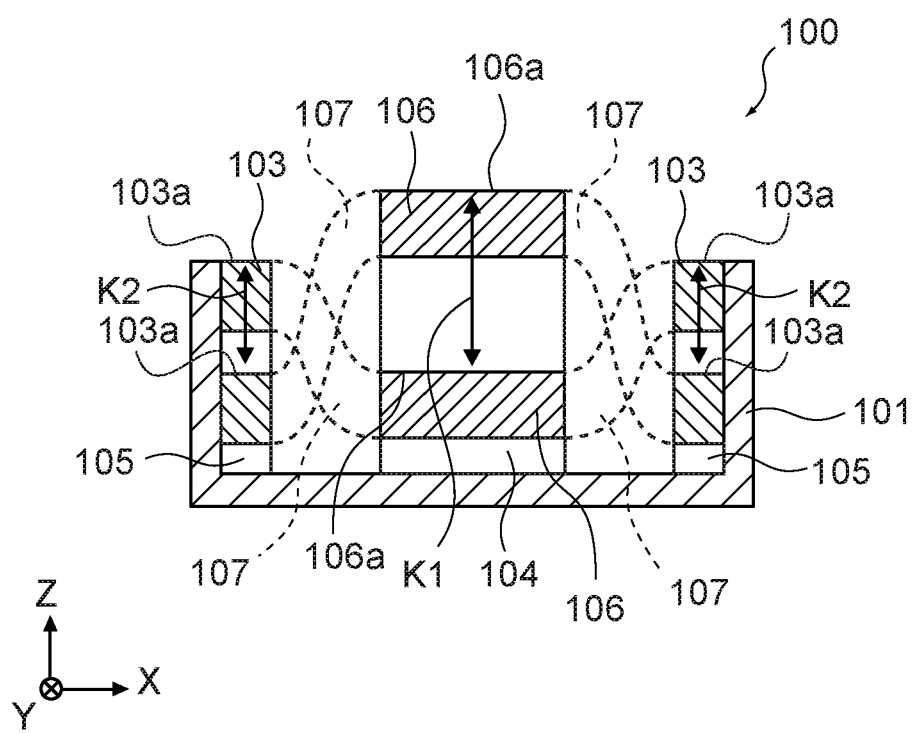
FIG. 36 A schematic diagram showing amounts of allowable movement of the central portion and the peripheral portion in the tactile presentation apparatus.

In the tactile presentation apparatus 100, the amount of allowable movement can be set to be different between the central portion 106 and the peripheral portion 103. FIGS. 35 and 36 are schematic diagrams showing an amount of allowable movement K1 of the central portion 106 and an amount of allowable movement K2 of the peripheral portion 103. It should be noted that the amount of allowable movement K1 of the central portion 106 is a maximum movement distance in the first direction D1 and the second direction D2 (see FIG. 4) that the contact surface 106a can take. The amount of allowable movement K2 of the peripheral portion 103 is a maximum movement distance in the first direction D1 and the second direction D2 (see FIG. 8) that the surface 103a can take.

In the tactile presentation apparatus 100, the amount of allowable movement K2 can be set to be larger than the amount of allowable movement K1 as shown in FIG. 35. In a case where the amount of allowable movement K2 is larger than the amount of allowable movement K1, a range in which the convexo-concave shape of the contact surface M can be achieved can be increased. Moreover, in the tactile presentation apparatus 100, the amount of allowable movement K1 can be set to be larger than the amount of allowable movement K2 as shown in FIG. 36. In a case where the amount of allowable movement K1 is larger than the amount of allowable movement K2, the height of the side wall portion 101b can be lowered and the outer peripheral portion of the tactile presentation apparatus 100 can be reduced in height.

(Flexibility Regarding Peripheral Portion and Retaining Portion)

Figure 37:
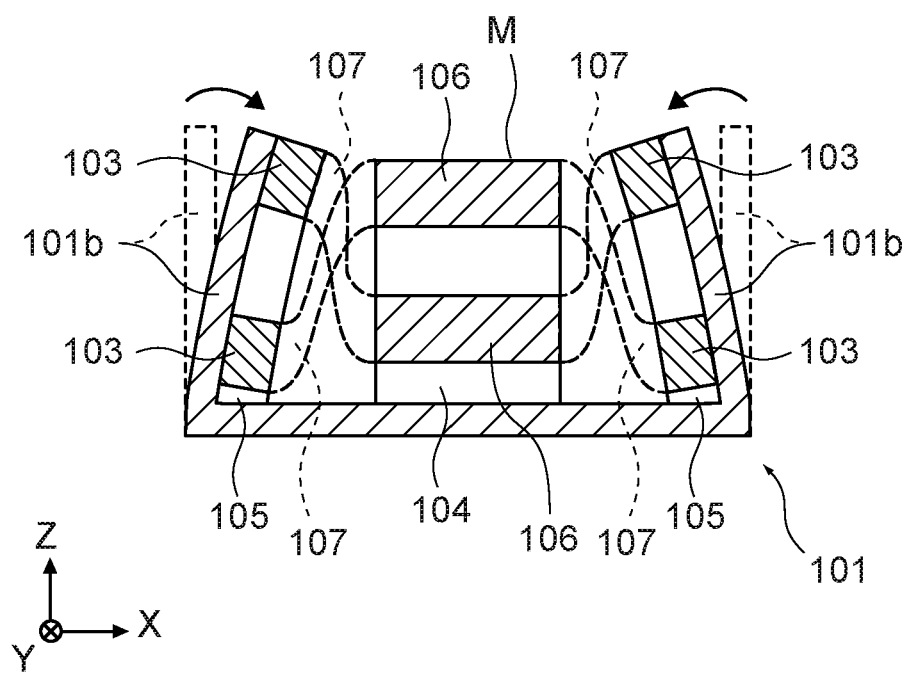
FIG. 37 A schematic diagram showing deformation of the retaining portion in the tactile presentation apparatus.

In the tactile presentation apparatus 100, at least one of the peripheral portion 103 or the side wall portion 101b may be flexible toward the contact portion 102. FIG. 37 shows an example in which the side wall portion 101b is flexible. As shown in the figure, in a case where the side wall portion 101b is flexible, the peripheral portion 103 bends inward due to a press force from the contact object and a frictional force, which can further increase the contact area of the contact surface M with the contact object. Moreover, also in a case where the peripheral portion 103 is flexible, the peripheral portion 103 bends inward, which can further increase the contact area of the contact surface M with the contact object.

Figure 38A:
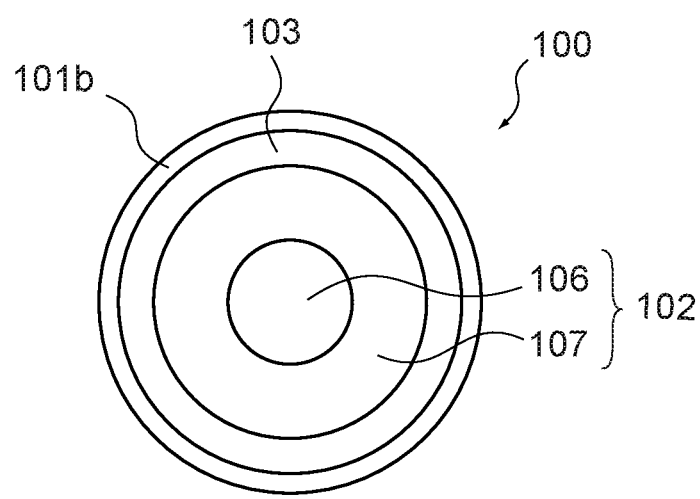
FIGS. 38A, 38B, and 38C A schematic diagram showing contraction due to deformation of the retaining portion in the tactile presentation apparatus.
Figure 38B:
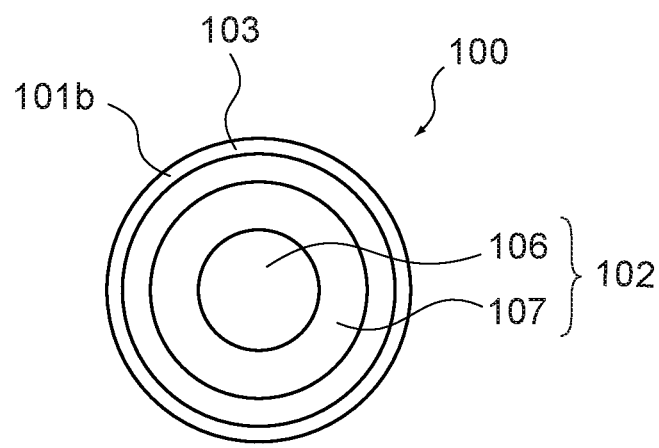
Figure 38C:
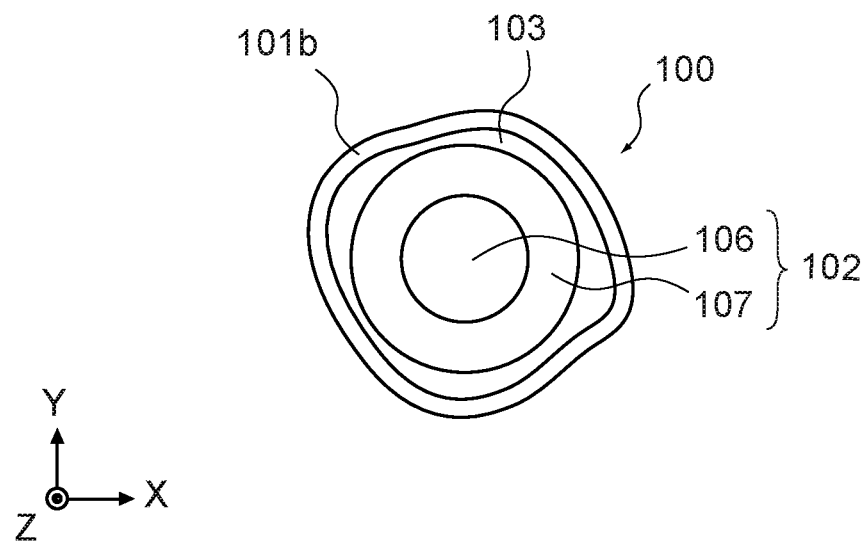

Here, a non-uniform shape can be generated in a case where at least one of the peripheral portion 103 or the side wall portion 101b is flexible. FIGS. 38A, 38B, and 38C are schematic diagrams showing deformation of the peripheral portion 103 and the side wall portion 101b. The outer peripheral length of the peripheral portion 103 is typically reduced as shown in FIG. 38B when the peripheral portion 103 bends inward from the state shown in FIG. 38A. An intended non-uniform deformation as shown in FIG. 38C can be generated if the force applied from the contact object is non-uniform at that time. This non-uniform deformation can be prevented as follows.

Figure 39:
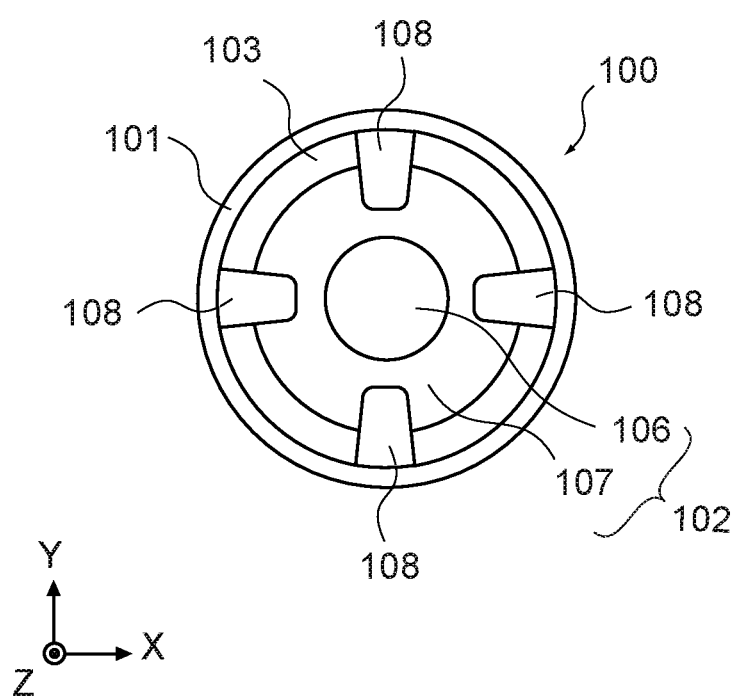
FIG. 39 A schematic diagram of the tactile presentation apparatus including a separation portion according to the first embodiment of the present technology.

The tactile presentation apparatus 100 may include separation portions. FIG. 39 is a schematic diagram of the tactile presentation apparatus 100 including separation portions 108. The separation portions 108 are portions extending toward the central portion 106 from the outer periphery of the peripheral portion 103. The peripheral portion 103 is separated at these portions. It should be noted that the separation portions 108 may also partially separate the connection portion 107 as shown in FIG. 39. The separation portions 108 are favorably arranged at equal intervals in the outer periphery of the peripheral portion 103.

Figure 40A:
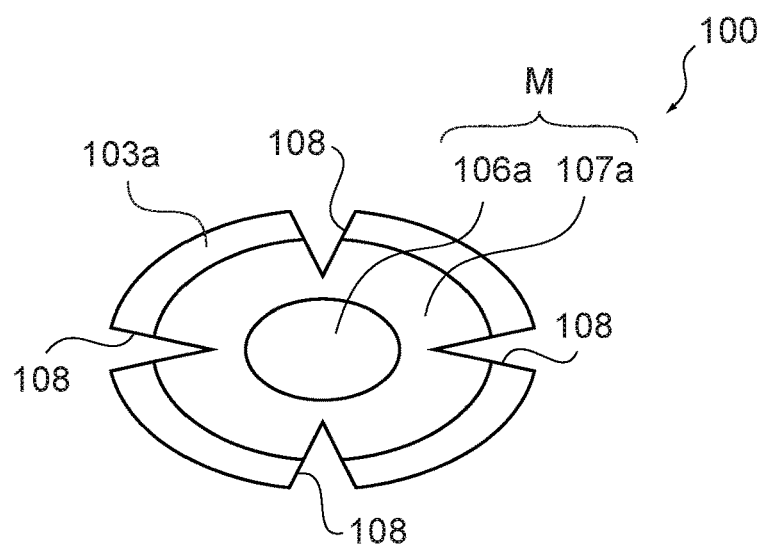
FIGS. 40A, 40B, and 40C A schematic diagram showing deformation of the contact surface of the tactile presentation apparatus.
Figure 40B:
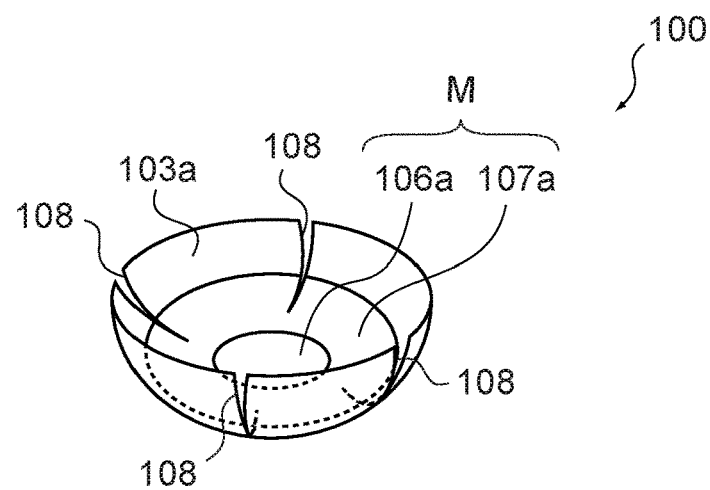
Figure 40C:
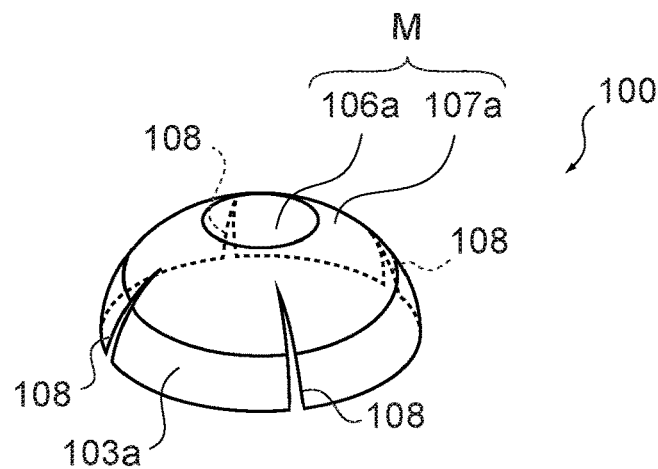

FIGS. 40A, 40B, and 40C are schematic diagrams showing a change in shape of the contact surface M in the tactile presentation apparatus 100 including separation portions 108. FIG. 40A shows the contact surface M in the plan shape, FIG. 40B shows the contact surface in the concave shape M, and FIG. 40C shows the contact surface M in the convex shape. Due to the provision of the separation portions 108 in the outer periphery of the peripheral portion 103 as shown in FIGS. 40A, 40B, and 40C, the separation portions 108 can decrease in width at the time of contraction (see FIGS. 38A, 38B, and 38C) and can uniformly contract as shown in FIG. 38B.

Figure 41:
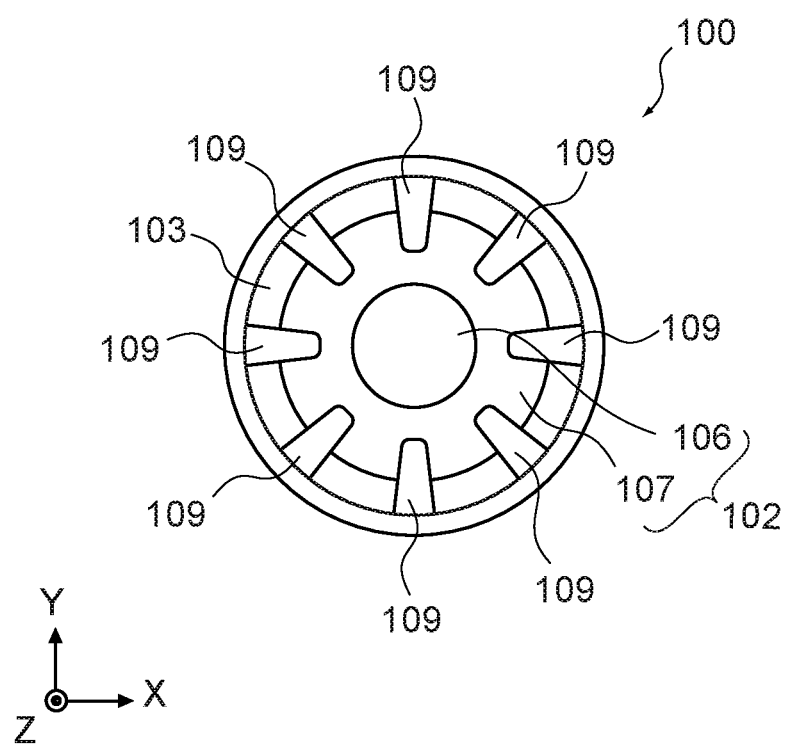
FIG. 41 A schematic diagram of the tactile presentation apparatus including a bent portion according to the first embodiment of the present technology.

Alternatively, the tactile presentation apparatus 100 may include bent portions. FIG. 41 is a schematic diagram of the tactile presentation apparatus 100 including bent portions 109. The bent portions 109 are portions extending toward the central portion 106 from the outer periphery of the peripheral portion 103. The peripheral portion 103 are bent at these portions. The bent portions 109 are formed to be smaller in Young's modulus, thickness, or the like than the peripheral portion 103, which allows them to bend easily. It should be noted that the bent portions 109 may be partially formed also in the connection portion 107 as shown in FIG. 41. The bent portions 109 are favorably arranged at equal intervals in the outer periphery of the peripheral portion 103.

Figure 42A:
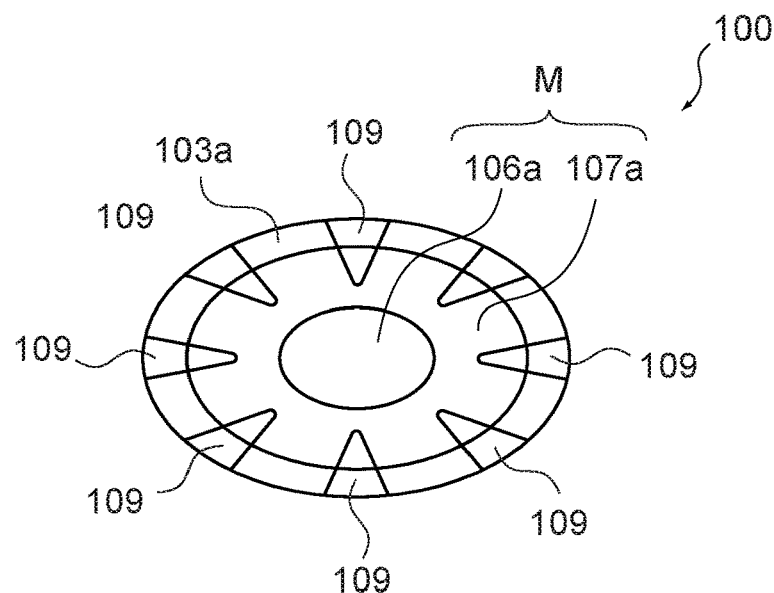
FIGS. 42A, 42B, and 42C A schematic diagram showing deformation of the contact surface of the tactile presentation apparatus.
Figure 42B:
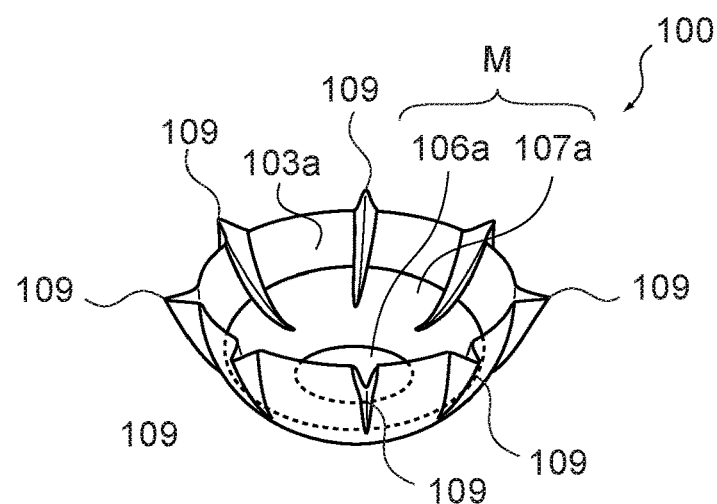
Figure 42C:
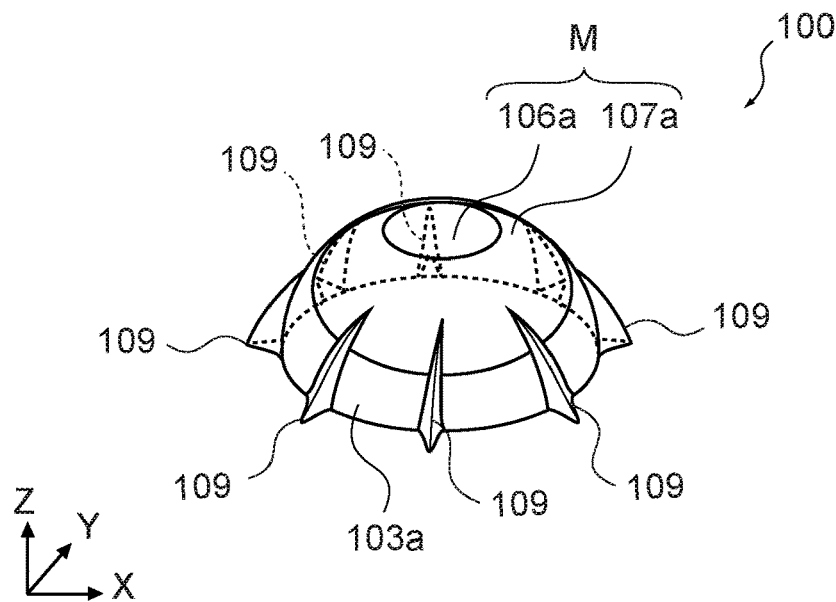

FIGS. 42A, 42B, and 42C are schematic diagrams showing a change in shape of the contact surface M in the tactile presentation apparatus 100 including bent portions 109. FIG. 42A shows the contact surface M in the plan shape, FIG. 42B shows the contact surface in the concave shape M, and FIG. 42C shows the contact surface M in the convex shape. Due to the provision of the bent portions 109 in the outer periphery of the peripheral portion 103 as shown in FIGS. 42A, 42B, and 42C, the bent portions 109 can bend at the time of contraction (see FIGS. 38A, 38B, and 38C) and can uniformly contract as shown in FIG. 38B.

Figure 43:
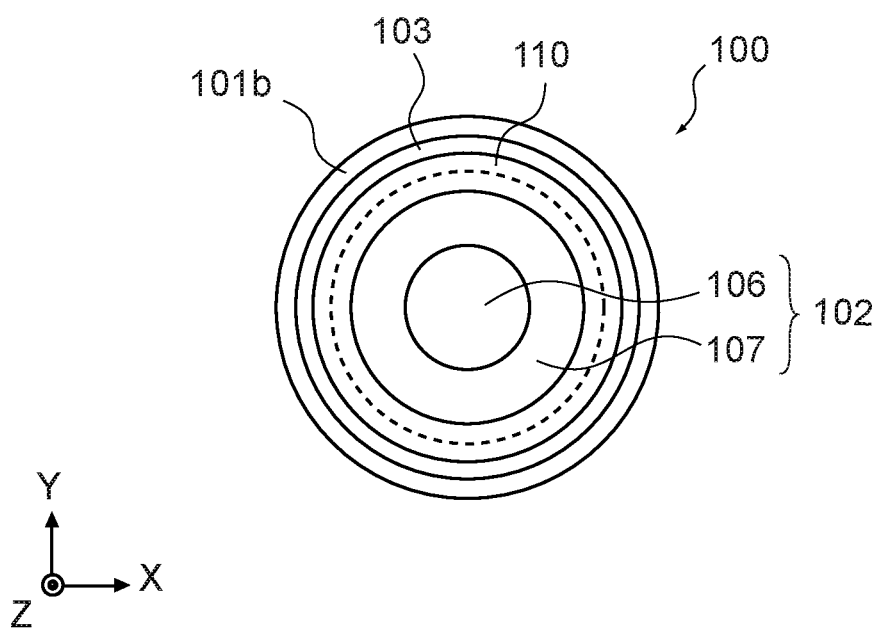
FIG. 43 A schematic diagram of the tactile presentation apparatus including a restriction portion according to the first embodiment of the present technology.
Figure 44:
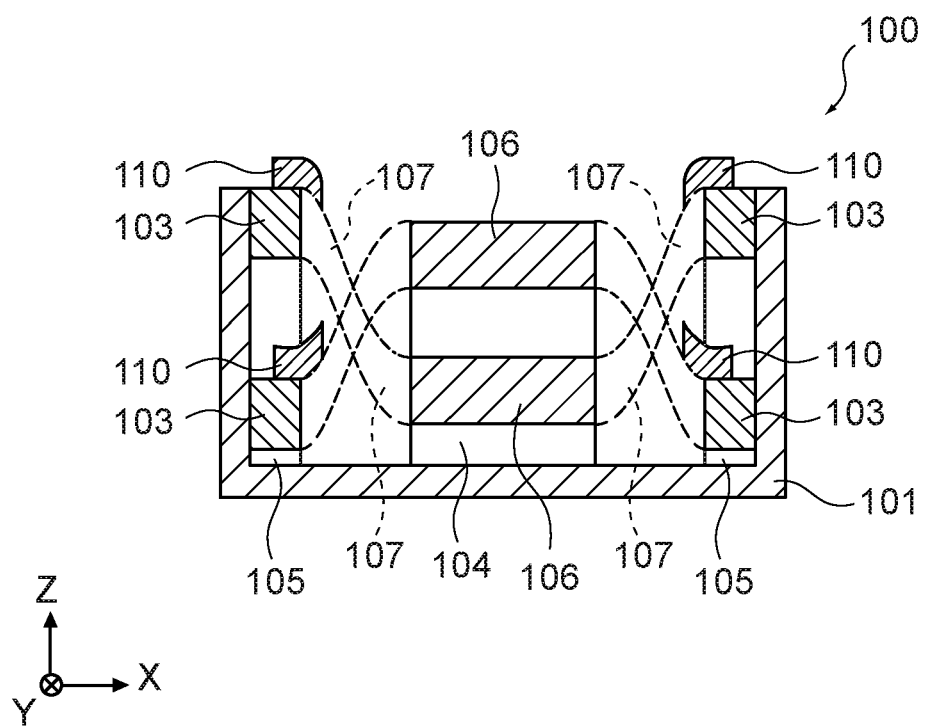
FIG. 44 A schematic diagram showing an operation of the restriction portion in the tactile presentation apparatus.

Alternatively, the tactile presentation apparatus 100 may include restriction portions. FIG. 43 is a plan view of the tactile presentation apparatus 100 including a restriction portion 110. FIG. 44 is a schematic diagram showing an operation of this tactile presentation apparatus 100. The restriction portion 110 is a member joined with the peripheral portion 103 and the connection portion 107 and harder than the peripheral portion 103. Specifically, the restriction portion 110 may have a higher Young's modulus than the peripheral portion 103. As shown in FIG. 44, the restriction portion 110 keeping its shape against deformation of the contact surface M can prevent excess circumferential contraction, and can uniformly contract as shown in FIG. 38B. It should be noted that the restriction portion 110 may be joined with at least one of the peripheral portion 103 or the connection portion 107.

(Regarding Frictional Coefficient of Contact Surface)

Figure 45:
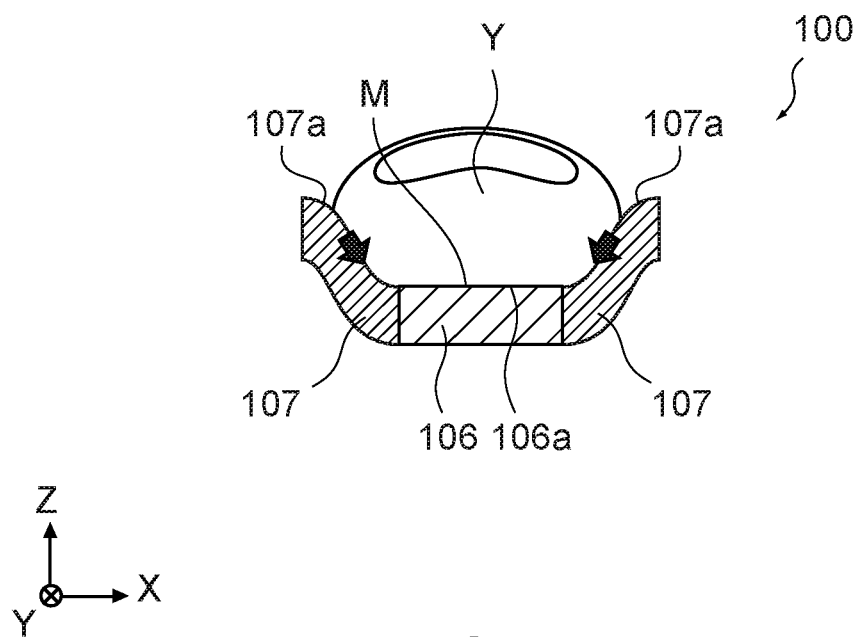
FIG. 45 A schematic diagram showing friction of the contact surface in the tactile presentation apparatus according to the first embodiment of the present technology.

Favorably, at least a partial region of the contact surface M (the first contact surface 106a and the second contact surface 107a) provided in the tactile presentation apparatus 100 has a friction coefficient of 0.3 or more. FIG. 45 is a schematic diagram showing the contact surface M and the finger Y. Configuring the contact surface M to have a region with a friction coefficient of 0.3 or more as shown in the figure increases the force applied to the connection portion 107 from the finger Y due to a frictional force (black arrow) applied to the contact surface M from the finger Y, so that it can easily deform in contact with the finger Y. It should be noted that the friction coefficient of the contact surface M can be set to 0.3 or more by making the central portion 106 and the connection portion 107 from a fine convexo-concave material or a smooth and high-tackiness material, for example.

(Regarding Folding Structure of Peripheral Portion and Central Portion)

Figure 46:
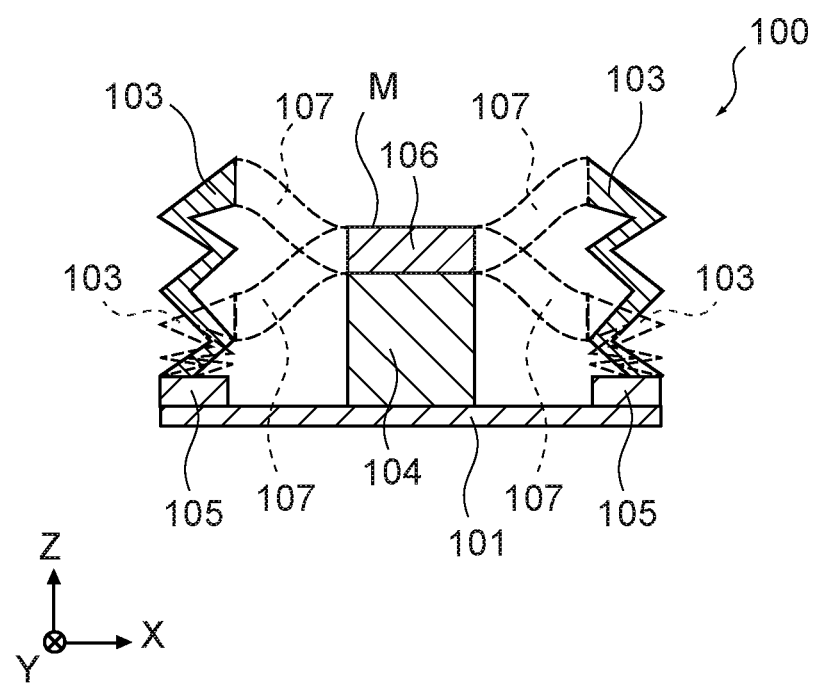
FIG. 46 A schematic diagram of the tactile presentation apparatus with the peripheral portion having a shape deformable by folding and deployment according to the first embodiment of the present technology.
Figure 47:
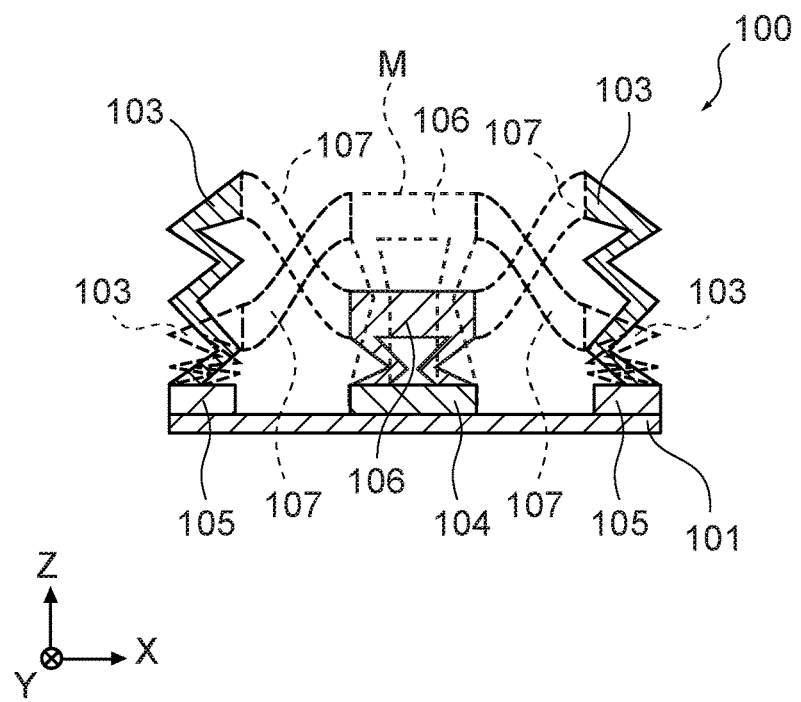
FIG. 47 A schematic diagram of the tactile presentation apparatus with the peripheral portion and the central portion having a shape deformable by folding and deployment according to the first embodiment of the present technology.

In the tactile presentation apparatus 100, at least any one of the peripheral portion 103 or the central portion 106 may be deformable by folding and deployment in the first direction D1 and the second direction D2 (see FIG. 4). One example of the shape deformable by folding and deployment is a bellows shape. FIG. 46 shows an example of the tactile presentation apparatus 100 with the peripheral portion 103 having a shape deformable by folding and deployment. FIG. 47 shows an example of the tactile presentation apparatus 100 with the peripheral portion 103 and the central portion 106 having a shape deformable by folding and deployment. Configuring the peripheral portion 103 or the central portion 106 to have a structure deformable by folding and deployment can greatly deform the contact surface M even if the first driving portion 104 and the second driving portion 105 generate a small force.

(Regarding Flexibility of Central Portion)

Figure 48:
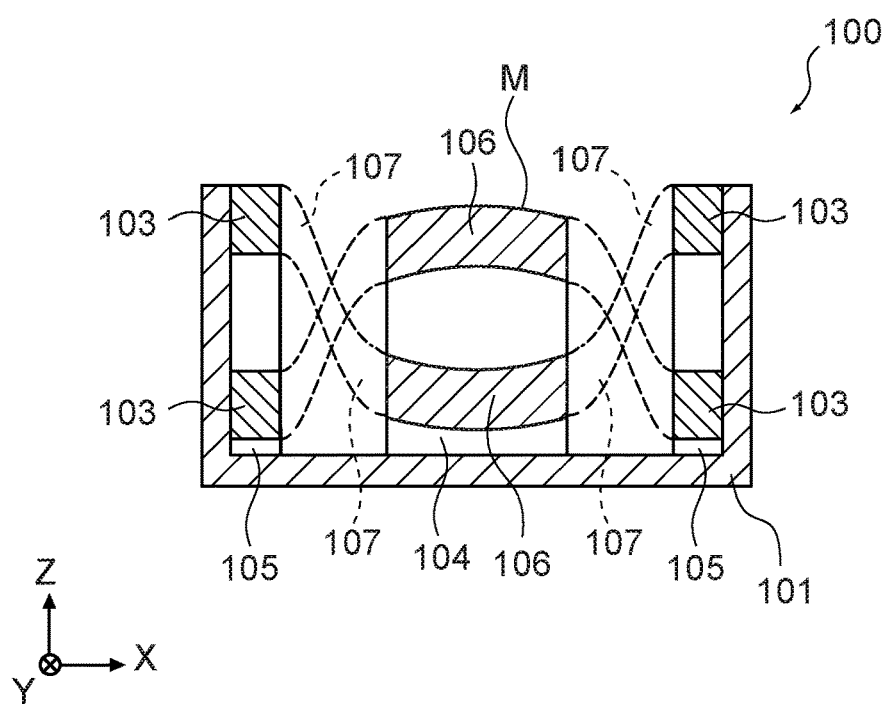
FIG. 48 A schematic diagram of the tactile presentation apparatus with the central portion flexible according to the first embodiment of the present technology.

The central portion 106 in the tactile presentation apparatus 100 may be flexible. FIG. 48 is a schematic diagram showing the tactile presentation apparatus 100 with the central portion 106 flexible. As shown in the figure, in a case where the central portion 106 is flexible, the central portion 106 receives a pulling force from the connection portion 107 and deforms so that the first contact surface 106a becomes a concave surface or convex surface. This allows an increase in the range in which the convexo-concave shape of the contact surface M can be achieved.

(Part I Regarding Plan Shape of Tactile Presentation Apparatus)

Figure 49:
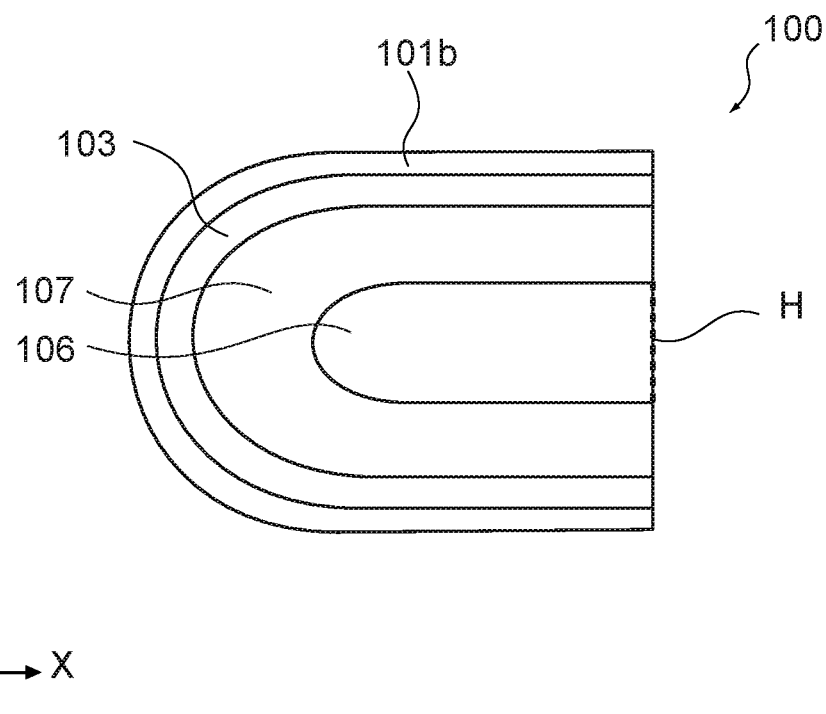
FIG. 49 A plan view showing a plan shape of the tactile presentation apparatus according to the first embodiment of the present technology.
Figure 50:
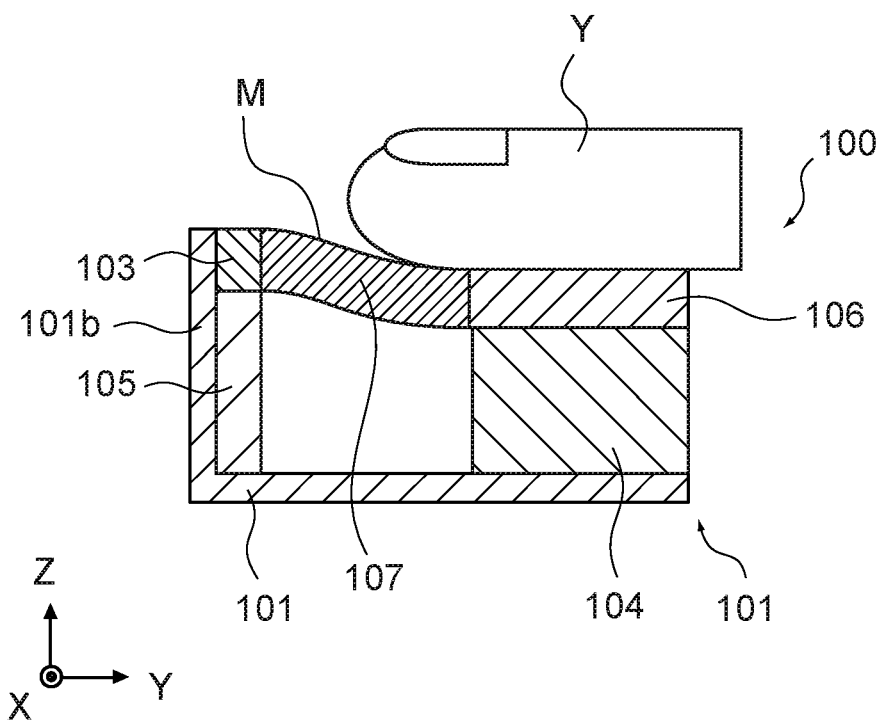
FIG. 50 A cross-sectional view of the tactile presentation apparatus.
Figure 51:
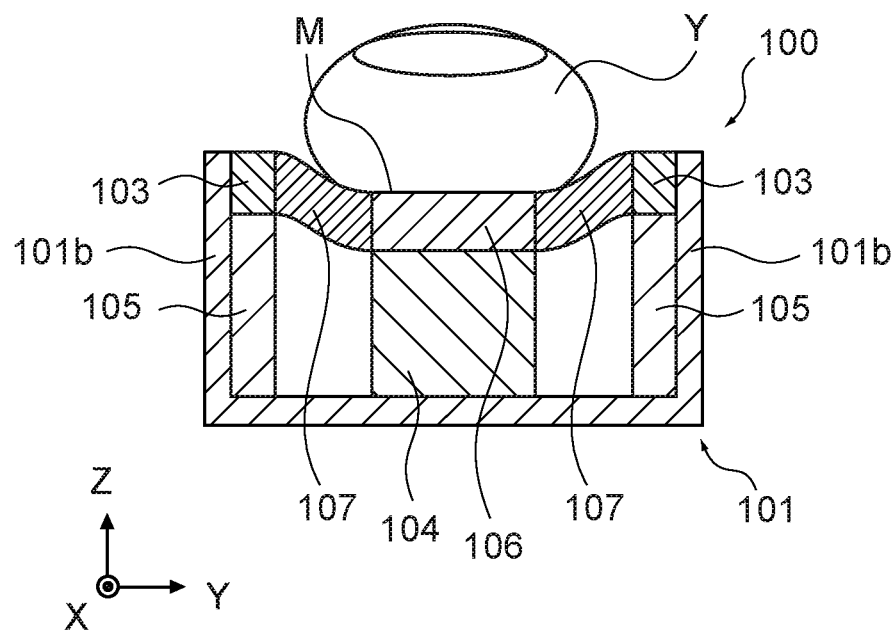
FIG. 51 A cross-sectional view of the tactile presentation apparatus.

As shown in FIG. 2, the tactile presentation apparatus 100 may be configured so that the connection portion 107 surrounds the peripheral edge of the central portion 106 as viewed in the Z direction and the peripheral portion 103 surrounds the peripheral edge of the connection portion 107. Alternatively, the tactile presentation apparatus 100 may have the following configuration. FIG. 49 shows another configuration of a plan view of the tactile presentation apparatus 100. As shown in the figure, the central portion 106 has a peripheral edge H where the connection portion 107 and the peripheral portion 103 are not provided on the outer peripheral side. FIGS. 50 and 51 are schematic diagrams showing a state in which the finger Y touches the contact surface M in this tactile presentation apparatus 100.

Figure 52:
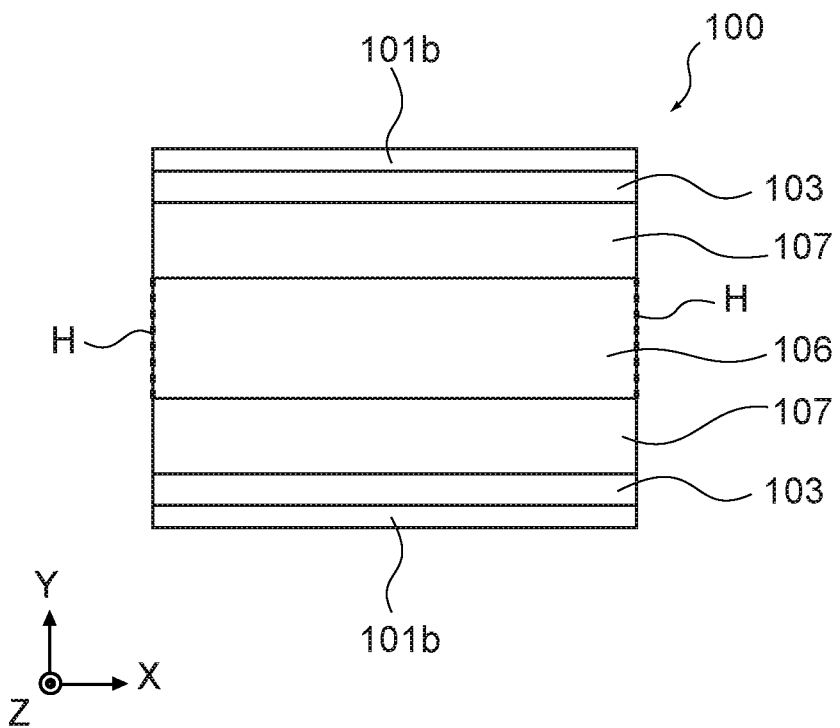
FIG. 52 A plan view showing a plan shape of the tactile presentation apparatus according to the first embodiment of the present technology.
Figure 53:
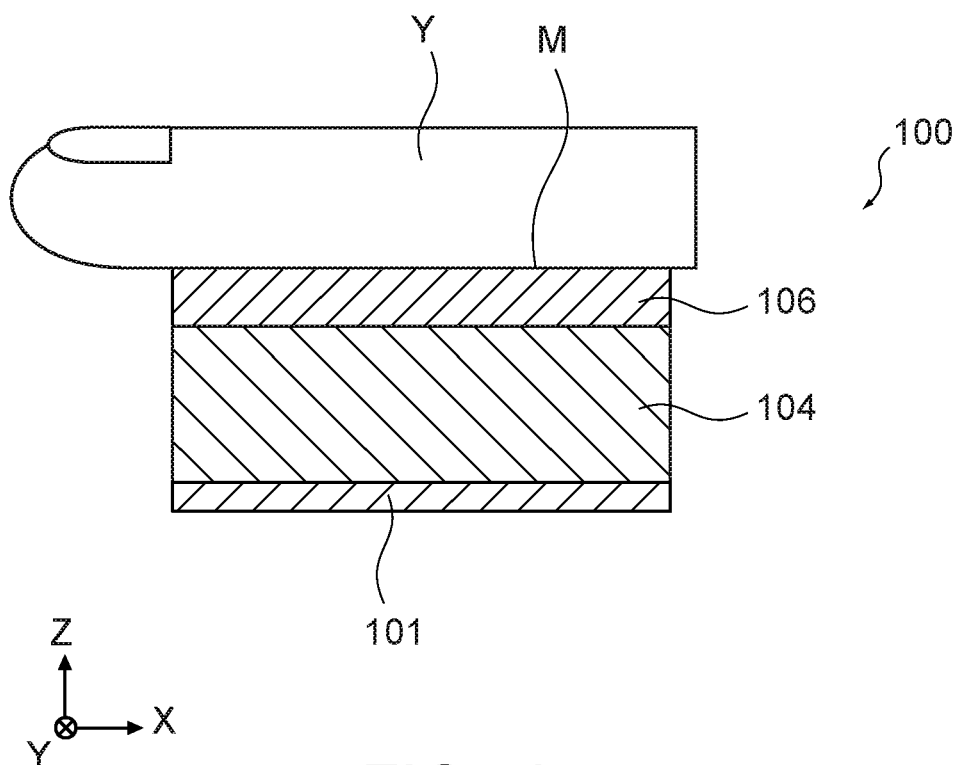
FIG. 53 A cross-sectional view of the tactile presentation apparatus.
Figure 54:
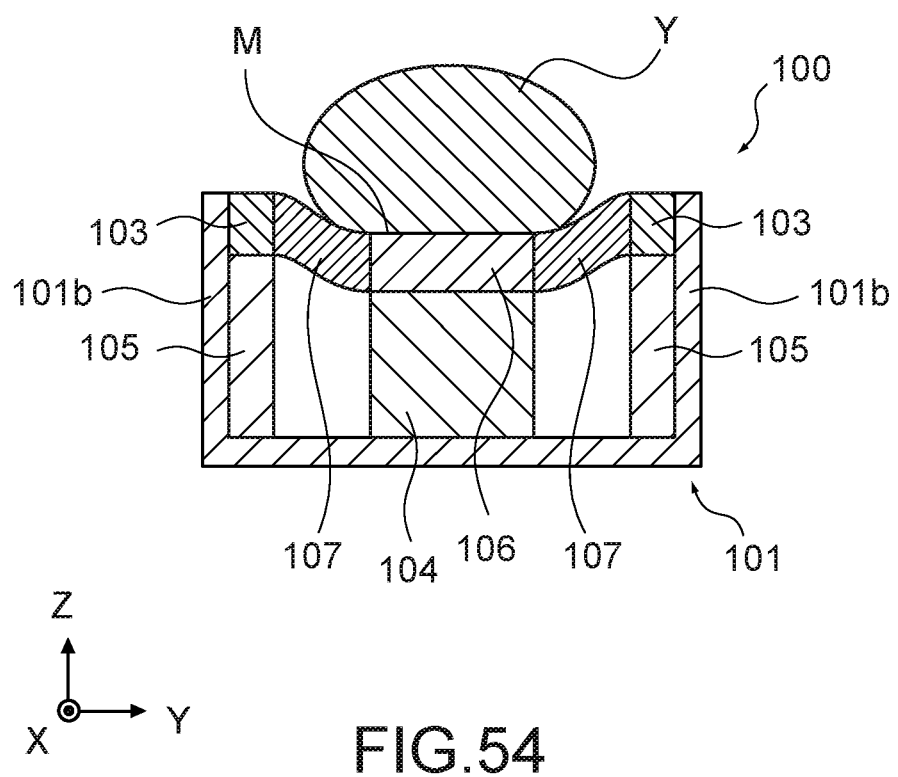
FIG. 54 A cross-sectional view of the tactile presentation apparatus.
Figure 55:
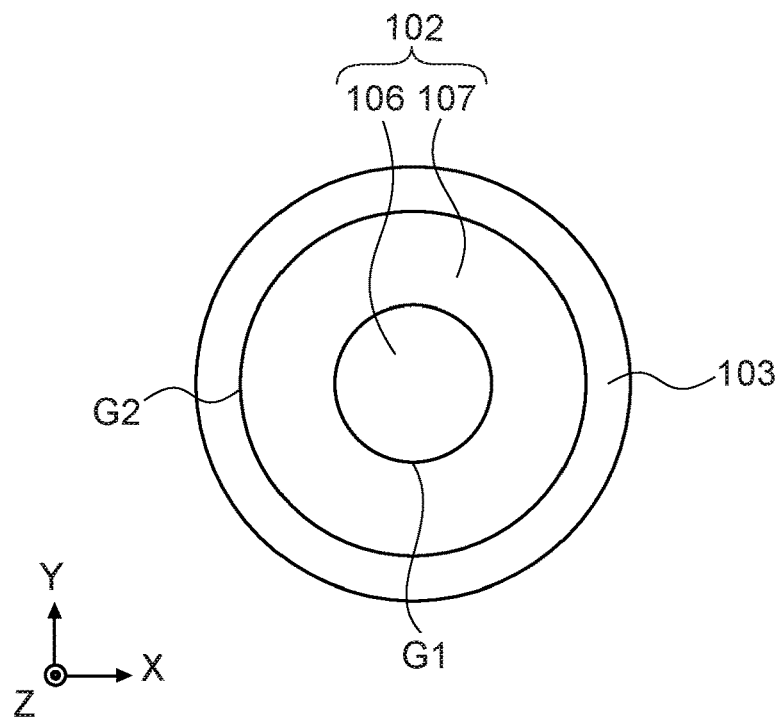
FIG. 55 A plan view showing a plan shape of the tactile presentation apparatus according to the first embodiment of the present technology.
Figure 56:
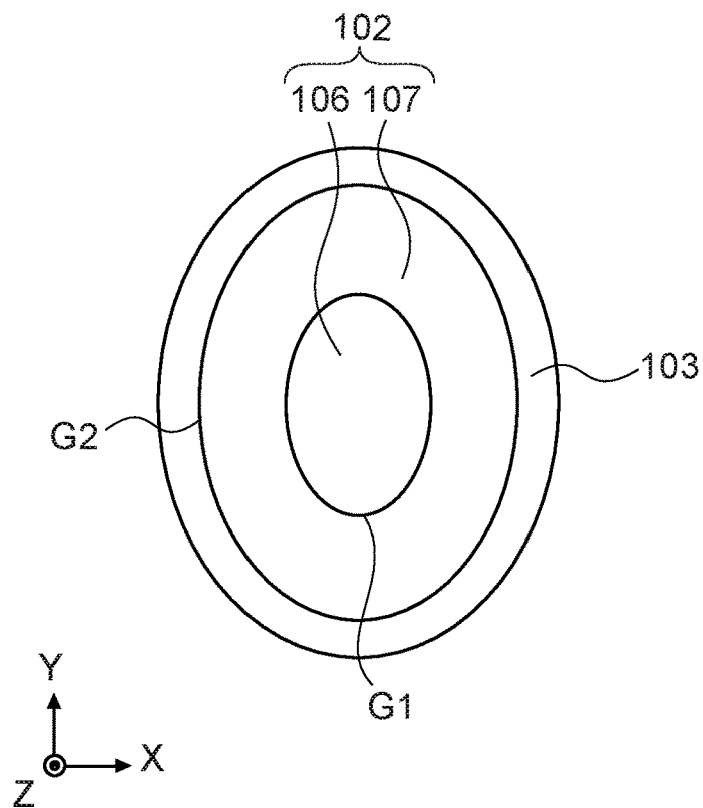
FIG. 56 A plan view showing a plan shape of the tactile presentation apparatus according to the first embodiment of the present technology.
Figure 57:
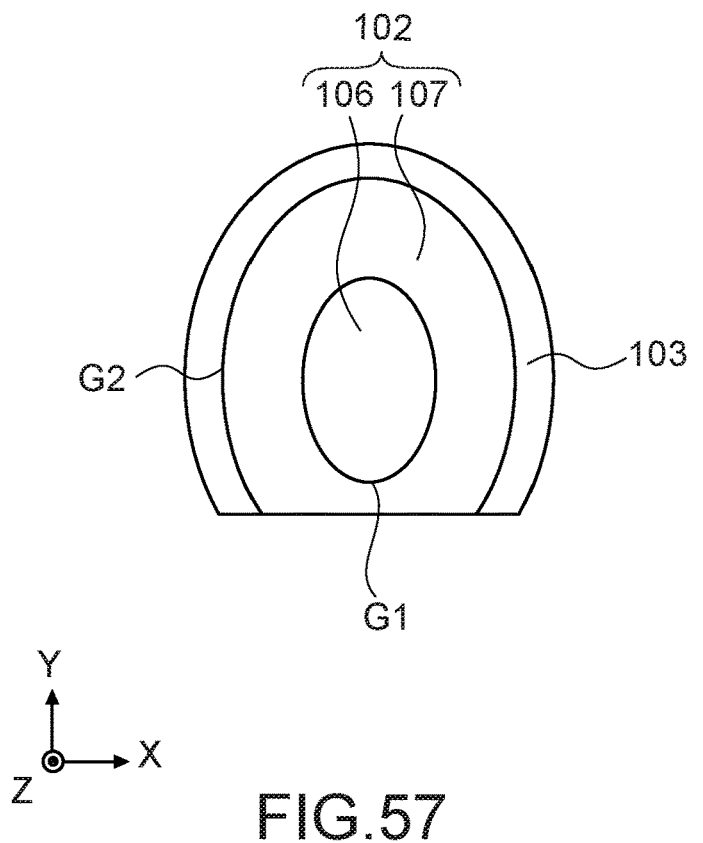
FIG. 57 A plan view showing a plan shape of the tactile presentation apparatus according to the first embodiment of the present technology.
Figure 58:
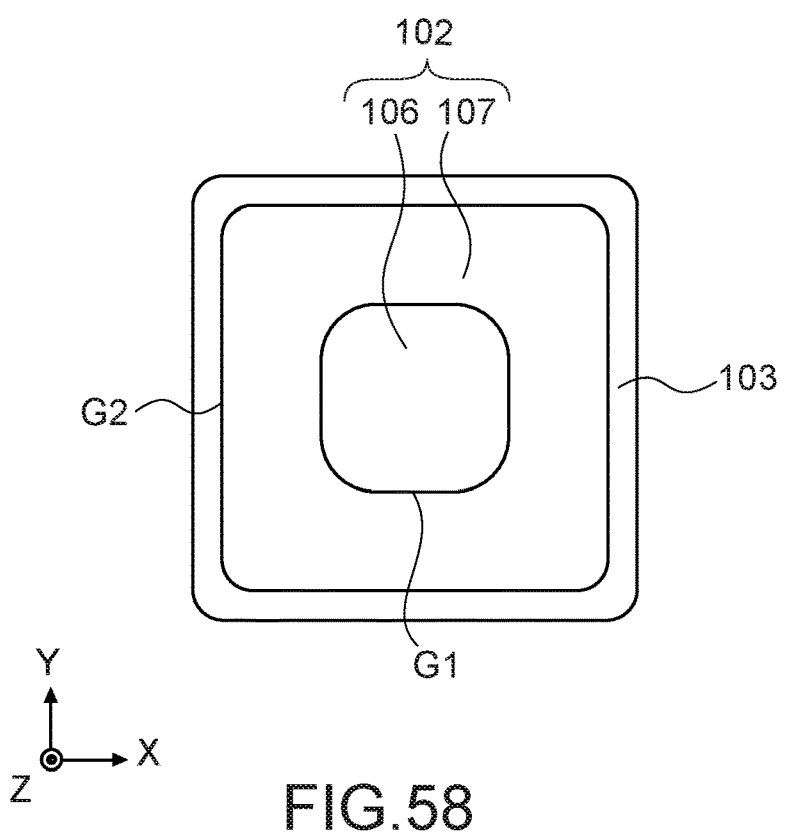
FIG. 58 A plan view showing a plan shape of the tactile presentation apparatus according to the first embodiment of the present technology.

Moreover, FIG. 52 shows another configuration of a plan view of the tactile presentation apparatus 100. As shown in the figure, the central portion 106 has two peripheral edges H where the connection portion 107 and the peripheral portion 103 are not provided on the outer peripheral side. FIGS. 53 and 54 are schematic diagrams showing a state in which the finger Y touches the contact surface M in this tactile presentation apparatus 100. The unnecessity of the side wall portion 101b at the peripheral edge H as shown in those figures enables the finger Y to push down the contact surface M to its root even when the finger Y touches the contact surface M at an angle close to the horizontal plane. It can prevent the root of the finger Y from having an unnecessary sense of touch with the side wall portion 101b.

It should be noted that the tactile presentation apparatus 100 may have a side in which only the connection portion 107 exists in replace of the peripheral edge H on the outer peripheral side and where the peripheral portion 103 is not provided. Also in this case, an unnecessary sense of touch with the side wall portion 101b can be prevented as in the configurations in FIGS. 49 and 52.

(Part II Regarding Plan Shape of Tactile Presentation Apparatus)

In the tactile presentation apparatus 100, the contact portion 102 and the peripheral portion 103 may have various shapes. FIGS. 55 to 58 are schematic diagrams showing the various shapes of the contact portion 102 and the peripheral portion 103. In these figures, a boundary line between the central portion 106 and the connection portion 107 is shown as a boundary line G1 and the boundary between the connection portion 107 and the peripheral portion 103 is shown as a boundary line G2. The boundary line G1 and the boundary line G2 are favorably those with no corner having a radius of curvature of less than 1 mm. With no corner having a radius of curvature of less than 1 mm, significant noise as a sense of touch can be reduced, and also deformation causes no stress concentration, which makes the apparatus excellent in durability. It should be noted that the contact portion 102 and the peripheral portion 103 may have shapes other than the shapes shown in FIGS. 55 to 58.

(Configuration of Drive Mechanism)

Figure 59:
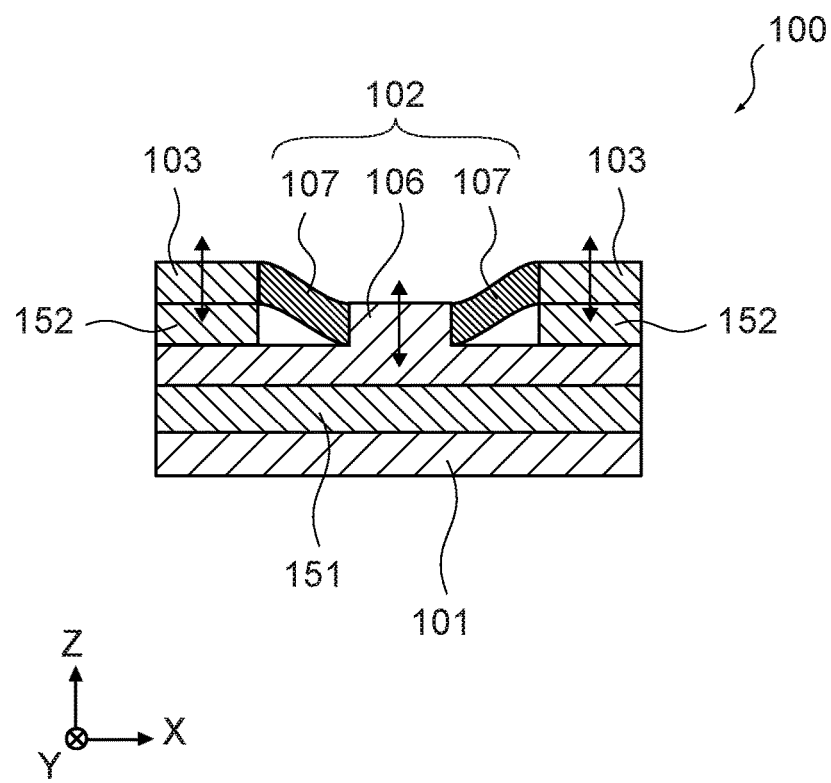
FIG. 59 A schematic diagram of the tactile presentation apparatus including a third driving portion and a fourth driving portion according to the first embodiment of the present technology.

As described above, the tactile presentation apparatus 100 may include the first driving portion 104 that drives the central portion 106 and the second driving portion 105 that drives the peripheral portion 103. Here, the driving portions of the central portion 106 and the peripheral portion 103 may have the following configurations. FIG. 59 is a schematic diagram of the tactile presentation apparatus 100 include a third driving portion 151 and a fourth driving portion 152 in place of the first driving portion 104 and the second driving portion 105. As shown in the figure, the third driving portion 151 is fixed to the retaining portion 101 and drives the central portion 106. Moreover, the fourth driving portion 152 is fixed to the central portion 106 and drives the peripheral portion 103.

Accordingly, the third driving portion 151 drives the central portion 106 and the third driving portion 151 and the fourth driving portion 152 drive the peripheral portion 103. In this case, the third driving portion 151 may function in a similar manner to that of the first driving portion 104 and change the height Hc of the central portion 106 (see FIG. 4) and change the press force Fc (see FIG. 5) in accordance with the height Hc. Moreover, the third driving portion 151 and the fourth driving portion 152 may function in a similar manner to that of the second driving portion 105 and change the height Hs of the peripheral portion 103 (see FIG. 8) and change the press force Fs (see FIG. 9) in accordance with the height Hs.

Figure 60:
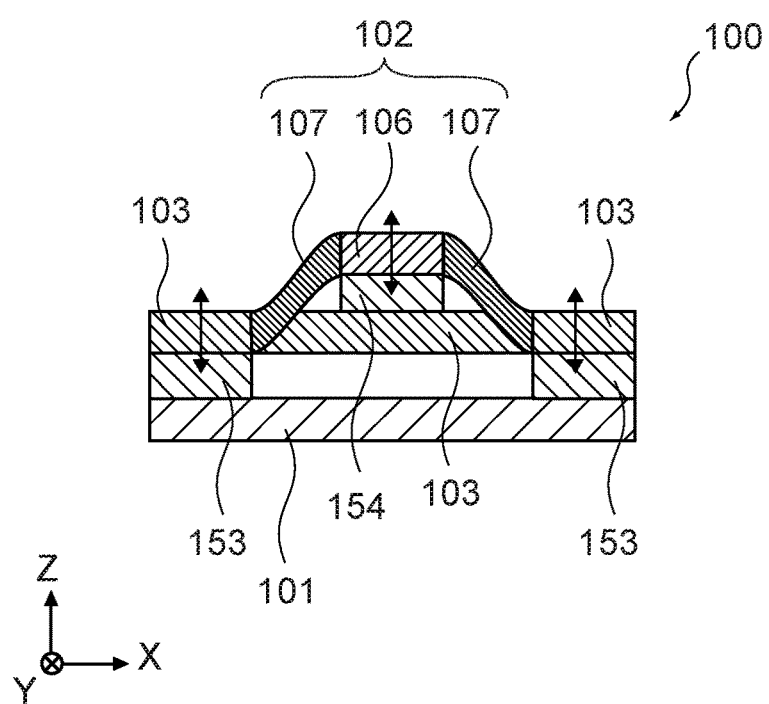
FIG. 60 A schematic diagram of the tactile presentation apparatus including a fifth driving portion and a sixth driving portion according to the first embodiment of the present technology.

In addition, FIG. 60 is a schematic diagram of the tactile presentation apparatus 100 including a fifth driving portion 153 and a sixth driving portion 154 in place of the first driving portion 104 and the second driving portion 105. As shown in the figure, the fifth driving portion 153 is fixed to the retaining portion 101 and drives the peripheral portion 103. Moreover, the sixth driving portion 154 is fixed to the peripheral portion 103 and drives the central portion 106.

Accordingly, the fifth driving portion 153 drives the peripheral portion 103 and the fifth driving portion 153 and the sixth driving portion 154 drive the central portion 106. In this case, the fifth driving portion 153 and the sixth driving portion 154 may function in a similar manner to that of the first driving portion 104 and change the height Hc of the central portion 106 (see FIG. 4) and change the press force Fc (see FIG. 5) in accordance with the height Hc. Moreover, the fifth driving portion 153 may function in a similar manner to that of the second driving portion 105 and change the height Hs of the peripheral portion 103 (see FIG. 8) and change the press force Fs (see FIG. 9) in accordance with the height Hs.

[Configuration of Tactile Presentation System]

A tactile presentation system according to the present embodiment will be described.

Figure 61:
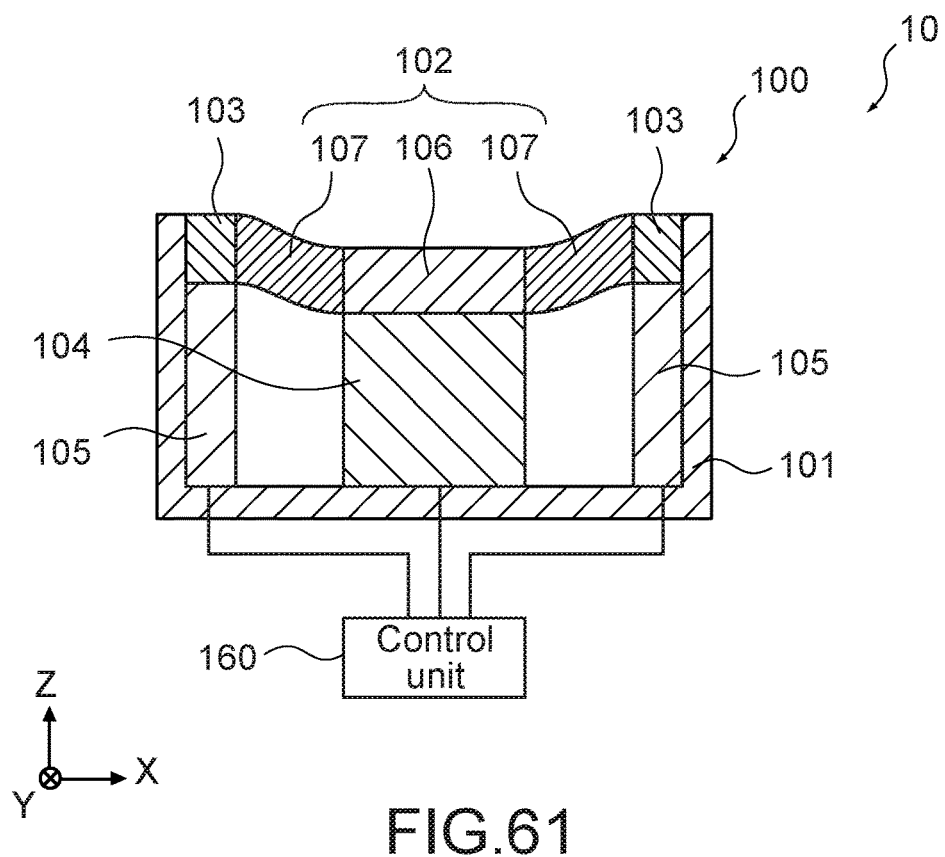
FIG. 61 A schematic diagram of a tactile presentation system according to the first embodiment of the present technology.

FIG. 61 is a schematic diagram of a tactile presentation system 10 according to the present embodiment. As shown in the figure, the tactile presentation system 10 includes the tactile presentation apparatus 100 and a control unit 160.

The control unit 160 is connected to the first driving portion 104 and the second driving portion 105 and independently controls the first driving portion 104 and the second driving portion 105. Specifically, when the control unit 160 receives an instruction about a tactile sense presented to the user from, for example, an information processing apparatus that provides content including tactile presentation, the control unit 160 respectively controls the first driving portion 104 and the second driving portion 105 and determines the shape of the contact surface M and the pressure to the contact object as described above.

Figure 62:
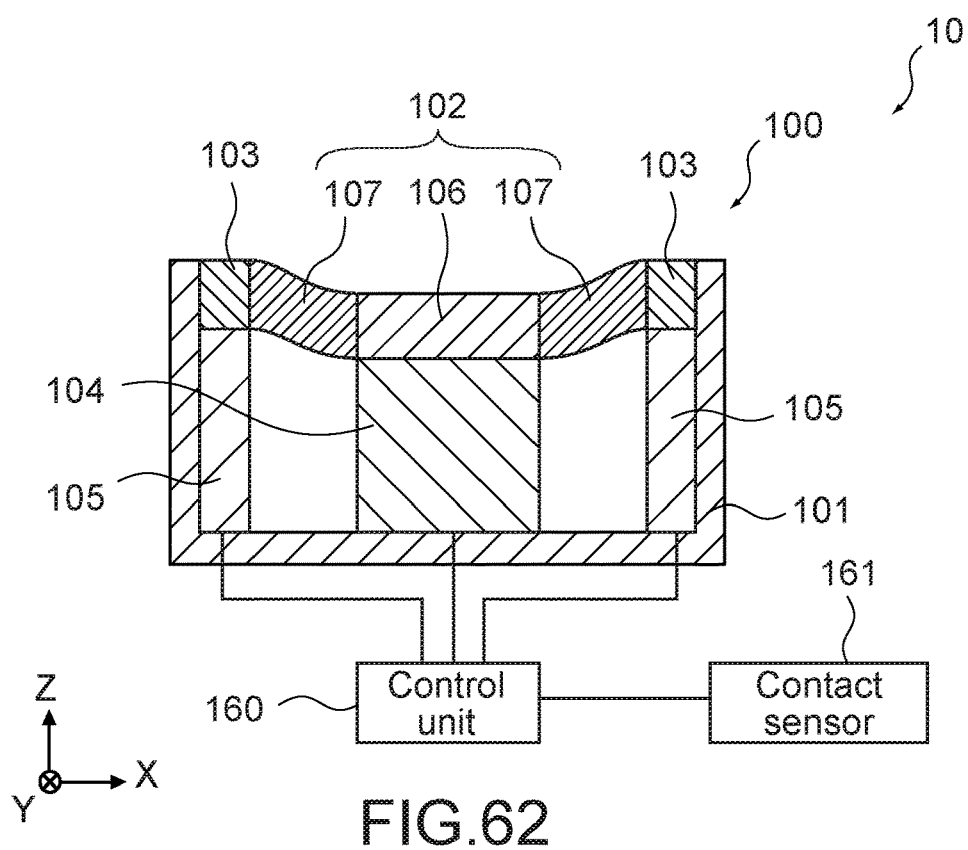
FIG. 62 A schematic diagram of the tactile presentation system including a contact sensor according to the first embodiment of the present technology.

The tactile presentation system 10 may include a contact sensor. FIG. 62 is a schematic diagram of the tactile presentation system 10 including a contact sensor 161. The contact sensor 161 is a sensor for detecting at least any one of the contact or non-contact, the contact area, the press force, or the pushing amount with respect to the contact surface M by the contact object. Specifically, the contact sensor 161 is a pressure sensor, a surface pressure sensor, a force sensor, a camera (optical sensor), a conductivity sensor, or the like. The contact sensor 161 is connected to the control unit 160 and supplies a sensing result to the control unit 160.

Figure 63:
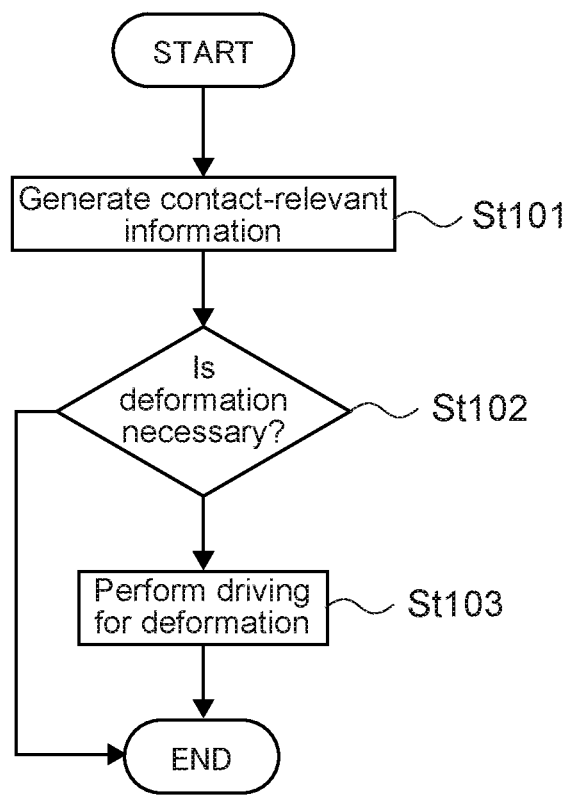
FIG. 63 A flowchart showing an operation of the tactile presentation system.

FIG. 63 is a flowchart showing an operation the tactile presentation system 10 including the contact sensor 161. The contact sensor 161 senses at least any one of the contact or non-contact, the contact area, the press force, or the pushing amount with respect to the contact surface M and generates contact-relevant information including the sensing result (St101). When the contact sensor 161 supplies the contact-relevant information to the control unit 160, the control unit 160 determines whether or not deformation of the contact surface M is necessary on the basis of the contact-relevant information (St102). In a case where deformation is necessary, the control unit 160 respectively drives the first driving portion 104 and the second driving portion 105 to deform the contact surface M (St103).

Figure 64:
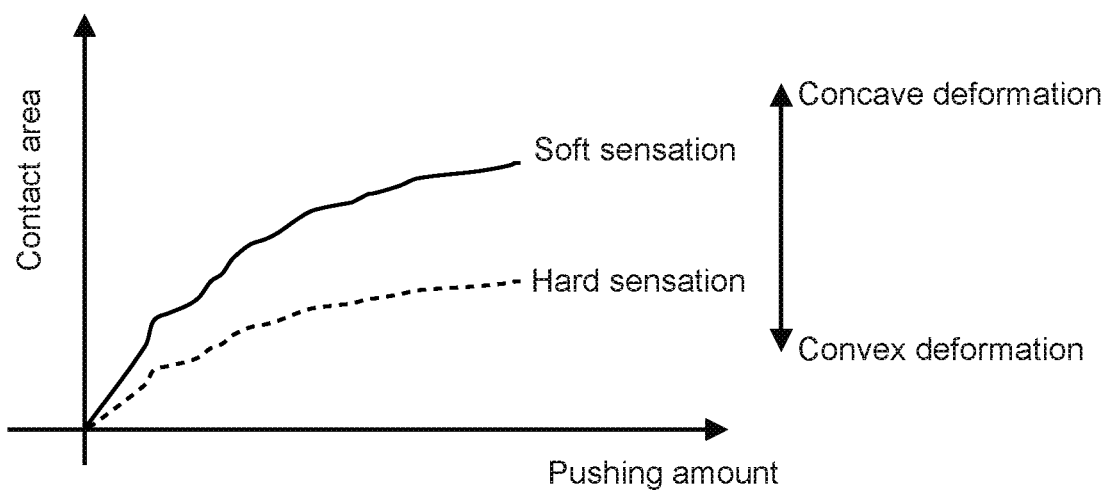
FIG. 64 A schematic diagram showing an operation of a control unit based on an output of the contact sensor of the tactile presentation system.

FIG. 64 shows an example of an operation of the control unit 160 based on an output of the contact sensor 161. It is a graph showing a change in contact area in association with the pushing amount with respect to the contact surface M. As shown in the figure, the control unit 160 deforms the contact surface M in accordance with the output of the contact sensor 161, so that it can be used as a change in contact area in association with the pushing amount or an input feedback of a user interface (UI).

Figure 65:
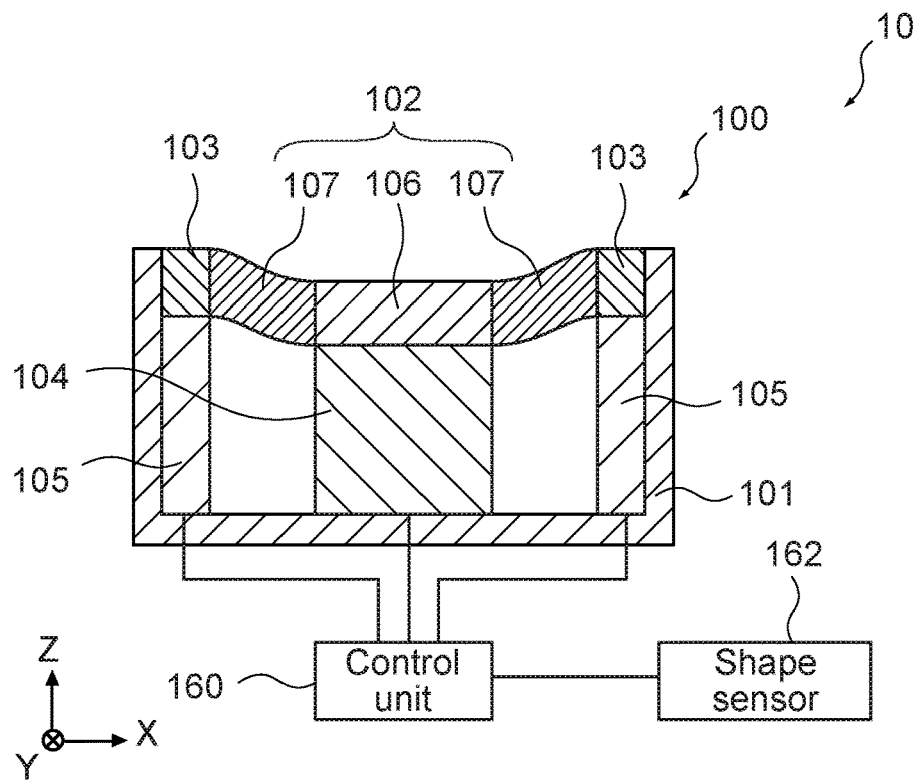
FIG. 65 A schematic diagram of the tactile presentation system including a shape sensor according to the first embodiment of the present technology.

The tactile presentation system 10 may include a shape sensor. FIG. 65 is a schematic diagram of the tactile presentation system 10 including a shape sensor 162. The shape sensor 162 is a sensor for detecting the shape of the contact surface M. Specifically, the shape sensor 162 is a camera (optical sensor), a flex sensor, or the like. The shape sensor 162 is connected to the control unit 160 and supplies a sensing result to the control unit 160.

Figure 66:
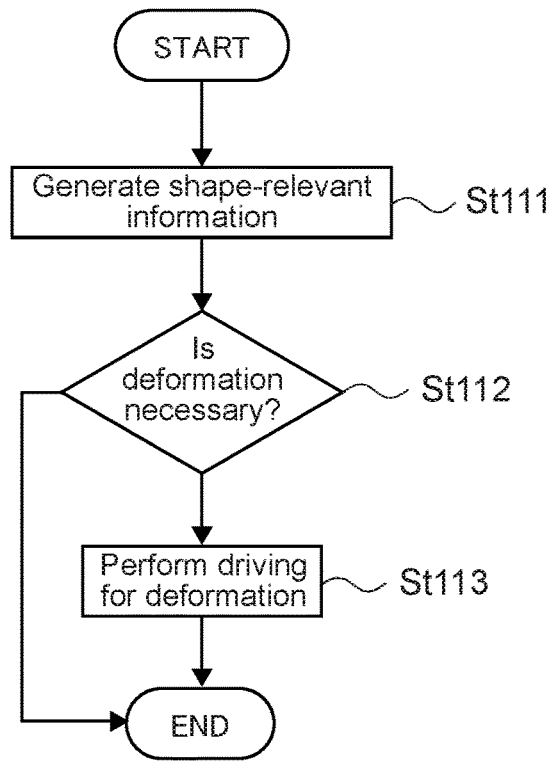
FIG. 66 A flowchart showing an operation of the tactile presentation system.

FIG. 66 is a flowchart showing an operation of the tactile presentation system 10 including the shape sensor 162. The shape sensor 162 senses a shape of the contact surface M and generates shape-relevant information including the sensing result (Still). When the shape sensor 162 supplies the shape-relevant information to the control unit 160, the control unit 160 determines whether or not deformation of the contact surface M is necessary on the basis of the shape-relevant information (St112). In a case where deformation is necessary, the control unit 160 respectively drives the first driving portion 104 and the second driving portion 105 and deforms the contact surface M (St113). The control unit 160 deforms the contact surface M in accordance with the output of the shape sensor 162, so that it can deform the shape of the contact surface M with a higher accuracy.

Alternatively, the tactile presentation system 10 may include both the contact sensor 161 and the shape sensor 162 and the control unit 160 may respectively control the first driving portion 104 and the second driving portion 105 on the basis of both outputs of the contact sensor 161 and the shape sensor 162.

[Hardware Configurations of Control Unit]

Figure 67:
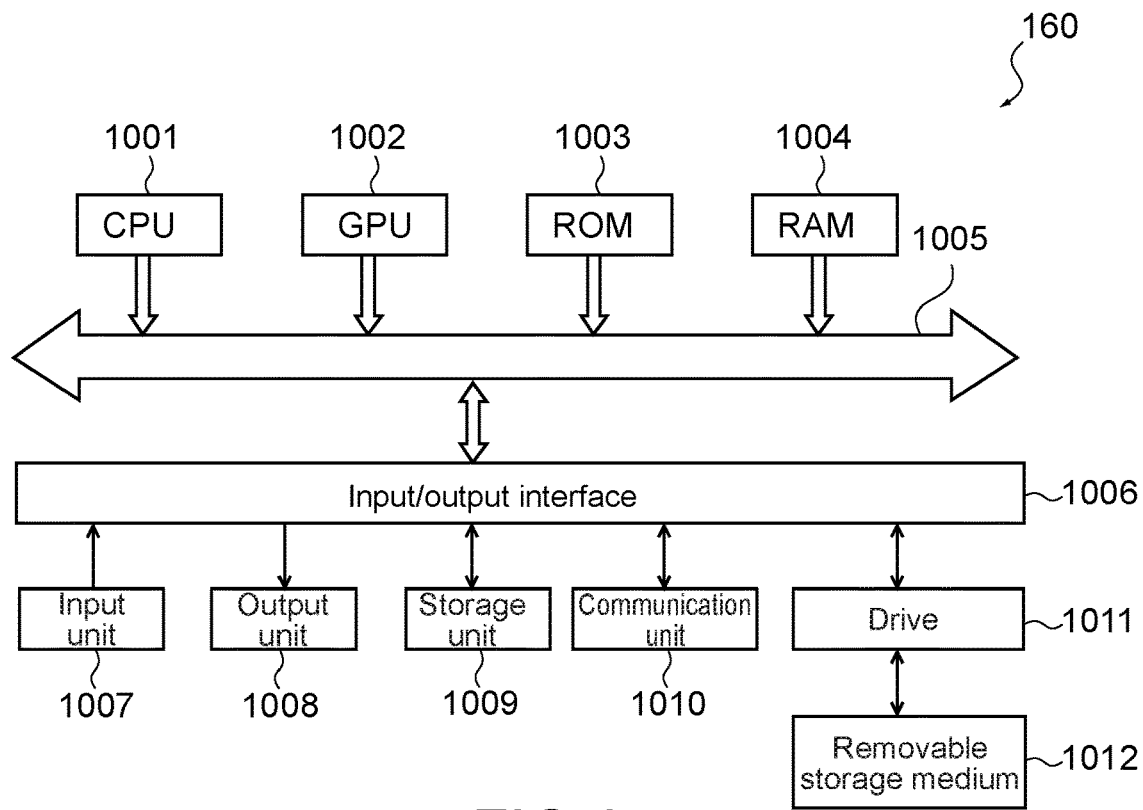
FIG. 67 A block diagram showing hardware configurations of the control unit provided in the tactile presentation system.

Hardware configurations that can achieve functional configurations of the control unit 160 provided in the tactile presentation system 10 will be described. FIG. 67 is a schematic diagram showing these hardware configurations.

As shown in the figure, the control unit 160 includes a central processing unit (CPU) 1001 and a graphics processing unit (GPU) 1002 that are built in it. An input/output interface 1006 is connected to the CPU 1001 and the GPU 1002 via a bus 1005. A read only memory (ROM) 1003 and a random access memory (RAM) 1004 are connected to the bus 1005.

To the input/output interface 1006, connected are an input unit 1007 including an input device such as a keyboard and a mouse for the user to input the operation command, an output unit 1008 that outputs images of processing operation screens and processing results to the display device, a storage unit 1009 including a hard disk drive and the like for storing programs and various types of data, and a communication unit 1010 that includes a local area network (LAN) adaptor and the like and executes communication processing via a network represented by represented. Moreover, a drive 1011 is also connected to the input/output interface 1006. The drive 1011 reads and writes data from/to the removable storage medium 1012 such as a magnetic disk, an optical disc, a magneto-optical disk, and a semiconductor memory.

The CPU 1001 executes various types of processing in accordance with a program stored in the ROM 1003 or a program read out from the removable storage medium 1012 such as a magnetic disk, an optical disc, a magneto-optical disk, and a semiconductor memory, installed in the storage unit 1009, and loaded to the RAM 1004 from the storage unit 1009. The RAM 1004 also stores as appropriate data and the like necessary for the CPU 1001 to execute various types of processing. The GPU 1002 executes calculation processing necessary for image drawing under the control by the CPU 1001.

The control unit 160 configured in the above-mentioned manner performs the above-mentioned series of processing by the CPU 1001 loading a program stored in, for example, the storage unit 1009 to the RAM 1004 via the input/output interface 1006 and the bus 1005 and executing it.

The program executed by the control unit 160 can be provided, recorded on the removable storage medium 1012 as a package medium, for example. Moreover, the program can be provided via a wired or wireless transmission medium such as a local area network, the Internet, and digital satellite broadcasting.

In the control unit 160, the program can be installed to the storage unit 1009 via the input/output interface 1006 by mounting the removable storage medium 1012 on the drive 1011. Moreover, the program can be received by the communication unit 1010 and can be installed to the storage unit 1009 via the wired or wireless transmission medium. In addition, the program can be installed in the ROM 1003 and the storage unit 1009 in advance.

It should be noted that the program executed by the control unit 160 may be a program in which processes are time-sequentially performed in the order described in the present disclosure and may be a program in which processes are performed in parallel or at a necessary timing, e.g., at the time of calling.

Moreover, the hardware configurations of the control unit 160 do not need to be all mounted in a single apparatus, and a plurality of apparatuses may configure the control unit 160. Moreover, some of the hardware configurations of the control unit 160 may be mounted on a plurality of apparatuses connected via a network.

Second Embodiment

A tactile presentation apparatus according to a second embodiment of the present technology will be described.

[Configuration of Tactile Presentation Apparatus]

The tactile presentation apparatus according to the present embodiment presents a tactile sense to a "contact object" that touches the tactile presentation apparatus. Although it is not particularly limited thereto, the contact object may be the user's finger, hand, or other body parts.

Figure 68:
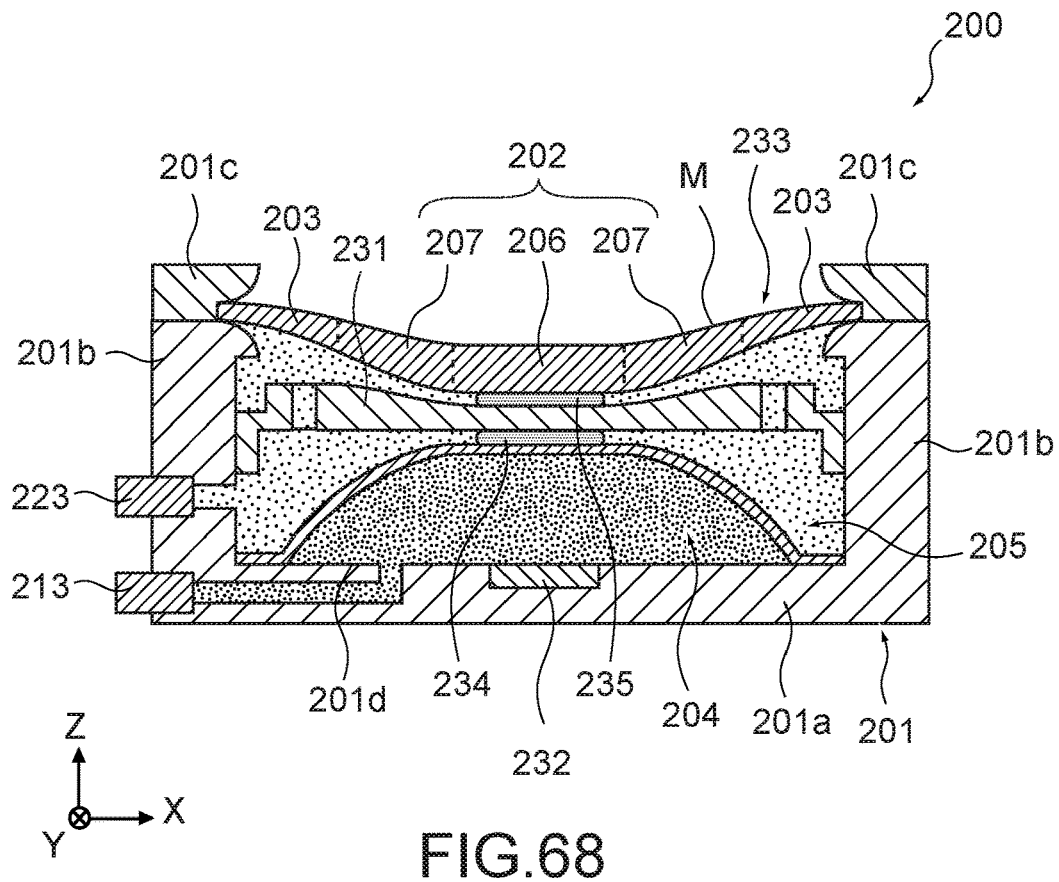
FIG. 68 A cross-sectional view of a tactile presentation apparatus according to a second embodiment of the present technology.
Figure 69:
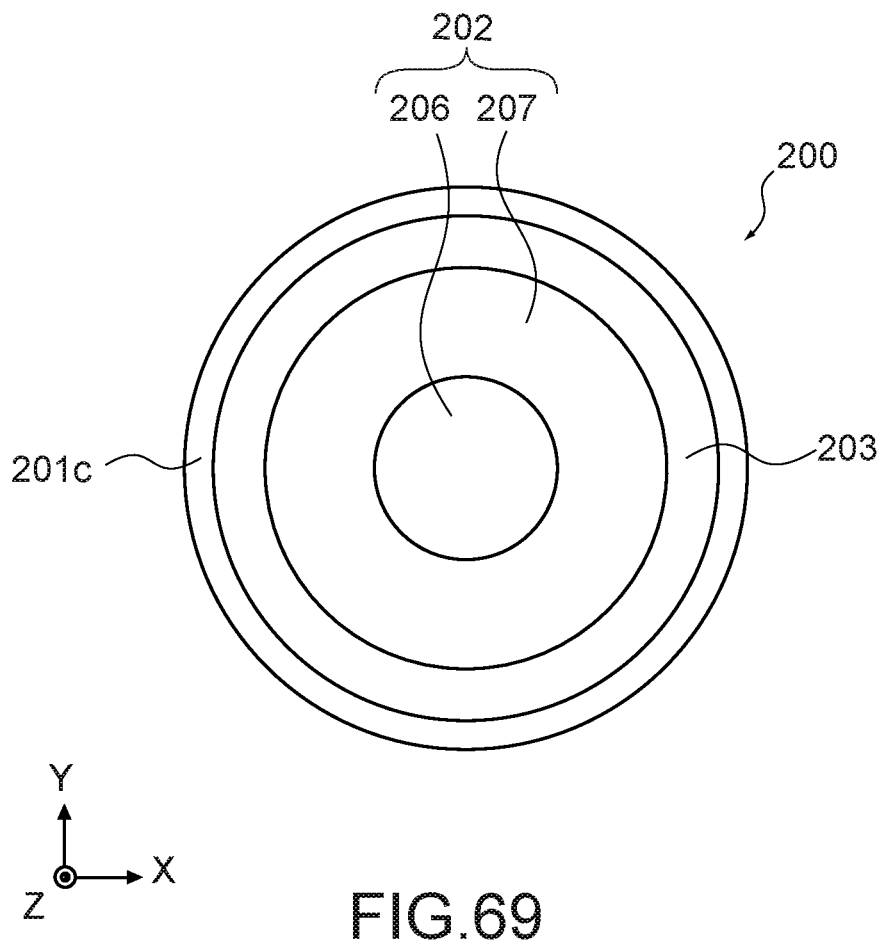
FIG. 69 A plan view of the tactile presentation apparatus.

FIG. 68 is a cross-sectional view of a tactile presentation apparatus 200 according to the present embodiment. FIG. 69 is a plan view of the tactile presentation apparatus 200. As shown in FIGS. 68 and 69, the tactile presentation apparatus 200 includes a retaining portion 201, a contact portion 202, a peripheral portion 203, a first driving portion 204, a second driving portion 205, an ascending/descending portion 231, and a distance sensor 232.

The retaining portion 201 supports the contact portion 202 and the peripheral portion 203. The retaining portion 201 has a bottom portion 201a, a side wall portion 201b, and a fixed portion 201c as shown in FIG. 68. The bottom portion 201a has a bottom surface 201d in a flat plate shape parallel to the X-Y plane. The side wall portion 201b is provided in a direction perpendicular to the bottom surface 201d from a peripheral edge of the bottom surface 201d. The side wall portion 201b has a tubular shape surrounding the outer periphery of the peripheral portion 203. The side wall portion 201b is held in contact with the peripheral portion 203. The fixed portion 201c is joined with a top end of the side wall portion 201b, sandwiches the peripheral portion 203 together with the side wall portion 201b, and fixes the peripheral portion 203 to the retaining portion 201. The material for the retaining portion 101 is not particularly limited, and may be made of a synthetic resin or metal, for example.

Figure 70:
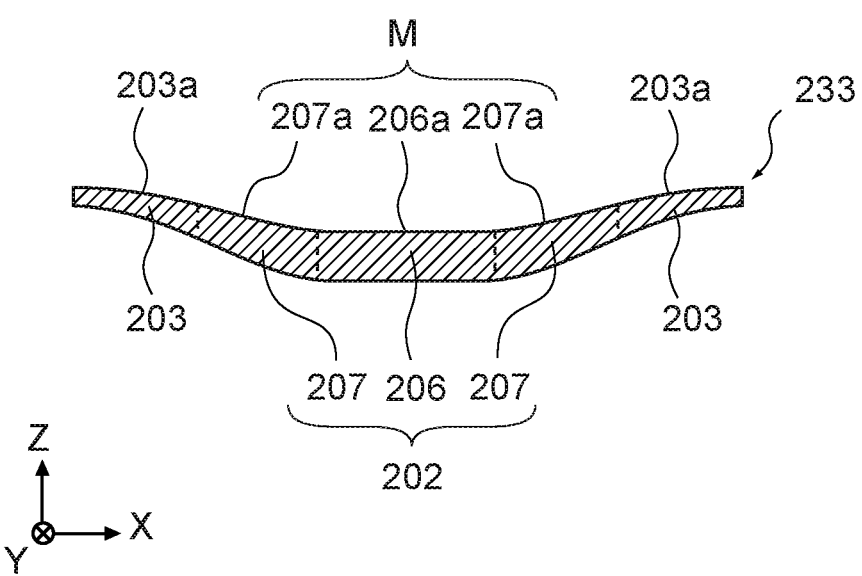
FIG. 70 A cross-sectional view of an upper film provided in the tactile presentation apparatus.

The contact portion 202 is a portion that is touched by a contact object. FIG. 70 is a cross-sectional view showing the contact portion 202 and the peripheral portion 203. As shown in the figure, the contact portion 202 and the peripheral portion 203 are formed of an upper film 233. The upper film 233 is made of a stretchable material that prevents a fluid from passing through it. For example, the upper film 233 may be made of silicon, urethane, or rubber. Moreover, the upper film 233 may be a stack of a film that prevents a fluid from passing through it, such as silicon, and a film that allows a fluid to pass through it, such as mesh fabric. As shown in FIG. 70, the contact portion 202 includes a central portion 206 and a connection portion 207.

The central portion 206 has a first contact surface 206a that is a surface opposite to the bottom surface 201d. The first contact surface 206a can be a plane parallel to the X-Y plane. However, the first contact surface 206a may be a curved surface. As shown in FIG. 69, the central portion 206 may have a circular shape as viewed in the Z direction.

The connection portion 207 connects the central portion 206 and the peripheral portion 203 and has a second contact surface 207a that is a surface opposite to the bottom surface 201d. The second contact surface 207a is a surface continuous with the first contact surface 206a. A boundary between the first contact surface 206a and the second contact surface 207a has no step, and the first contact surface 206a and the second contact surface 207a are smoothly connected. Hereinafter, the first contact surface 206a and the second contact surface 207a will be jointly referred to as a contact surface M. As shown in FIG. 69, the connection portion 207 may have an annular shape surrounding the outer periphery of the central portion 206 as viewed in the Z direction.

It should be noted that in order to distinguish the first contact surface 206a from the second contact surface 207a, the central portion 206 may have properties different from those of the connection portion 207. Specifically, the first contact surface 206a and the second contact surface 207a may differ in appearance (e.g., color and reflection properties) or may differ in shape (e.g., as protruding and depressed shapes). Additionally, the first contact surface 206a and the second contact surface 207a may differ in surface properties (e.g., micro-shape and friction coefficient).

As shown in FIG. 68, the peripheral portion 203 sandwiches the contact portion 202 in a cross-portion parallel to the Z direction and connected to the central portion 206 through the connection portion 207. A surface of the peripheral portion 203, which is located opposite to the bottom surface 201d, will be referred to as a surface 203a. As shown in FIG. 69, the peripheral portion 203 may have an annular shape surrounding the connection portion 207 as viewed in the Z direction. It should be noted that the plan shape of the contact portion 202 and the peripheral portion 203 is not limited to the circular shape shown in FIG. 69, and may be various plan shapes (see FIGS. 49 to 58) as in the first embodiment.

Figure 71:
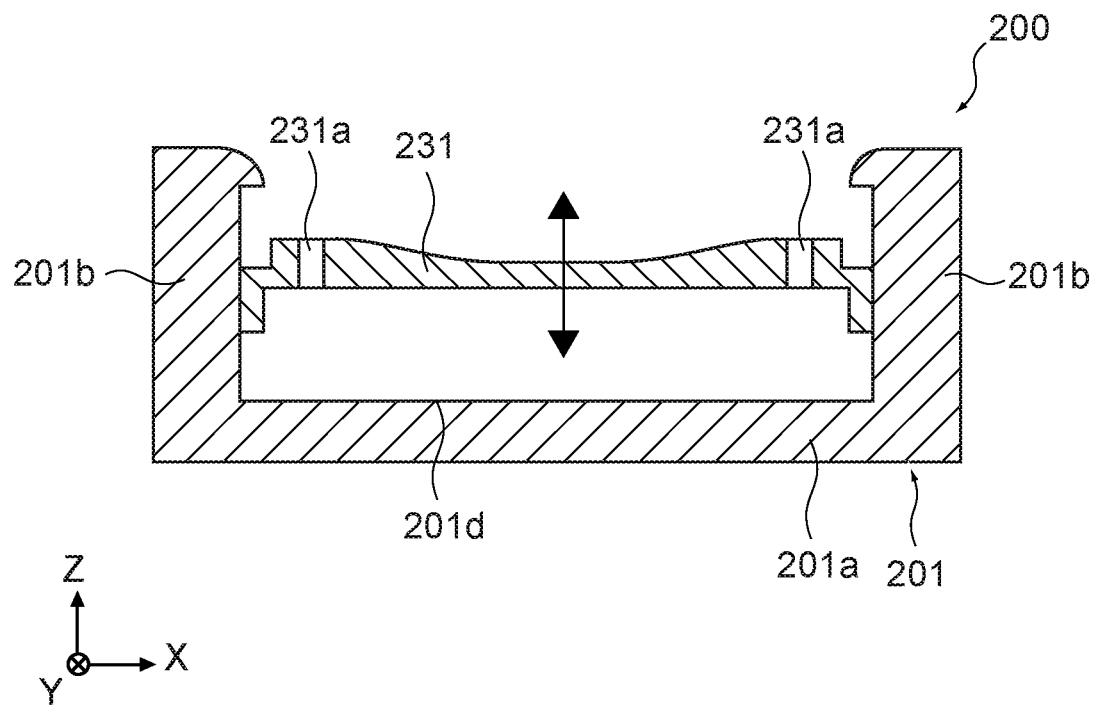
FIG. 71 A schematic diagram showing ascending/descending of an ascending/descending portion provided in the tactile presentation apparatus.

The ascending/descending portion 231 ascends/descends with respect to the retaining portion 201. FIG. 71 is a schematic diagram showing ascending/descending of the ascending/descending portion 231. As shown by the arrow in the figure, the ascending/descending portion 231 moves with respect to the retaining portion 201 in the Z direction. The ascending/descending portion 231 may be engaged with a guide groove (not shown), which is provided in the side wall portion 201b and extends in the Z direction, so that it can move along the guide groove.

The guide groove has a width of for example, 10 μm to 200 μm. An inner peripheral portion of the guide groove may be covered with a low-friction material such as polytetrafluoroethylene (PTFE) and polyoxymethylene (POM). Moreover, oil, wax, or the like may be applied to the inner peripheral portion of the guide groove. Moreover, a portion engaged with the guide groove of the ascending/descending portion 231 may be also covered with such a low-friction material and oil, wax, or the like may be applied to it. The ascending/descending portion 231 has a through-hole 231a. It is sufficient to have at least one through-hole 231a.

Figure 72:
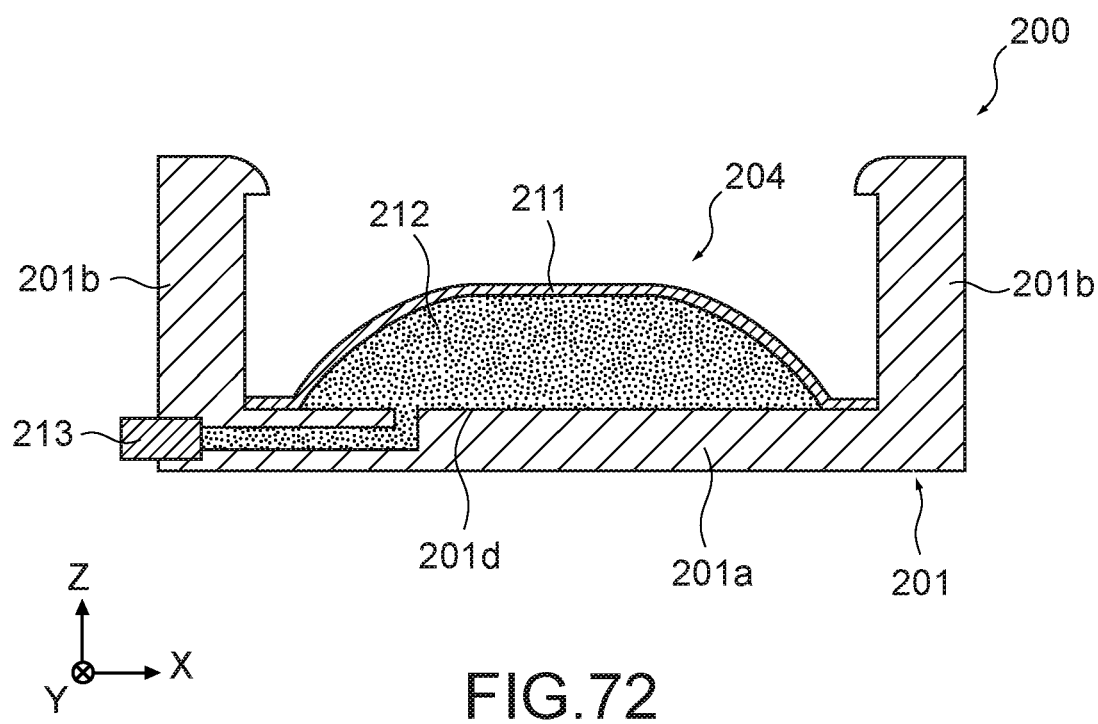
FIG. 72 A schematic diagram showing a first driving portion provided in the tactile presentation apparatus.

The first driving portion 204 drives the central portion 206 to change the height of the central portion 206 from the retaining portion 201 and the press force to the central portion 206. It should be noted that the "height from the retaining portion 201" can be the "height from the bottom surface 201d" and the same shall apply hereinafter. FIG. 72 is a schematic diagram showing a configuration of the first driving portion 204. As shown in the figure, the first driving portion 204 may be a fluid control mechanism including a lower film 211, a fluid 212, and a first driving source 213.

The lower film 211 is made of a stretchable material that prevents a fluid from passing through it. For example, the lower film 211 may be made of silicon, urethane, or rubber. Moreover, the lower film 211 may be a stack of a film that prevents a fluid from passing through it, such as silicon, and a film that allows a fluid to pass through it, such as mesh fabric. The first driving source 213 is a fluid control apparatus capable of fluid control, such as a pump. The first driving source 213 controls the pressure of the fluid 212 in the lower film 211. Hereinafter, the pressure of the fluid 212 in the lower film 211 by the first driving source 213 will be referred to as an internal pressure Q1. It should be noted that the fluid 212 may be the air, a nitrogen gas, water, a magnetorheological fluid, or an electrorheological (ER) fluid, for example.

Figure 73:
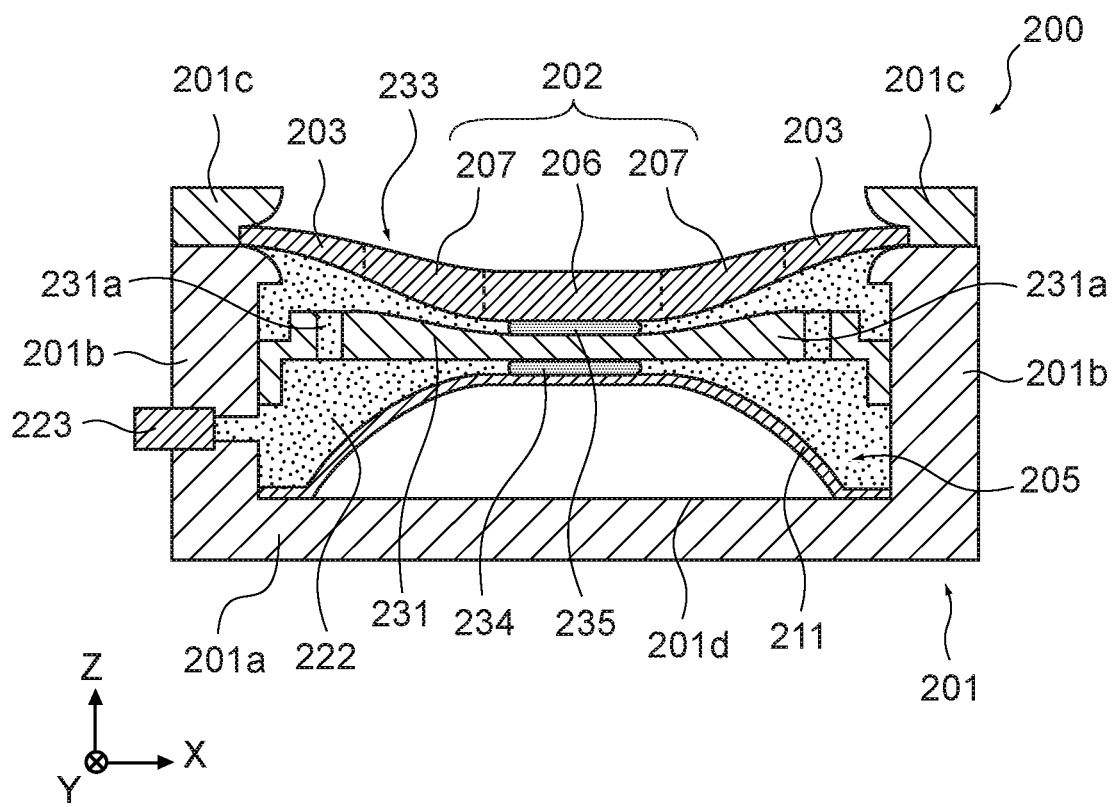
FIG. 73 A schematic diagram showing a second driving portion provided in the tactile presentation apparatus.

The second driving portion 205 drives the peripheral portion 203 to change the height of the peripheral portion 203 from the retaining portion 201 and the press force to the peripheral portion 203. FIG. 73 is a schematic diagram showing a configuration of the second driving portion 205. As shown in the figure, the second driving portion 205 may be a fluid control mechanism including a fluid 222 and a second driving source 223.

The fluid 222 is housed in a space sealed by the upper film 233 and a lower film and can flow via the through-hole 231a of the ascending/descending portion 231. The second driving source 223 is a fluid control apparatus capable of fluid control, such as a pump. The second driving source 223 controls the pressure of the fluid 222 in the space. Hereinafter, the pressure of the fluid 222 in the space sealed by the upper film 233 and the lower film by the second driving source 213 will be referred to as an internal pressure Q2. It should be noted that the fluid 222 may be the air, a nitrogen gas, water, a magnetorheological fluid, or an electrorheological (ER) fluid, for example.

As shown in FIG. 73, a joining portion 234 joins the respective center regions of the ascending/descending portion 231 and the lower film 211. Moreover, a joining portion 235 joins the respective center regions of the ascending/descending portion 231 and the upper film 233. The joining portion 234 and the joining portion 235 are not particularly limited as long as they can join the two members, and a double sided tape, an adhesion, welding, swaging, or screwing, for example, may be used. It should be noted that setting the joining portion 234 and the joining portion 235 to have an area (e.g., a width of 2 mm to 20 mm) smaller than a finger pulp causes less discomfort when touching the contact portion 202 with the finger, which is favorable.

Figure 74:
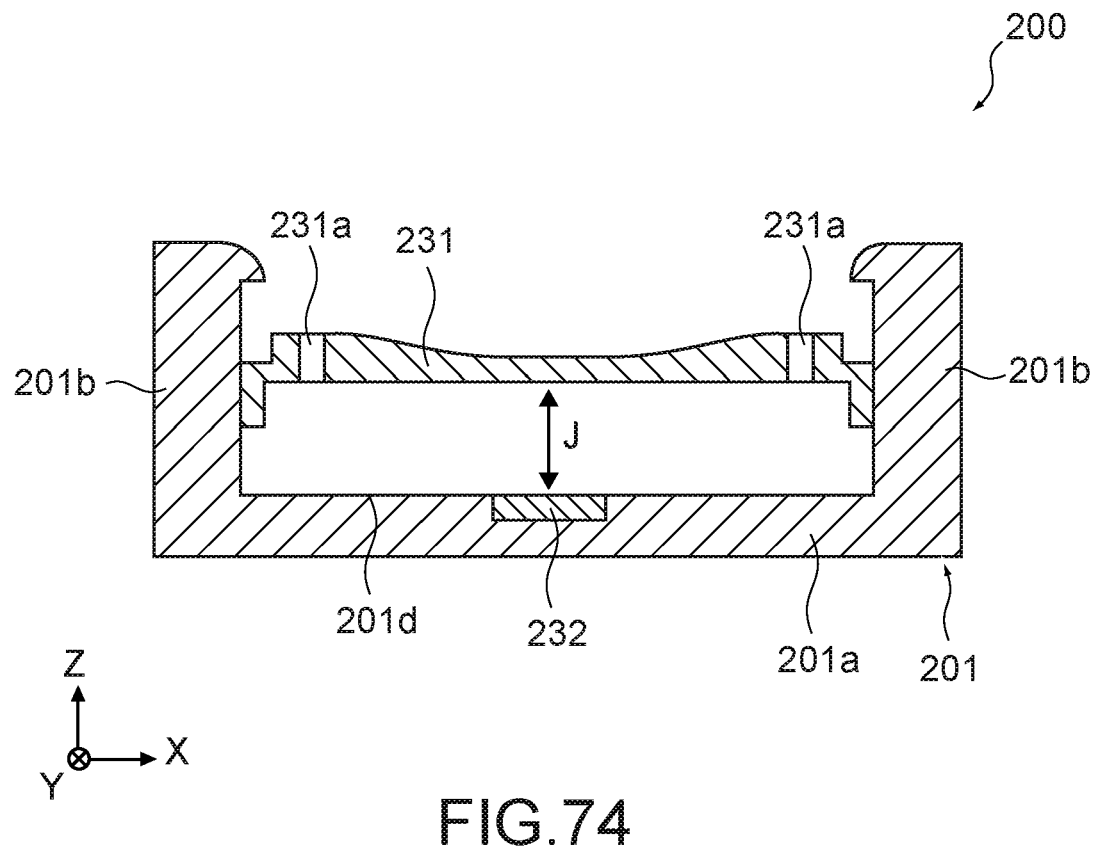
FIG. 74 A schematic diagram showing a distance detected by a distance sensor provided in the tactile presentation apparatus.

The distance sensor 232 detects a distance between the distance sensor 232 and the ascending/descending portion 231. FIG. 74 is a schematic diagram showing distance detection by the distance sensor 232. As shown in the figure, the distance sensor 232 detects a distance J between the distance sensor 232 and the ascending/descending portion 231 in the Z direction. The distance detection principle by the distance sensor 232 is not particularly limited. For example, the distance sensor 232 may be a sensor that detects a distance by light reflection.

Regarding Heights and Press Forces of Central Portion and Peripheral Portion

Figure 75A:
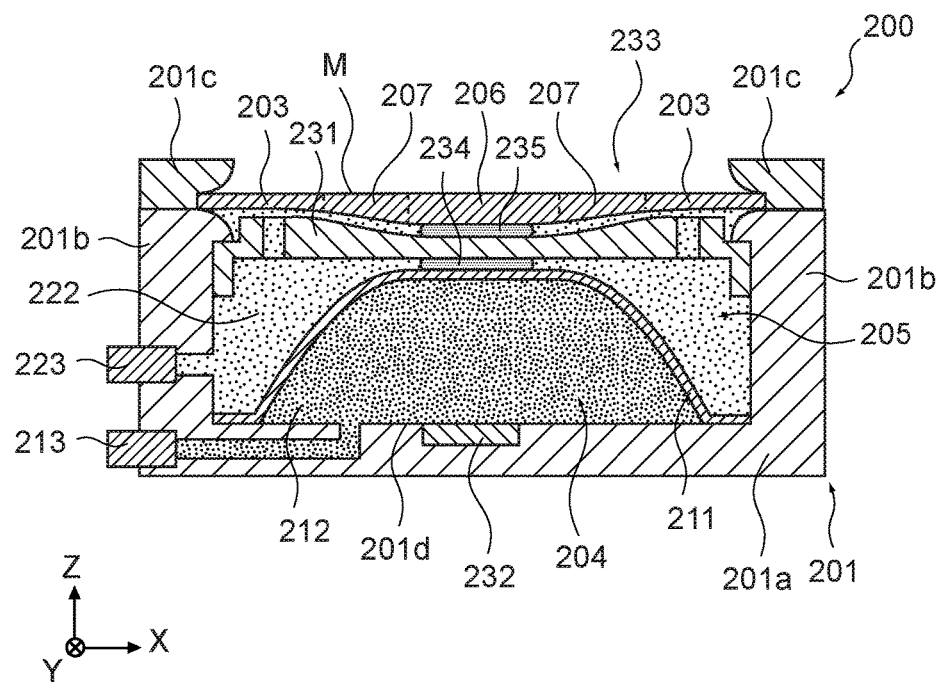
FIGS. 75A and 75B A schematic diagram showing deformation of the upper film by the first driving portion provided in the tactile presentation apparatus.
Figure 75B:
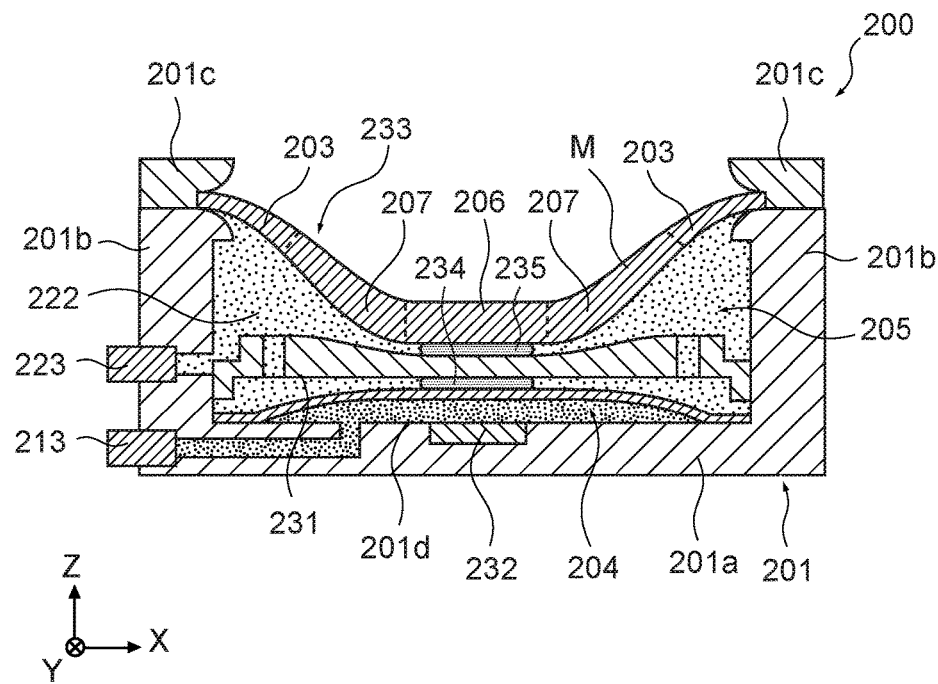

The first driving portion 204 drives the central portion 206 to change the height of the central portion 206 from the retaining portion 201 and the press force to the central portion 206. FIGS. 75A and 75B are schematic diagrams showing driving by the first driving portion 204. As shown in FIG. 75A, the first driving portion 204 increases the pressure of the fluid 212 in the lower film 211 (the internal pressure Q1) so as to expand the lower film 211, thereby moving the ascending/descending portion 231 and the central portion 206 in a direction away from the retaining portion 201. Accordingly, the upper film 233 is brought into contact with the ascending/descending portion 231 in the area from the central portion 206 to the peripheral portion 203 and deforms into a shape conforming to the shape of the ascending/descending portion 231.

Moreover, as shown in FIG. 75B, the first driving portion 204 reduces the internal pressure Q1 so as to contract the lower film 211, thereby moving the ascending/descending portion 231 and the central portion 206 in a direction closer to the retaining portion 201. Accordingly, the upper film 233 deforms into a concave shape in such a manner that the central portion 206 joined with the ascending/descending portion 231 is recessed.

Figure 76:
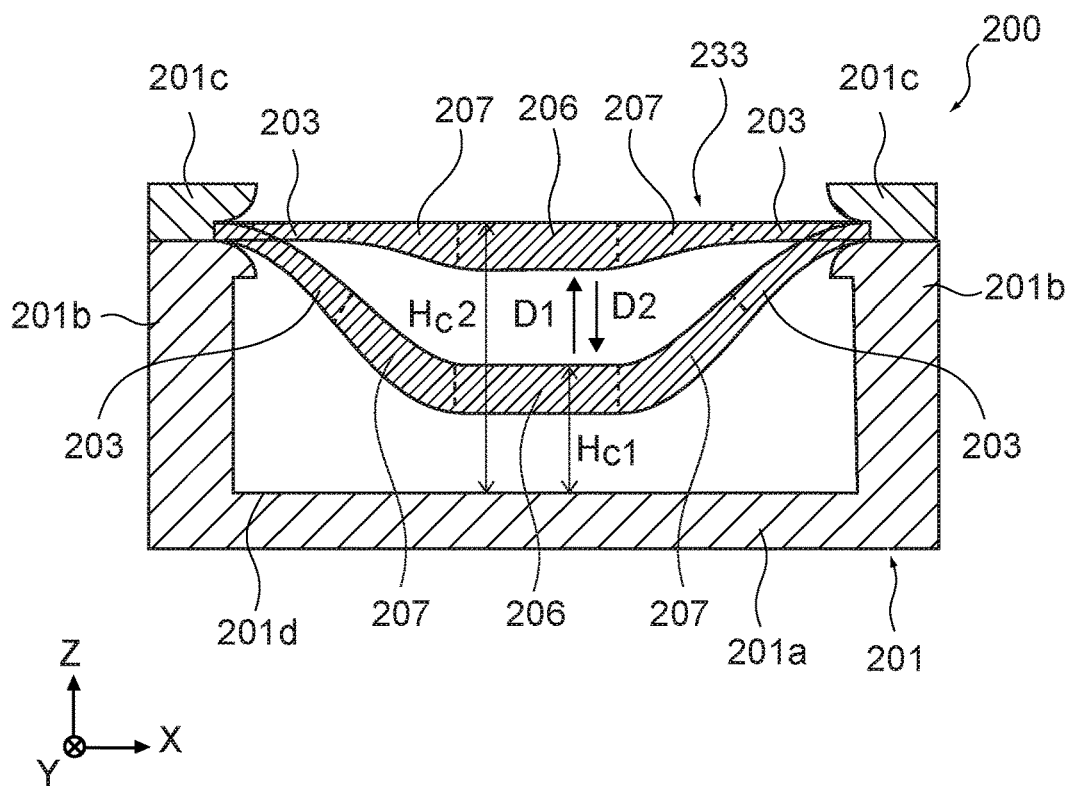
FIG. 76 A schematic diagram showing a change in height of the central portion by the first driving portion provided in the tactile presentation apparatus.

FIG. 76 is a schematic diagram showing a shape change of the upper film 233 by the first driving portion 204. As shown in the figure, the first driving portion 204 allows the central portion 206 to move in the direction away from the retaining portion 201 and the direction closer to the retaining portion 201. Hereinafter, the direction (positive Z direction) in which the central portion 206 gets away from the retaining portion 201 will be referred to as a first direction D1 and the direction (negative Z direction) in which the central portion 206 gets closer to the retaining portion 201 will be referred to as a second direction D2.

Moreover, the height of the central portion 206 from the retaining portion 201 is denoted by Hc. As shown in FIG. 76, the height of the central portion 206 located closer to the retaining portion 201 will be referred to as a height Hc1 and the height of the central portion 206 located away from the retaining portion 201 will be referred to as a height Hc2. The first driving portion 204 thus changes the height of the central portion 206 from the retaining portion 201 in the first direction D1 and the second direction D2.

Figure 77:
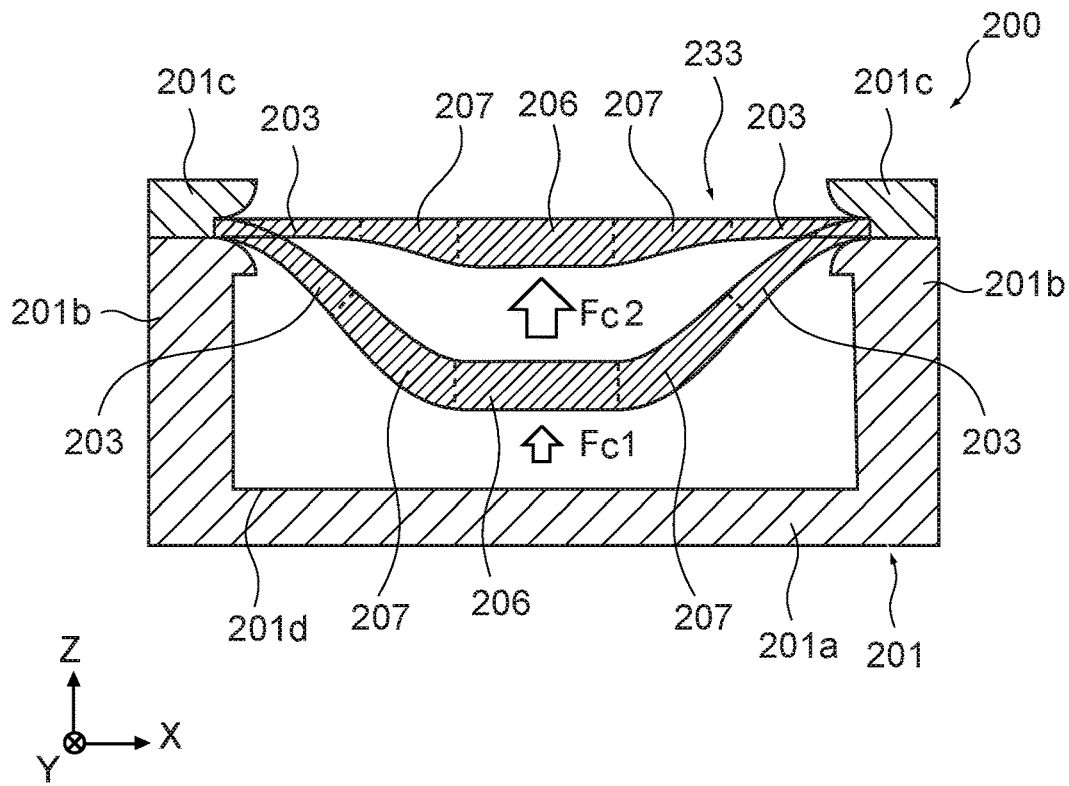
FIG. 77 A schematic diagram showing a change in press force to the central portion by the first driving portion.

FIG. 77 is a schematic diagram showing a change in press force to the central portion 206 by the first driving portion 204. Hereinafter, the press force to the central portion 206 in the first direction D1 by the first driving portion 204 will be referred to as a press force Fc. As shown in FIG. 77, the press force to the central portion 206 in the first direction D1 when the height of the central portion 206 is lower will be referred to as a press force Fc1.

Moreover, the press force to the central portion 206 in the first direction D1 when the height of the central portion 206 is higher will be referred to as a press force Fc2. It should be noted that the press force Fc when no object is in contact with the central portion 206 balances a resistive force from the upper film 233, and the central portion 206 is still. Moreover, the press force Fc when a contact object (e.g., user's finger) presses the central portion 206 balances the resistive force and a press force from the contact object, and the central portion 206 is still.

A relationship between the height of the central portion 206 from the retaining portion 201 Hc and the press force Fc to the central portion 206 may be the same correlation as in the first embodiment (see FIG. 6). It should be noted that although the correlation shown in FIG. 6 is a positive correlation in which the press force Fc increases as the height Hc increases, it may be a negative correlation in which the press force Fc decreases as the height Hc increases. In this way, the first driving portion 204 changes the press force Fc to the central portion 206 in accordance with the height Hc of the central portion 206.

Figure 78A:
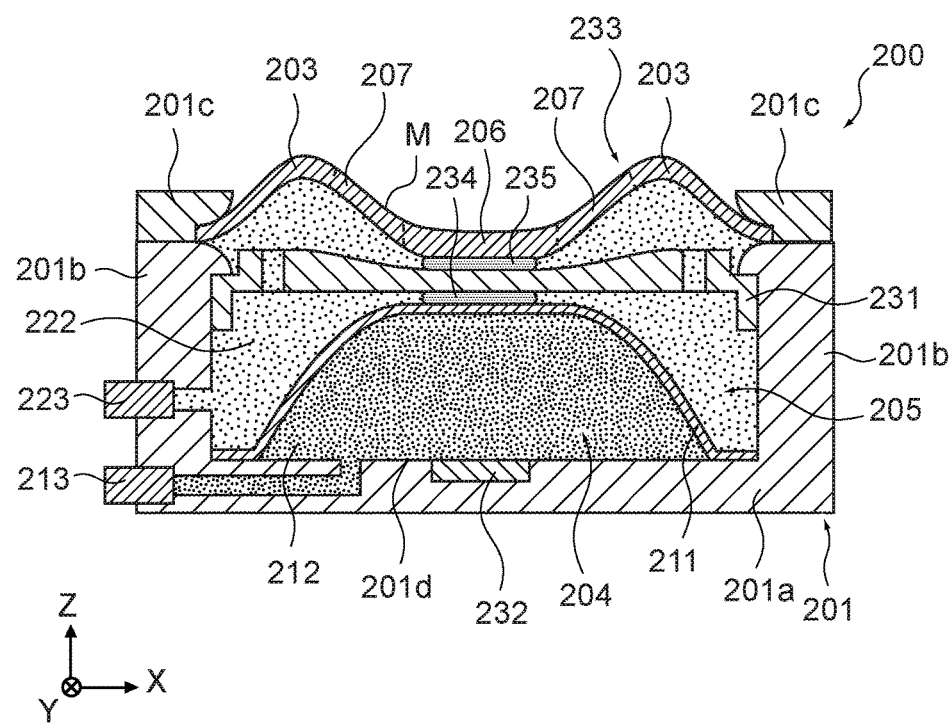
FIGS. 78A and 78B A schematic diagram showing deformation of the upper film by the first driving portion and the second driving portion provided in the tactile presentation apparatus.
Figure 78B:
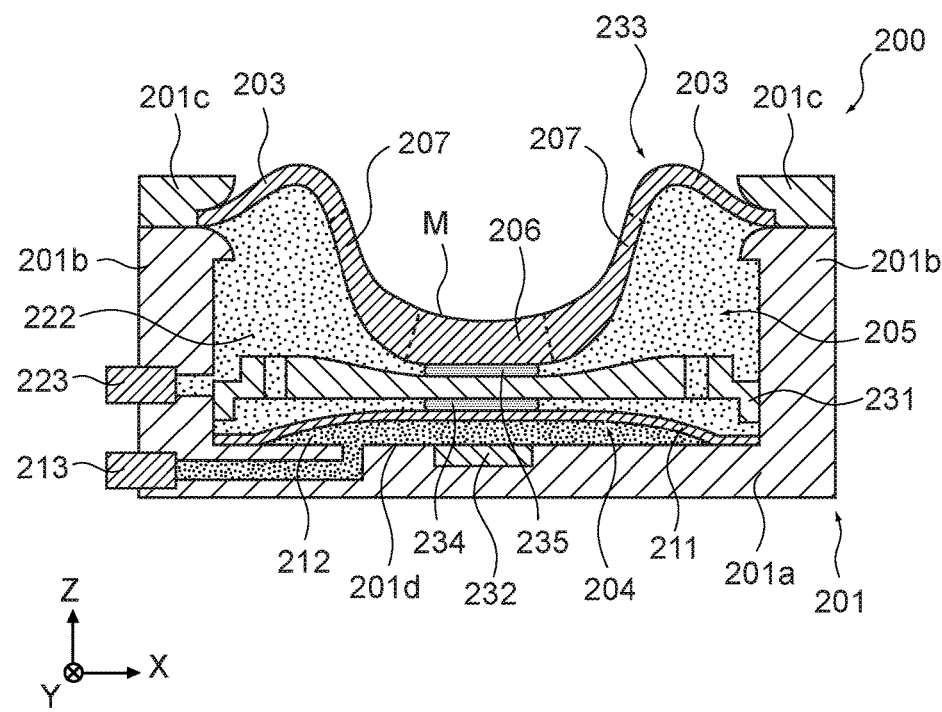

The second driving portion 205 drives the peripheral portion 203 to change the height of the peripheral portion 203 from the retaining portion 201 and the press force to the peripheral portion 203. FIGS. 78A and 78B are schematic diagrams showing driving by the second driving portion 205. FIG. 78A shows a state in which the lower film 211 has been expanded. FIG. 78B shows a state in which the lower film 211 has contracted.

In a state in which the lower film 211 has been expanded, as shown in FIG. 78A, the second driving portion 205 increases the pressure (internal pressure Q2) of the fluid 222 sealed between the upper film 233 and the lower film 211 so as to expand the upper film 233, thereby moving the peripheral portion 203 in the direction away from the retaining portion 201. Accordingly, the upper film 233 deforms into a concave shape in such a manner that the central portion 206 joined with the ascending/descending portion 231 is recessed and the periphery of the central portion 206 protrudes.

Moreover, when the second driving portion 205 reduces the internal pressure Q2, as shown in FIG. 75A, the upper film 233 contracts, thereby moving the peripheral portion 203 in the direction closer to the retaining portion 201. At this time, the fluid 222 flows via the through-hole 231a of the ascending/descending portion 231. Accordingly, the upper film 233 is brought into contact with the ascending/descending portion 231 in the area from the central portion 206 to the peripheral portion 203 and deforms into a shape conforming to the shape of the ascending/descending portion 231.

In a state in which the lower film 211 has contracted, as shown in FIG. 78B, the second driving portion 205 increases the internal pressure Q2 so as to expand the upper film 233, thereby moving the peripheral portion 203 in the direction away from the retaining portion 201. Accordingly, the upper film 233 deforms into a concave shape in such a manner that the central portion 206 joined with the ascending/descending portion 231 is greatly recessed and the periphery of the central portion 206 protrudes.

Moreover, when the second driving portion 205 reduces the internal pressure Q2, as shown in FIG. 75B, the upper film 233 contracts, thereby moving the peripheral portion 203 in the direction closer to the retaining portion 201. At this time, the fluid 222 flows via the through-hole 231a of the ascending/descending portion 231. Accordingly, the upper film 233 deforms into a concave shape in such a manner that the central portion 206 joined with the ascending/descending portion 231 is recessed.

Figure 79:
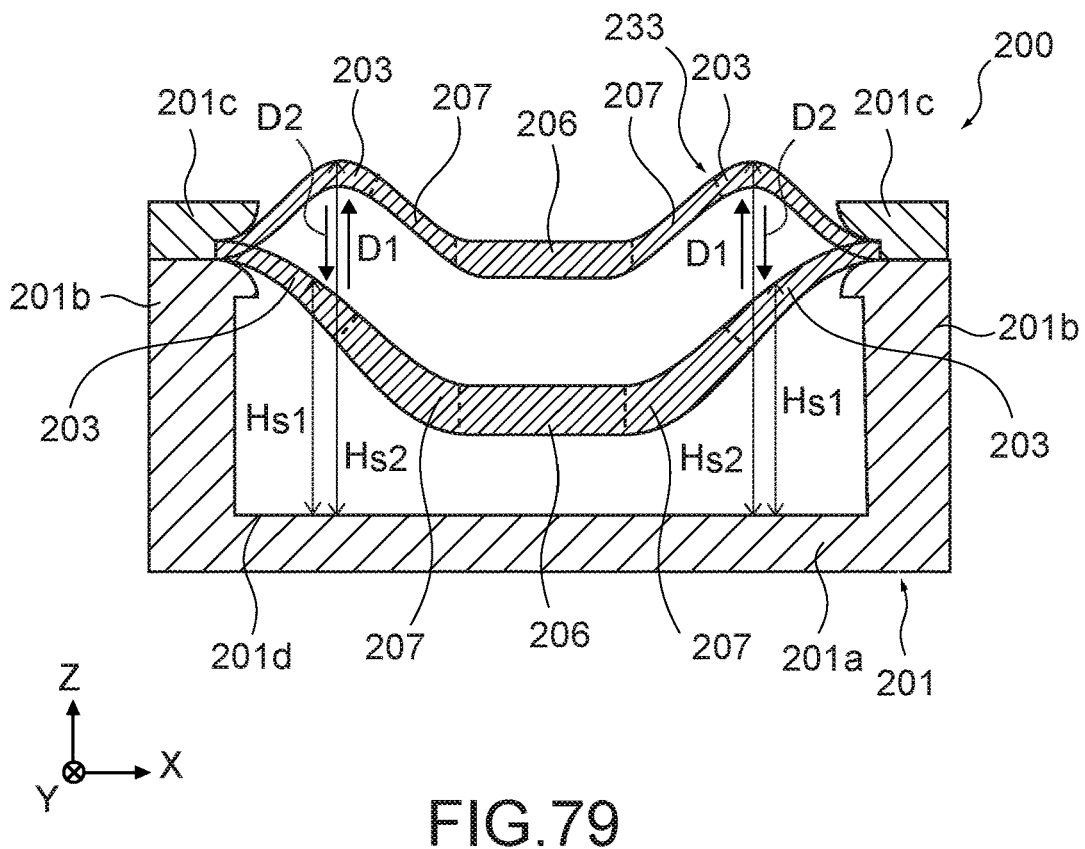
FIG. 79 A schematic diagram showing a change in height of the peripheral portion by the first driving portion and the second driving portion.

FIG. 79 is a schematic diagram showing a shape change of the upper film 233 by the first driving portion 204 and the second driving portion 205. As shown in the figure, the first driving portion 204 and the second driving portion 205 move the peripheral portion 203 in the first direction D1 (positive Z direction) and the second direction D2 (negative Z direction).

Here, the height of the peripheral portion 203 from the retaining portion 201 is denoted by Hs. As shown in FIG. 79, the height of the peripheral portion 203 located closer to the retaining portion 201 will be referred to as a height Hs' and the height of the peripheral portion 203 located away from the retaining portion 201 will be referred to as a height Hs2. The first driving portion 204 and the second driving portion 205 thus change the height of the peripheral portion 203 from the retaining portion 201 in the first direction D1 and the second direction D2.

Figure 80:
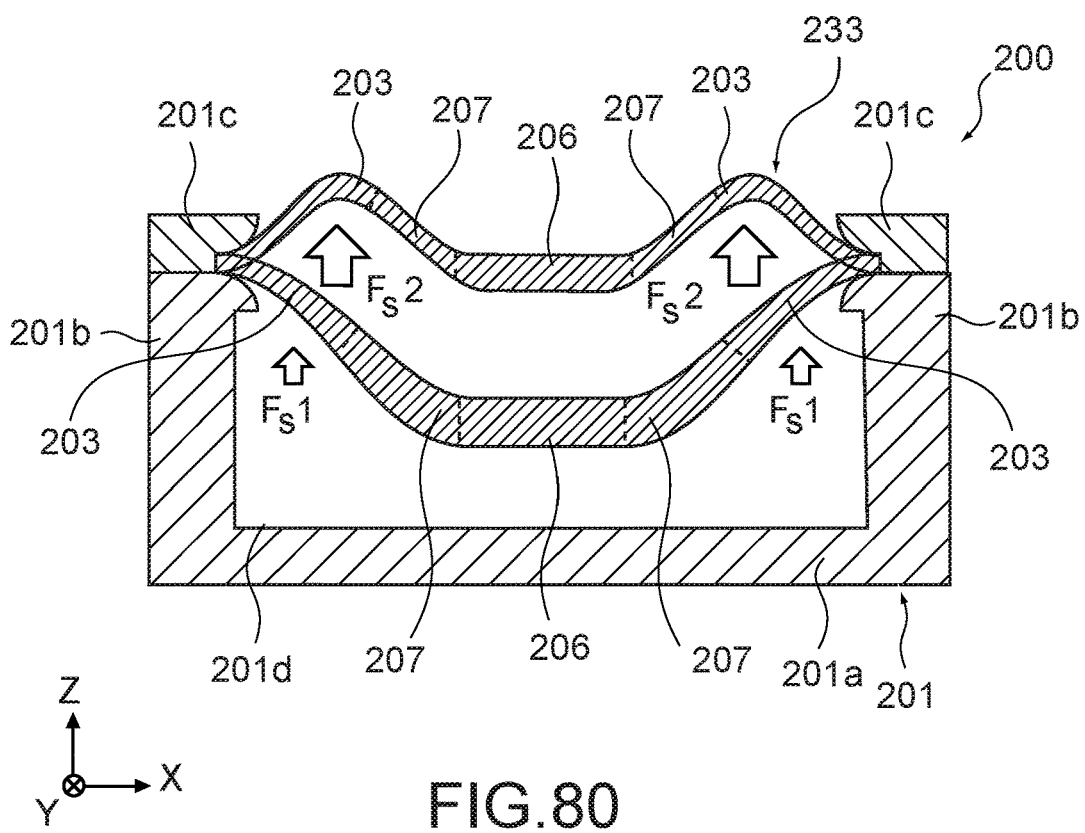
FIG. 80 A schematic diagram showing a change in press force to the peripheral portion by the first driving portion and the second driving portion.

FIG. 80 is a schematic diagram showing a change in press force to the peripheral portion 203 by the first driving portion 204 and the second driving portion 205. Hereinafter, the press force to the peripheral portion 203 in the first direction D1 by the first driving portion 204 and the second driving portion 205 will be referred to as a press force Fs. As shown in FIG. 80, the press force to the peripheral portion 203 in the first direction D1 when the height of the peripheral portion 203 is lower will be referred to as a press force Fs1. Moreover, the press force to the central portion 206 in the first direction D1 when the height of the central portion 206 is higher will be referred to as a press force Fs2. It should be noted that the press force Fs balances a resistive force from the upper film 233, and the peripheral portion 203 is still.

A relationship between the height of the peripheral portion 203 from the retaining portion 201 Hs and the press force to the central portion 206 Fs may be the same correlation as in the first embodiment (see FIG. 10). It should be noted that although the correlation shown in FIG. 10 is a positive correlation in which the press force Fs increases as the height Hc increases, it may be a negative correlation in which the press force Fs decreases as the height Hs increases. In this way, the first driving portion 204 and the second driving portion 205 change the press force Fs to the peripheral portion 203 in accordance with the height Hs of the peripheral portion 203.

Operation of Tactile Presentation Apparatus

An operation of the tactile presentation apparatus 200 will be described. FIGS. 81 to 84 are schematic diagrams showing the operation of the tactile presentation apparatus 200. As described above, the tactile presentation apparatus 200 is capable of changing each of the height Hc of the central portion 206 and the height Hs of the peripheral portion 203 and is also capable of changing each of the press force Fc to the central portion 206 and the press force Fs to the peripheral portion 203. These heights and press forces can be controlled using the pressure (internal pressure Q1) in the lower film 211 by the first driving source 213 and the pressure (internal pressure Q2) in the space sealed by the upper film 233 and the lower film by the second driving source 223.

Figure 81:
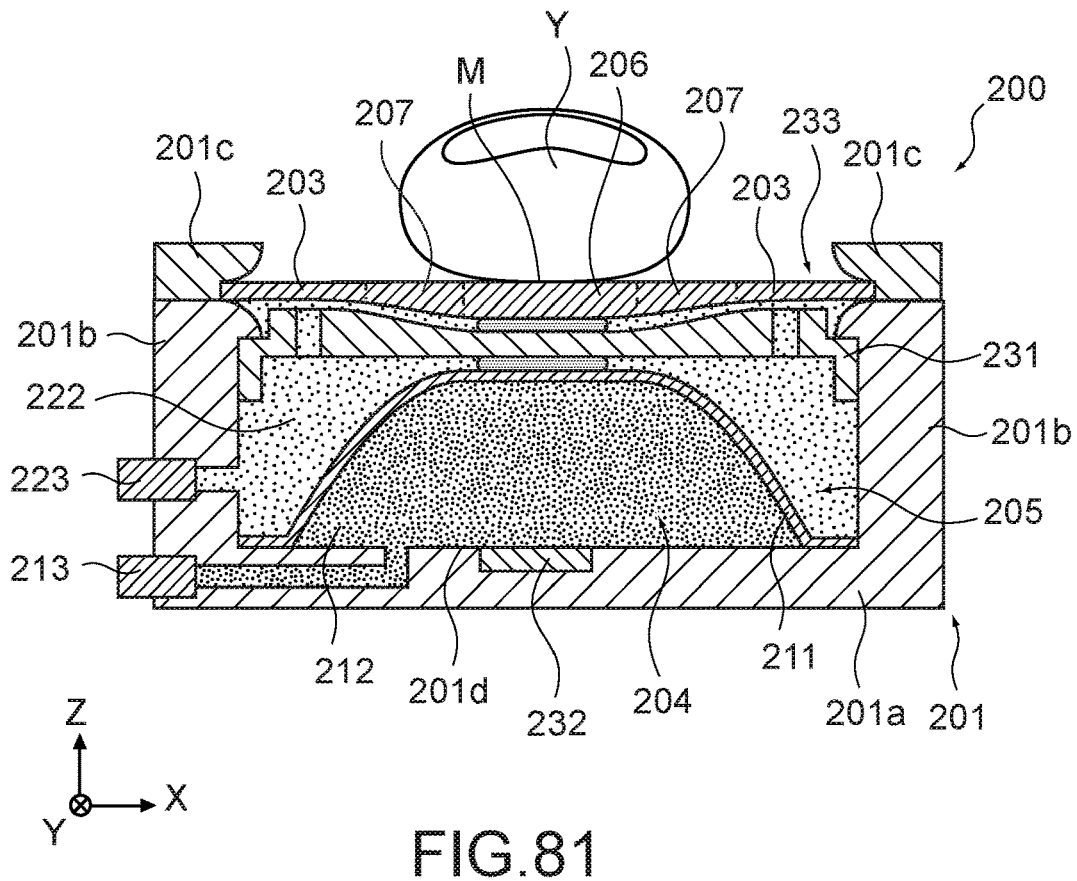
FIG. 81 A schematic diagram showing an operation of the tactile presentation apparatus.

FIG. 81 is a schematic diagram showing a shape of the upper film 233 when the internal pressure Q1 is a positive pressure and the internal pressure Q2 is a negative pressure. As shown in the figure, in this case, the upper film 233 is brought into contact with the ascending/descending portion 231 in the area from the central portion 206 to the peripheral portion 203 and deforms into a shape conforming to the shape of the ascending/descending portion 231. As shown in FIG. 81, the ascending/descending portion 231 can be shaped so that the contact surface M is flat. The finger Y in contact with the contact surface M can sense the plan shape of the contact surface M.

Figure 82:
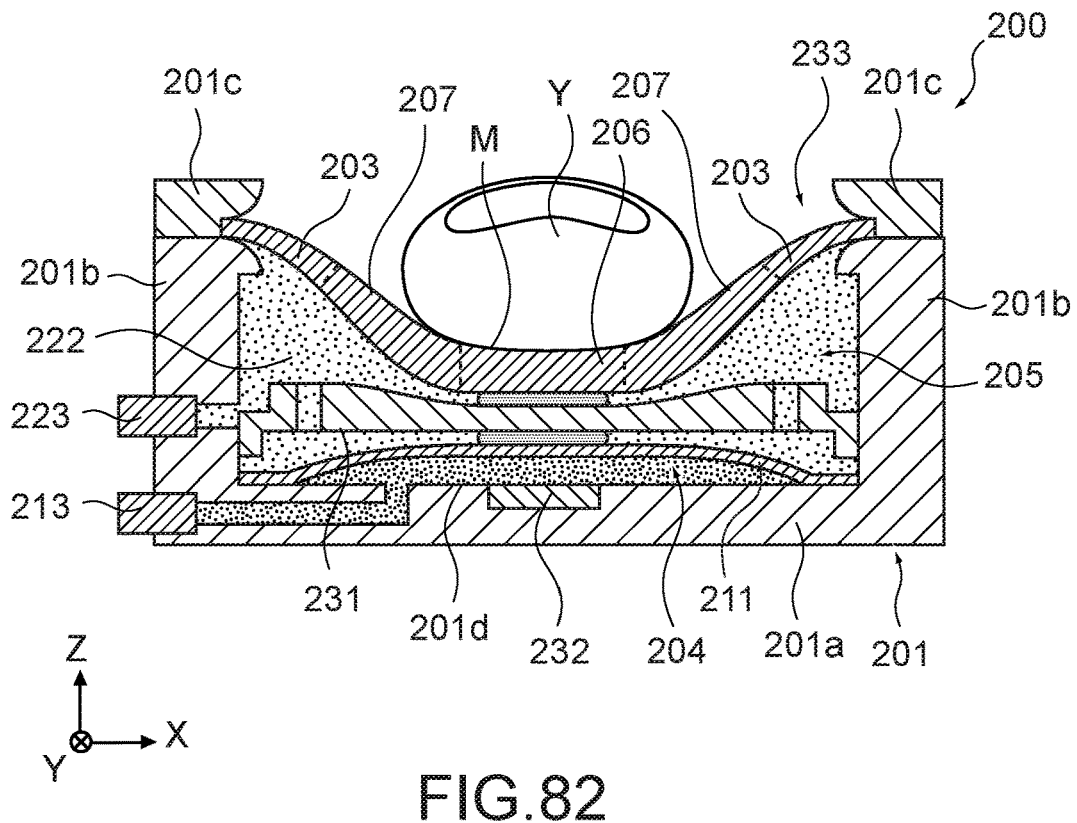
FIG. 82 A schematic diagram showing an operation of the tactile presentation apparatus.

Reducing the internal pressure Q1 or increasing the press force of the finger Y to the upper film 233 from the state shown in FIG. 81 deforms the upper film 233 so that the central portion 206 gets closer to the retaining portion 201 as shown in FIG. 82. The pushing amount of the finger Y depends on the balance between the press force of the finger Y to the upper film 233 and the internal pressure Q1. The distance sensor 232 detects the distance J (see FIG. 74) between the ascending/descending portion 231 and the retaining portion 201 and the first driving source 213 is capable of controlling the internal pressure Q1 so that the pushing amount of the finger Y can be a predetermined amount on the basis of the distance J. The finger Y in contact with the contact surface M can sense the plan shape of the contact surface M and the reaction force depending on the pushing amount.

Figure 83:
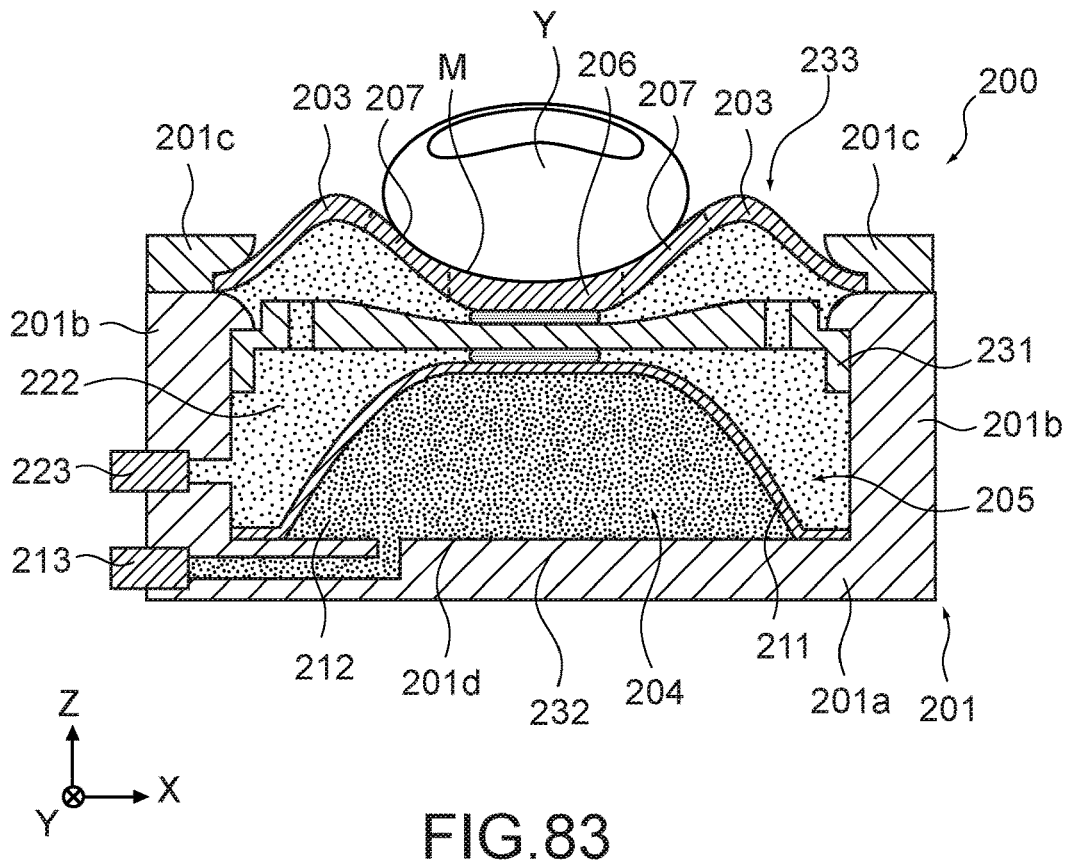
FIG. 83 A schematic diagram showing an operation of the tactile presentation apparatus.

Moreover, setting the internal pressure Q2 to be a positive pressure from the state shown in FIG. 81 causes deformation so that the periphery of the central portion 206 of the upper film 233 protrudes as shown in FIG. 83. The finger Y in contact with the contact surface M can sense the concave shape of the contact surface M. In addition, setting the internal pressure Q2 to be a positive pressure from the state shown in FIG. 82 causes deformation so that the central portion 206 of the upper film 233 is greatly recessed and the periphery of the central portion 206 protrudes as shown in FIG. 84.

Figure 84:
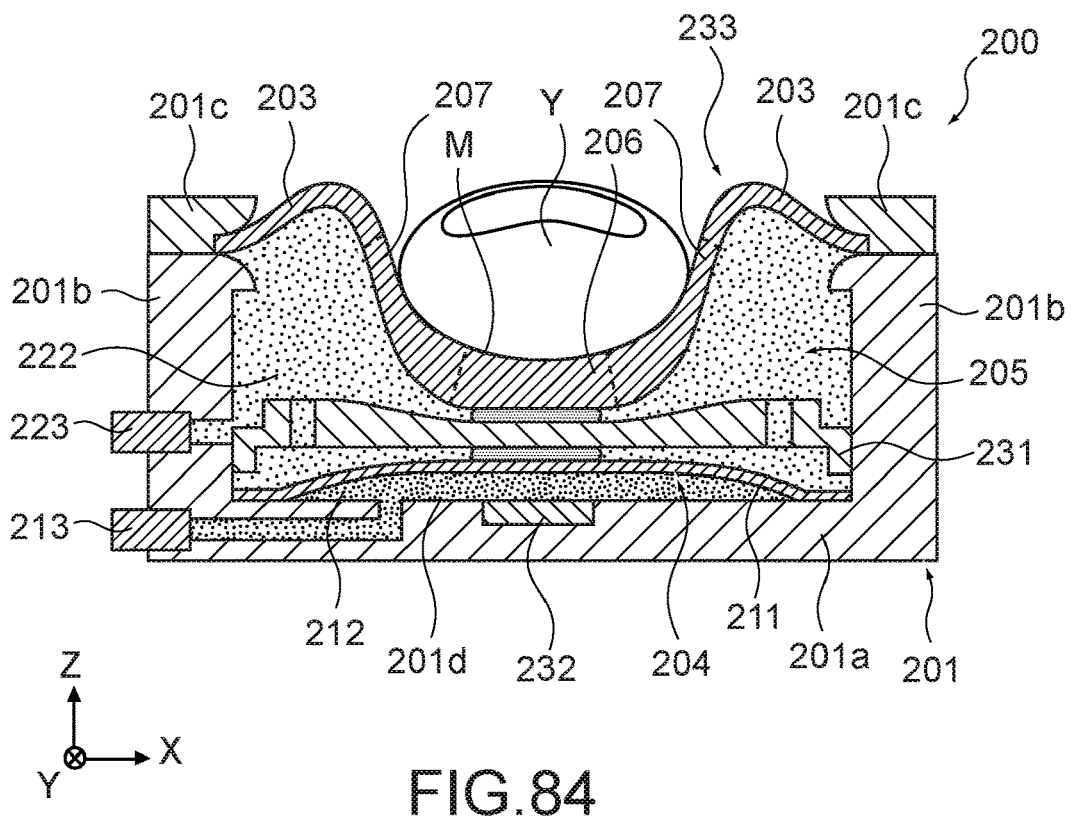
FIG. 84 A schematic diagram showing an operation of the tactile presentation apparatus.

Moreover, lowering the internal pressure Q1 or increasing the press force of the finger Y to the upper film 233 from the state shown in FIG. 83 may deform the upper film 233 into the shape shown in FIG. 84. The first driving source 213 is capable of controlling the internal pressure Q1 so that the pushing amount of the finger Y can be the predetermined amount on the basis of the distance J (see FIG. 74) detected by the distance sensor 232. The finger Y in contact with the contact surface M can sense the concave shape of the contact surface M and the reaction force depending on the pushing amount.

Effects Given by Tactile Presentation Apparatus

Effects given by the tactile presentation apparatus 200 will be described. As described above, the tactile presentation apparatus 200 is capable of controlling the shape of the contact surface M by changing the peripheral portion 203 and the height of the central portion 206. This enables the tactile presentation apparatus 200 to present the shape of the contact surface M and its change to the user touching the contact surface M and also to control the contact area of the contact surface M with the finger Y.

In addition, the tactile presentation apparatus 200 is capable of changing each of the press forces of the central portion 206 and the peripheral portion 203. As described above, the height Hc of the central portion 206 determines the press force Fc and the height Hs of the peripheral portion 203 determines the press force Fs. Therefore, the reaction force applied to the contact object from the contact surface M changes in accordance with the shape of the contact surface M. This enables the reaction force from the contact surface M to be changed while controlling the contact area of the contact surface M with the contact object. It also enables the height of the contact surface M from the retaining portion 201 to be changed while controlling the contact area of the contact surface M with the contact object.

Regarding Various Configurations of Tactile Presentation Apparatus

The configuration of the tactile presentation apparatus 200 is not limited to the above configuration, and the following configuration may be employed.

Figure 85:
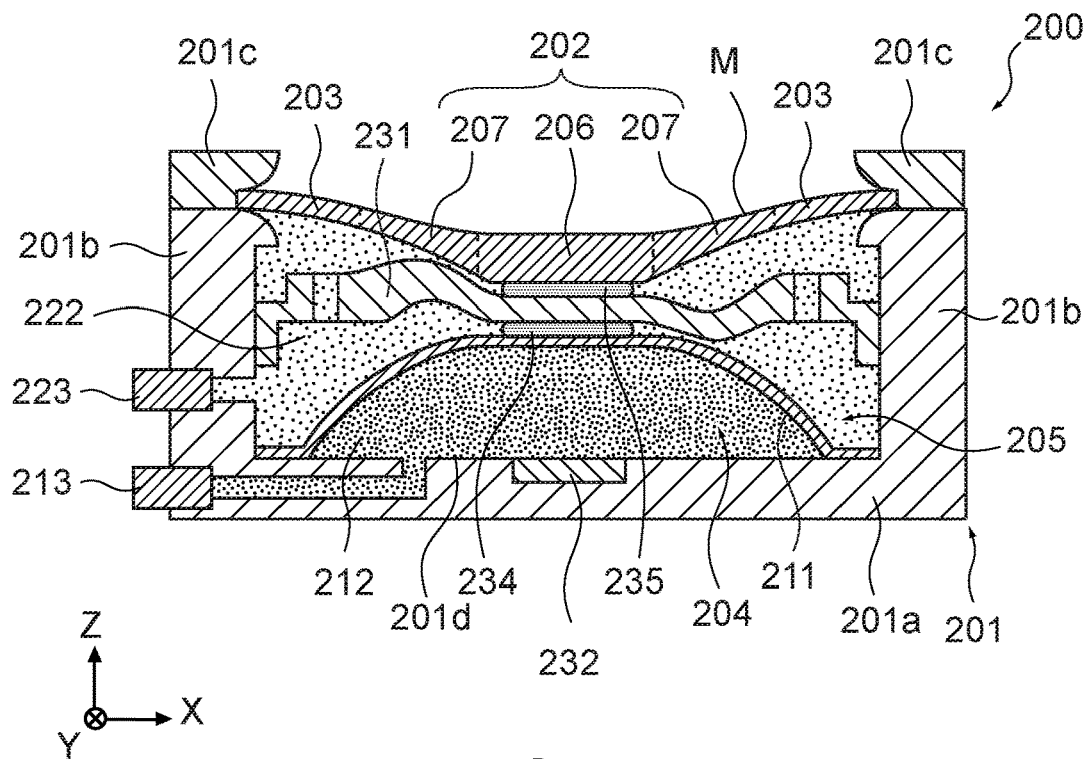
FIG. 85 A cross-sectional view of a tactile presentation apparatus with the ascending/descending portion different in the shape according to the second embodiment of the present technology.
Figure 86:
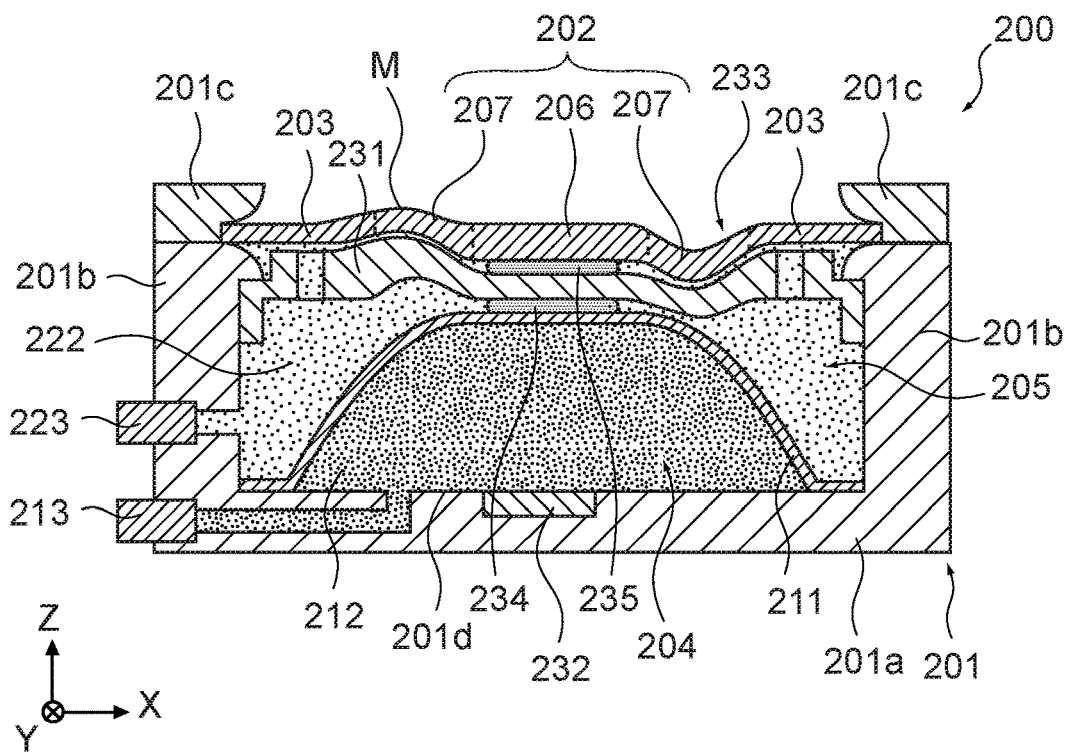
FIG. 86 A schematic diagram showing an operation of the tactile presentation apparatus.

FIG. 85 is a schematic diagram showing another configuration of the tactile presentation apparatus 200. As shown in the figure, the ascending/descending portion 231 may have a convexo-concave shape. FIG. 86 is a schematic diagram showing a shape of the upper film 233 when the internal pressure Q1 is a positive pressure and the internal pressure Q2 is a negative pressure. As shown in the figure, the upper film 233 is brought into contact with the ascending/descending portion 231 in the area from the central portion 206 to the peripheral portion 203 and deforms into a shape conforming to the shape of the ascending/descending portion 231.

In this way, the tactile presentation apparatus 200 is capable of controlling the shape of the upper film 233 in contact with the ascending/descending portion 231 by using the shape of the ascending/descending portion 231. Moreover, setting the internal pressure Q2 to be a positive pressure enables the upper film 233 to have the concave shape (see FIGS. 78A and 78B), and also the internal pressure Q1 can be used for controlling the height of the central portion 206 and the reaction force to the contact object. It should be noted that the shape of the ascending/descending portion 231 is not limited to that shown in FIG. 85, and the ascending/descending portion 231 can have any shape.

Figure 87:
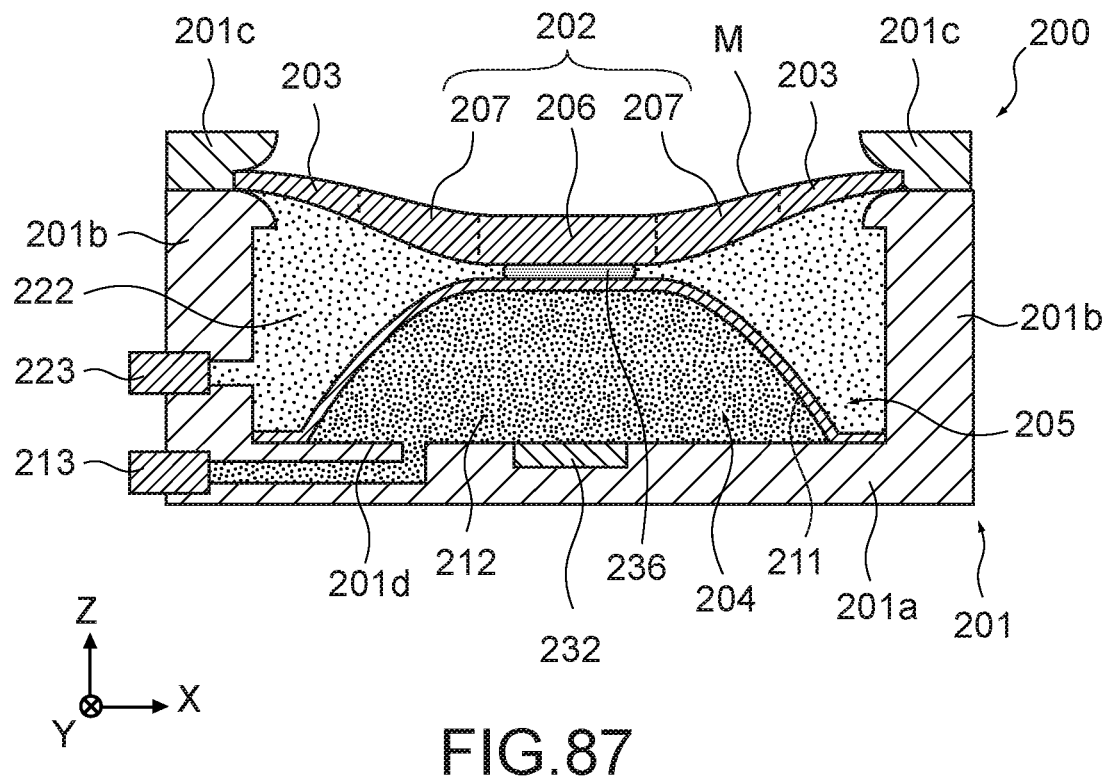
FIG. 87 A cross-sectional view of a tactile presentation apparatus without the ascending/descending portion according to the second embodiment of the present technology.
Figure 88:
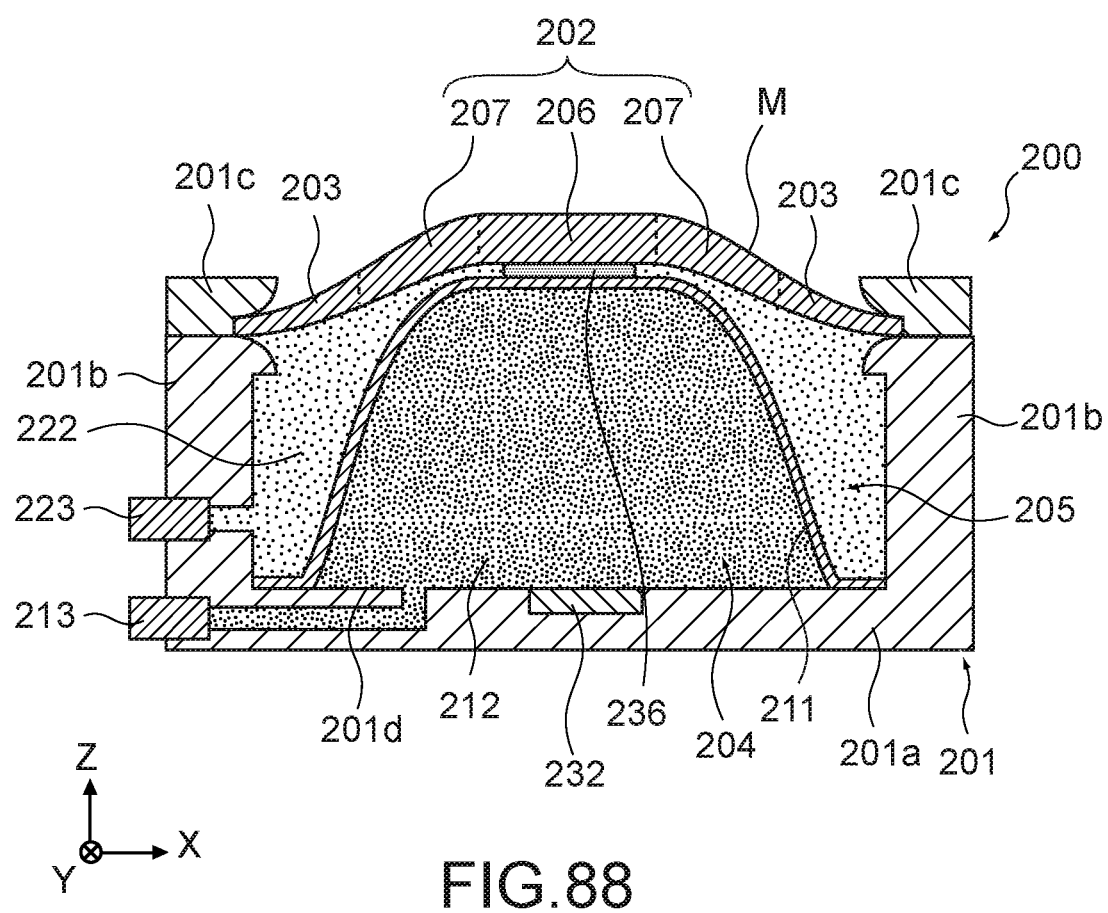
FIG. 88 A schematic diagram showing an operation of the tactile presentation apparatus.

Moreover, FIG. 87 is a schematic diagram showing another configuration of the tactile presentation apparatus 200. As shown in the figure, the tactile presentation apparatus 200 may have the upper film 233 and the lower film 211 directly joined through a joining portion 236 without the ascending/descending portion 231. The joining portion 236 is not particularly limited as long as it can join the two members, and a double sided tape, an adhesion, welding, swaging, or screwing, for example, may be used. FIG. 88 is a schematic diagram showing a shape of the upper film 233 when the internal pressure Q1 is a positive pressure and the internal pressure Q2 is a negative pressure. As shown in the figure, this configuration enables the upper film 233 to deform into the convex shape. Moreover, setting the internal pressure Q2 to be a positive pressure enables the upper film 233 to have the concave shape (see FIGS. 78A and 78B), and also the internal pressure Q1 can be used for controlling the height of the central portion 206 and the reaction force to the contact object.

Configuration of Tactile Presentation System

A tactile presentation system according to the present embodiment will be described.

The tactile presentation apparatus 200 according to the present embodiment can constitute the tactile presentation system together with a control unit that controls the first driving portion 204 and the second driving portion 205 as in the first embodiment. The control unit is connected to the first driving portion 204 and the second driving portion 205 and independently controls the first driving portion 204 and the second driving portion 205.

Specifically, when the control unit receives an instruction about a tactile sense presented to the user from, for example, an information processing apparatus that provides content including tactile presentation, the control unit respectively controls the first driving portion 204 and the second driving portion 205 and determines the shape of the contact surface M and the pressure to the contact object as described above. The control unit can have the same hardware configurations as in the first embodiment (see FIG. 67). Moreover, the tactile presentation system according to the present embodiment may include a contact sensor or shape sensor as described in the first embodiment.

(Regarding Applications)

The tactile presentation apparatus 100 according to the first embodiment of the present technology and the tactile presentation apparatus 200 according to the second embodiment can be used for reproducing hard/soft sense and shape of a virtual object and a contact state with the virtual object on a skin. For example, they can be linked (or unlinked) to a sensor for acquiring device position and attitude in a device attachable to or held on a skin in order to achieve a system that presents contact area and contact shape with a virtual space object to the skin.

Moreover, the tactile presentation apparatus 100 and the tactile presentation apparatus 200 are linked (or unlinked) to an external system for detecting position and movement of a skin in, for example, an encounter-type tactile presentation apparatus in order to achieve a system that presents contact area and contact shape with a virtual space object to the skin. Introducing the configuration of the tactile presentation apparatus 100 or the tactile presentation apparatus 200 among real objects can also change senses obtained as tactile senses, such as hard/soft senses, shape senses, movements, and contact states of the real objects.

In addition, the tactile presentation apparatus 100 and the tactile presentation apparatus 200 can also be used as an input apparatus (e.g., a game controller or UI) with a tactile sense feedback (FB) for producing different shape and hard/soft senses on the same surface in accordance with a touch or push operation. In addition, a wider and high-resolution tactile presentation can also be used by arranging multiple tactile presentation apparatuses 100 or tactile presentation apparatuses 200 in an array form.

(Regarding Present Disclosure)

The effects described in the present disclosure are merely exemplary and not limitative and any other effects may be provided. The above description of the plurality of effects does not mean that those effects are simultaneously provided. It means that at least any one of the above-mentioned effects can be obtained depending on conditions and the like, and effects not described in the present disclosure can be provided. Moreover, at least two features of the features described in the present disclosure can be arbitrarily combined.

It should be noted that the present technology may also take the following configurations.

(1) A tactile presentation apparatus, including:
  a contact portion including
    a central portion having a first contact surface and
    a connection portion having a second contact surface, the second contact surface being flexible and continuous with the first contact surface;
  a peripheral portion connected to the central portion through the connection portion;
  a retaining portion that supports the contact portion and the peripheral portion;
  a first driving portion that changes a height of the central portion from the retaining portion in a first direction in which the central portion gets away from the retaining portion and a second direction and changes a press force to the central portion in the first direction in accordance with the height of the central portion from the retaining portion, the second direction being a direction opposite to the first direction; and
  a second driving portion that changes a height of the peripheral portion from the retaining portion in the first direction and the second direction and changes a press force to the peripheral portion in the first direction in accordance with the height of the peripheral portion from the retaining portion.

(2) The tactile presentation apparatus according to (1), in which
  at least one of the first driving portion or the second driving portion drives the central portion or the peripheral portion by fluid control.

(3) The tactile presentation apparatus according to (2), in which
both of the first driving portion and the second driving portion drive the central portion and the peripheral portion by fluid control.
(4) The tactile presentation apparatus according to any one of (1) to (3), in which
the first driving portion drives the central portion to achieve a first correlation between the press force to the central portion and the height of the central portion from the retaining portion, and
the second driving portion drives the peripheral portion to achieve a second correlation between the press force to the peripheral portion and the height of the peripheral portion from the retaining portion, the second correlation being different from the first correlation.
(5) The tactile presentation apparatus according to any one of (1) to (4), in which
the connection portion has different hardness between vicinity of the central portion and vicinity of the peripheral portion.
(6) The tactile presentation apparatus according to (5), in which
the connection portion has a higher hardness in the vicinity of the central portion than in the vicinity of the peripheral portion.
(7) The tactile presentation apparatus according to any one of (1) to (4), in which
the connection portion has different thickness between vicinity of the central portion and vicinity of the peripheral portion.
(8) The tactile presentation apparatus according to (7), in which
the connection portion has a larger thickness in the vicinity of the central portion than in the vicinity of the peripheral portion.
(9) The tactile presentation apparatus according to any one of (1) to (8), in which
the retaining portion includes a side wall portion held in contact with the peripheral portion, and
at least one of the peripheral portion or the side wall portion is flexible toward the contact portion.
(10) The tactile presentation apparatus according to (9), further including
a separation portion where the peripheral portion is separated, the separation portion extending toward the central portion from an outer periphery of the peripheral portion.
(11) The tactile presentation apparatus according to (9), further including
a bent portion where the peripheral portion is bent, the bent portion extending toward the central portion from an outer periphery of the peripheral portion.
(12) The tactile presentation apparatus according to any one of (1) to (11), in which
at least a partial region of the first contact surface and the second contact surface has a friction coefficient of 0.3 or more.
(13) The tactile presentation apparatus according to any one of (1) to (12), in which
an amount of allowable movement of the central portion in the first direction and the second direction is smaller than an amount of allowable movement of the peripheral portion in the first direction and the second direction.
(14) The tactile presentation apparatus according to any one of (1) to (12), in which
an amount of allowable movement of the central portion in the first direction and the second direction is larger than an amount of allowable movement of the peripheral portion in the first direction and the second direction.
(15) The tactile presentation apparatus according to any one of (1) to (14), in which
at least a part of the central portion and the peripheral portion is deformable by folding and deployment.
(16) The tactile presentation apparatus according to any one of (1) to (15), in which
the central portion has a peripheral edge without the connection portion and the peripheral portion on an outer peripheral side or a peripheral edge without the peripheral portion on an outer peripheral side.
(17) The tactile presentation apparatus according to any one of (1) to (16), in which
a boundary line between the central portion and the connection portion has no corner having a radius of curvature of less than 1 mm and a boundary line between the connection portion and the peripheral portion has no corner having a radius of curvature of less than 1 mm.
(18) The tactile presentation apparatus according to (9), further including
a restriction portion that is coupled to at least one of the peripheral portion or the connection portion and has a higher hardness than hardness of the peripheral portion.
(19) The tactile presentation apparatus according to (15), in which
at least a part of the central portion and the peripheral portion has a bellows structure.
(20) The tactile presentation apparatus according to any one of (1) to (19), in which
the central portion is flexible.
(21) A tactile presentation system, including:
a contact portion including
　a central portion having a first contact surface and
　a connection portion having a second contact surface, the second contact surface being flexible and continuous with the first contact surface;
a peripheral portion connected to the central portion through the connection portion;
a retaining portion that supports the contact portion and the peripheral portion;
a first driving portion that changes a height of the central portion from the retaining portion in a first direction in which the central portion gets away from the retaining portion and a second direction and changes a press force to the central portion in the first direction in accordance with the height of the central portion from the retaining portion, the second direction being a direction opposite to the first direction;
a second driving portion that changes a height of the peripheral portion from the retaining portion in the first direction and the second direction and changes a press force to the peripheral portion in the first direction in accordance with the height of the peripheral portion from the retaining portion; and
a control unit that independently controls the first driving portion and the second driving portion.
(22) The tactile presentation system according to (21), further including
a sensor for detecting at least any one of contact or non-contact, a contact area, a press force, or a pushing amount of a contact object with respect to the first contact surface and the second contact surface, in which
the control unit controls the first driving portion and the second driving portion on the basis of an output of the sensor.

(23) The tactile presentation system according to (21), further including
a sensor for detecting shapes of the first contact surface and the second contact surface, in which
the control unit controls the first driving portion and the second driving portion on the basis of an output of the sensor.

REFERENCE SIGNS LIST 10 tactile presentation system
100, 200 tactile presentation apparatus
101, 201 retaining portion
102, 202 contact portion
103, 203 peripheral portion
104, 204 first driving portion
105, 205 second driving portion
106, 206 central portion
107, 207 connection portion
108 separation portion
109 bent portion
110 restriction portion
160 control unit
161 contact sensor
162 shape sensor
211 lower film
231 ascending/descending portion
232 distance sensor
233 upper film

The invention claimed is:

1. A tactile presentation apparatus, comprising:
a contact portion including
  a central portion that includes a first contact surface, and
  a connection portion that includes a second contact surface, wherein the second contact surface is flexible and continuous with the first contact surface;
a peripheral portion connected to the central portion through the connection portion;
a retaining portion configured to support each of the contact portion and the peripheral portion;
a first driving portion configured to:
  change a height of the central portion from the retaining portion in a first direction in which the central portion gets away from the retaining portion and a second direction; and
  change a press force to the central portion in the first direction in accordance with the height of the central portion from the retaining portion, wherein the second direction is opposite to the first direction; and
a second driving portion configured to:
  change a height of the peripheral portion from the retaining portion in the first direction and the second direction; and
  change a press force to the peripheral portion in the first direction based on the height of the peripheral portion from the retaining portion.

2. The tactile presentation apparatus according to claim 1, wherein at least one of the first driving portion or the second driving portion is further configured to drive one of the central portion or the peripheral portion by fluid control.

3. The tactile presentation apparatus according to claim 2, wherein each of the first driving portion and the second driving portion is further configured to drive the central portion and the peripheral portion by fluid control.

4. The tactile presentation apparatus according to claim 1, wherein
the first driving portion is further configured to drive the central portion to achieve a first correlation between the press force to the central portion and the height of the central portion from the retaining portion,
the second driving portion is further configured to drive the peripheral portion to achieve a second correlation between the press force to the peripheral portion and the height of the peripheral portion from the retaining portion, and
the second correlation is different from the first correlation.

5. The tactile presentation apparatus according to claim 1, wherein
the connection portion has different hardness between vicinity of the central portion and vicinity of the peripheral portion.

6. The tactile presentation apparatus according to claim 5, wherein
the connection portion has a higher hardness in the vicinity of the central portion than in the vicinity of the peripheral portion.

7. The tactile presentation apparatus according to claim 1, wherein
the connection portion has different thickness between vicinity of the central portion and vicinity of the peripheral portion.

8. The tactile presentation apparatus according to claim 7, wherein
the connection portion has a larger thickness in the vicinity of the central portion than in the vicinity of the peripheral portion.

9. The tactile presentation apparatus according to claim 1, wherein
the retaining portion includes a side wall portion that is in contact with the peripheral portion, and
at least one of the peripheral portion or the side wall portion is flexible toward the contact portion.

10. The tactile presentation apparatus according to claim 9, further comprising a separation portion where the peripheral portion is separated, wherein the separation portion extends toward the central portion from an outer periphery of the peripheral portion.

11. The tactile presentation apparatus according to claim 9, further comprising a bent portion where the peripheral portion is bent, wherein the bent portion extends toward the central portion from an outer periphery of the peripheral portion.

12. The tactile presentation apparatus according to claim 9, wherein at least a partial region of the first contact surface or the second contact surface has a friction coefficient of 0.3 or more.

13. The tactile presentation apparatus according to claim 1, wherein an amount of allowable movement of the central portion in the first direction and the second direction is less than an amount of allowable movement of the peripheral portion in the first direction and the second direction.

14. The tactile presentation apparatus according to claim 1, wherein
an amount of allowable movement of the central portion in the first direction and the second direction is larger than an amount of allowable movement of the peripheral portion in the first direction and the second direction.

15. The tactile presentation apparatus according to claim 1, wherein
at least a part of the central portion and the peripheral portion is deformable by folding and deployment.

16. The tactile presentation apparatus according to claim 1, wherein
the central portion has a peripheral edge without the connection portion and the peripheral portion on an outer peripheral side or a peripheral edge without the peripheral portion on an outer peripheral side.

17. The tactile presentation apparatus according to claim 1, wherein
a boundary line between the central portion and the connection portion has no corner having a radius of curvature of less than 1 mm and a boundary line between the connection portion and the peripheral portion has no corner having a radius of curvature of less than 1 mm.

18. A tactile presentation system, comprising:
a contact portion including
a central portion that includes a first contact surface, and
a connection portion that includes a second contact surface, wherein the second contact surface is flexible and continuous with the first contact surface;
a peripheral portion connected to the central portion through the connection portion;
a retaining portion configured to support the contact portion and the peripheral portion;
a first driving portion configured to:
change a height of the central portion from the retaining portion in a first direction in which the central portion gets away from the retaining portion and a second direction; and
change a press force to the central portion in the first direction in accordance with the height of the central portion from the retaining portion, wherein the second direction is opposite to the first direction;
a second driving portion configured to:
change a height of the peripheral portion from the retaining portion in the first direction and the second direction; and
change a press force to the peripheral portion in the first direction based on the height of the peripheral portion from the retaining portion; and
a control unit configured to independently controls the first driving portion and the second driving portion.

19. The tactile presentation system according to claim 18, further comprising a sensor configured to detect at least any one of contact or non-contact, a contact area, a press force, or a pushing amount of a contact object with respect to the first contact surface and the second contact surface, wherein the control unit is further configured to control the first driving portion and the second driving portion based on an output of the sensor.

20. The tactile presentation system according to claim 18, further comprising a sensor, wherein
the sensor is further configured to detect shapes of the first contact surface and the second contact surface, and
the control unit is further configured to control the first driving portion and the second driving portion based on a an output of the sensor.

* * * * *